(12) United States Patent
Jones et al.

(10) Patent No.: US 12,433,986 B2
(45) Date of Patent: Oct. 7, 2025

(54) MYOCARDIAL PROTECTION SYSTEM

(71) Applicant: QUEST MEDICAL, INC., Allen, TX (US)

(72) Inventors: Ken Jones, McKinney, TX (US); Jeff Albertsen, McKinney, TX (US); Cristo Corera, McKinney, TX (US); Lee Carter, McKinney, TX (US)

(73) Assignee: QUEST MEDICAL, INC., Allen, TX (US)

( * ) Notice: Subject to any disclaimer, the term of this patent is extended or adjusted under 35 U.S.C. 154(b) by 867 days.

(21) Appl. No.: 17/298,773

(22) PCT Filed: Dec. 17, 2019

(86) PCT No.: PCT/US2019/066989
§ 371 (c)(1),
(2) Date: Jun. 1, 2021

(87) PCT Pub. No.: WO2020/131967
PCT Pub. Date: Jun. 25, 2020

(65) Prior Publication Data
US 2022/0031923 A1 Feb. 3, 2022

Related U.S. Application Data

(60) Provisional application No. 62/782,143, filed on Dec. 19, 2018, provisional application No. 62/781,301, filed on Dec. 18, 2018.

(51) Int. Cl.
*A61M 1/36* (2006.01)

(52) U.S. Cl.
CPC ........ *A61M 1/3664* (2013.01); *A61M 1/3607* (2014.02); *A61M 1/362227* (2022.05);
(Continued)

(58) Field of Classification Search
CPC .......... A61M 1/3664; A61M 1/362227; A61M 1/369; A61M 1/3623; A61M 1/3621; A61M 1/1698; A61M 2205/127
See application file for complete search history.

(56) References Cited

U.S. PATENT DOCUMENTS 5,080,653 A * 1/1992 Voss .................... A61M 5/1456
604/152
5,385,540 A 1/1995 Abbott et al.
(Continued)

FOREIGN PATENT DOCUMENTS

WO 2002026288 A2 4/2002
WO 2013040182 A1 3/2013

OTHER PUBLICATIONS

Patent Cooperation Treaty, International Search Report and Written Opinion mailed Mar. 3, 2020 in International Patent Application No. PCT/US2019/66989 (10 pages).
(Continued)

*Primary Examiner* — Courtney B Fredrickson
*Assistant Examiner* — Kayla M. Turkowski
(74) *Attorney, Agent, or Firm* — Trop, Pruner & Hu, P.C.

(57) ABSTRACT

An embodiment includes a cardioplegia delivery system having a console, controller, and disposables. The console, in conjunction with the disposables, combines blood from the heart-lung machine and crystalloid from the IV-bag in a specified ratio and then adds in a drug (arrest agent and/or additive). The electro-mechanical console incorporates a blood/crystalloid pump, temperature controllable water circulation system, pressure and temperature monitors, a sensor interface with the disposables, an arrest agent pump, an additive pump and ultra-sonic air detection sensors. The system monitors and controls the blood-crystalloid ratio, drug concentration, flow rate, pressure, temperature, and delivery route of the cardioplegia solution delivered to the
(Continued)

patient. The system is a software-controlled system with a graphical user interface controller. The controller is utilized to initiate/stop cardioplegia delivery, monitor delivery parameters and view/save relevant case information and data.

23 Claims, 36 Drawing Sheets

(52) U.S. Cl.
CPC .... *A61M 1/36224* (2022.05); *A61M 1/36225* (2022.05); *A61M 1/3666* (2013.01); *A61M 1/369* (2013.01); *A61M 1/362265* (2022.05); *A61M 1/3623* (2022.05); *A61M 2205/3331* (2013.01); *A61M 2205/3368* (2013.01); *A61M 2205/502* (2013.01)

(56) References Cited

U.S. PATENT DOCUMENTS

| | | | |
|---|---|---|---|
| 5,573,502 A | 11/1996 | LeCocq et al. | |
| 5,899,873 A * | 5/1999 | Jones | A61M 1/3664 165/186 |
| 6,071,258 A | 6/2000 | Dalke et al. | |
| 9,770,554 B2 | 9/2017 | Dollar et al. | |
| 2003/0135252 A1* | 7/2003 | MacHold | A61F 7/0085 607/106 |
| 2003/0149401 A1 | 8/2003 | Benetti Diaz De Brito et al. | |
| 2004/0254533 A1* | 12/2004 | Schriver | A61M 5/14546 604/131 |
| 2007/0134101 A1 | 6/2007 | Jones et al. | |
| 2008/0072583 A1* | 3/2008 | Sakita | F01N 5/02 60/320 |
| 2009/0099498 A1* | 4/2009 | Demers | A61M 1/36225 604/4.01 |
| 2009/0208811 A1* | 8/2009 | Nakamura | H01M 8/04208 429/404 |
| 2013/0190717 A1* | 7/2013 | Dollar | A61M 5/172 434/262 |
| 2014/0099235 A1* | 4/2014 | Ellingboe | A61M 1/3641 422/45 |
| 2015/0148739 A1 | 5/2015 | Radicella | |
| 2020/0215269 A1* | 7/2020 | Yotsutsuji | A61M 5/31515 |
| 2020/0276376 A1* | 9/2020 | Wolfgramm | A61M 1/369 |

OTHER PUBLICATIONS

"What is a Heater-Cooler Device?" downloaded from https://www.fda.gov/medical-devices/cardiovascular-devices/what-heater, on Dec. 16, 2019 (2 pages).

"Microplegia the Quest Strategy for an All Blood Initiative," Quest MPS® 2 Myocardial Protection System, 2012 (5 pages).

"Quest MPS® 2 Smart Myocardial Protection Operations Manual," Emergo Europe, Aug. 2019 (354 pages).

"Parts of a Syringe," Syring Pump Pro, downloaded from https://syringepumppro.com/parts-of-the-syringe/, Dec. 10, 2018 (5 pages).

European Patent Office, Office Action dated Jul. 20, 2022 in European Patent Application No. 19899594.6 (15 pages).

European Patent Office, Communication Pursuant to Article 94(3) EPC dated Oct. 8, 2024 in European Patent Application No. 19899594.6 (6 pages).

* cited by examiner

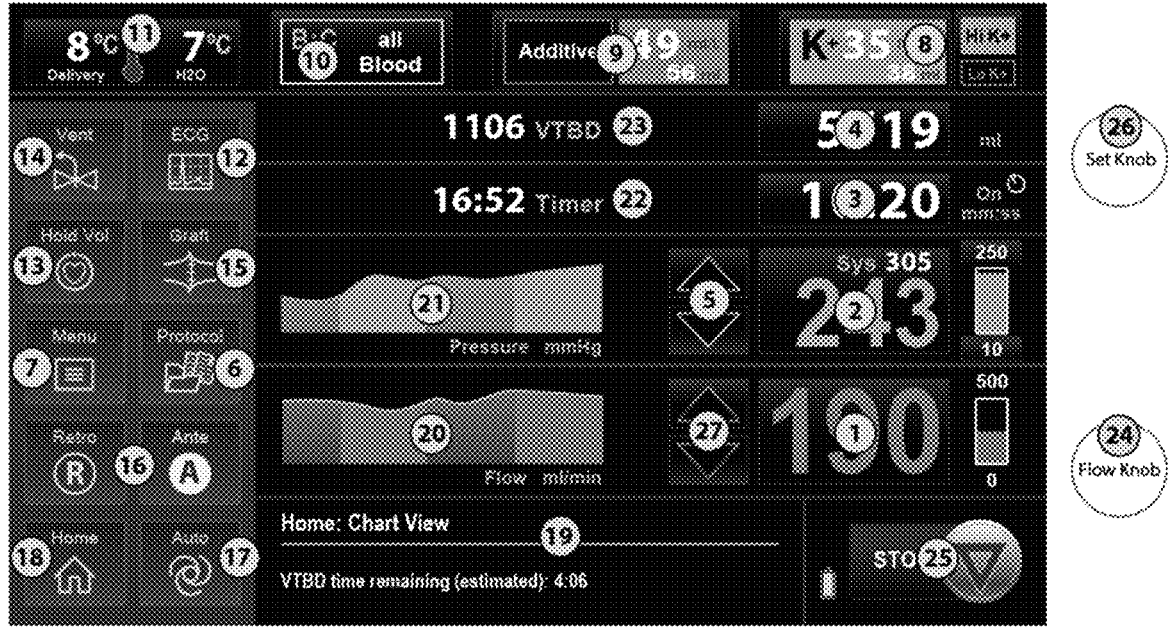

FIG. 10A

| # | Icon | Name | Description |
|---|------|------|-------------|
| 1 | 190 | Flow Rate and Range | The Flow Rate (1) displays the current flow rate. A dynamic vertical flow bar displays the flow range and dynamically represents the current flow rate value with respect to the flow limits. |
| 2 | Sys 305 243 | System and Delivery Pressure and Limits | The System pressure is always displayed. If the pressure source is selected as external, the corresponding Antegrade or Retrograde delivery pressure is also displayed. A dynamic vertical pressure bar displays the pressure limits and dynamically represents the current delivery pressure value with respect to the pressure limits. |
| 3 | 10:20 | Delivery Time (On/Off) | The Time (3) displays delivery On/Off time, in the format H:MM.SS |

FIG. 10B

| | | | |
|---|---|---|---|
| 4 |  | Incremental Delivery Volume | The Incremental Volume (4) displays the total cardioplegia volume (blood + crystalloid + arrest + additive) delivered during the current 'On' Time. |
| 5 |  | Target Pressure adjust (during Auto-Mode) | Target Pressure increment and decrement buttons can be used to raise or lower the target pressure during auto-mode. |
| 6 |  | Protocol | The Protocol (6) displays the protocol name, if selected. Operator can modify the protocol parameters by touching the protocol name or can select a new protocol from the existing protocol list. |
| 7 |  | Menu | The Menu (7) displays the menu options, where operator can select Settings, H2O Circ, Service, File Transfer, Case History or Additive / Crystalloid / Personnel Lists. |
| 8 |  | Arrest Agent Volume Remaining, delivery concentration Value and High or Low K+ selection button | The Arrest (8) displays the concentration setting of the arrest agent in mEq/L. The volume remaining bar displays the volume of fluid remaining in the Arrest cartridge. High or Low K+ indicates which selection is active and is used to toggle the setting. |
| 9 |  | Additive Volume Remaining, Additive Name, delivery concentration Value | The Additive (9) displays the concentration setting of the additive solution in mL/L and the Additive Name. The volume remaining displays the volume of fluid remaining in the Additive cartridge. |
| 10 | 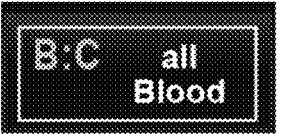 | Blood-to-Crystalloid Ratio and Crystalloid Volume Remaining Bar | The B:C (10) displays the Blood-to-Crystalloid Ratio setting and the Crystalloid Name. The volume remaining displays the volume of fluid remaining in the crystalloid bag. |
| 11 |  | Delivery Temperature and Water Temperature. | The Delivery Temperature (11) displays the delivery temperature in °C. The Water Temperature (11) displays the water temperature in °C. |
| 12 |  | ECG | The ECG (12) button displays the waveform of the ECG signal received from the analog ECG port. |
| 13 |  | Hold Volume | The Hold Vol (13) button indicates and toggles the Hold Volume mode as Active /Inactive. |

FIG. 10C

| # | | Name | Description |
|---|---|------|-------------|
| 14 | Vent | Vent | The Vent (14) button indicates and toggles the vent mode as Active / Inactive. The Vent (14) button is active only when Flow is set to zero. |
| 15 | Graft | Graft | The Graft (15) indicates and toggles the Graft mode as Active / Inactive. |
| 16 | R Retro / A Ante | Delivery Route Options: Antegrade or Retrograde or Simulgrade | Antegrade or Retrograde button indicates and selects the delivery direction. Simulgrade shall be selected by holding down (long press) the Antegrade or Retrograde button. The delivery route button is disabled when the VENT mode is activated. |
| 17 | Auto | Auto | The Auto button (17) indicates and toggles the Auto mode as Active / Inactive. |
| 18 | Home | Home | The Home button (18) displays the Home screen and also toggles between Home view or Chart view. |
| 19 | Home / VTBD time remaining (estimated): 4:06 | Message Window | An area of the screen reserved for displaying messages. |
| 20 | (chart) | Flow Rate Chart | A real-time chart showing 16 second dynamic flow rate history. Only displayed in Chart view. |
| 21 | (chart) | Delivery Pressure Chart | A real-time chart showing 16 second dynamic delivery pressure history. Only displayed in Chart view. |
| 22 | 16:52 Timer | Stopwatch Timer | The Stopwatch Timer counts up every second when the timer is started and halts when the timer is stopped. |
| 23 | 1106 VTBD | VTBD / TTBD Counter | VTBD and TTBD counters count down the volume or time during delivery. Flow is automatically stopped when the counter reaches 0. |
| 24 | (knob) | Flow Knob | The flow knob is to adjust the flow rate. |

FIG. 10D

| | | | |
|---|---|---|---|
| 25 | 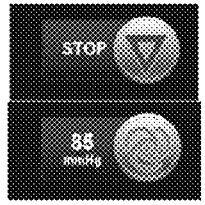 | Stop Flow Auto-Start | The Stop Flow (25) button, displayed only when flow is greater than zero, may be used to immediately stop flow. The Auto-Start button, displayed only when flow is zero, may be used to ramp to the target pressure and then activate Auto Mode. |
| 26 | 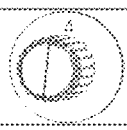 | Set Knob | The Set Knob is used to set parameters. |
| 27 |  | Flow Increment & Decrement Buttons | The Flow increment button and decrement button [27] may be used to adjust the flow rate. Tap the button for slow adjustments or hold down the button for rapid adjustments. |

FIG. 10E

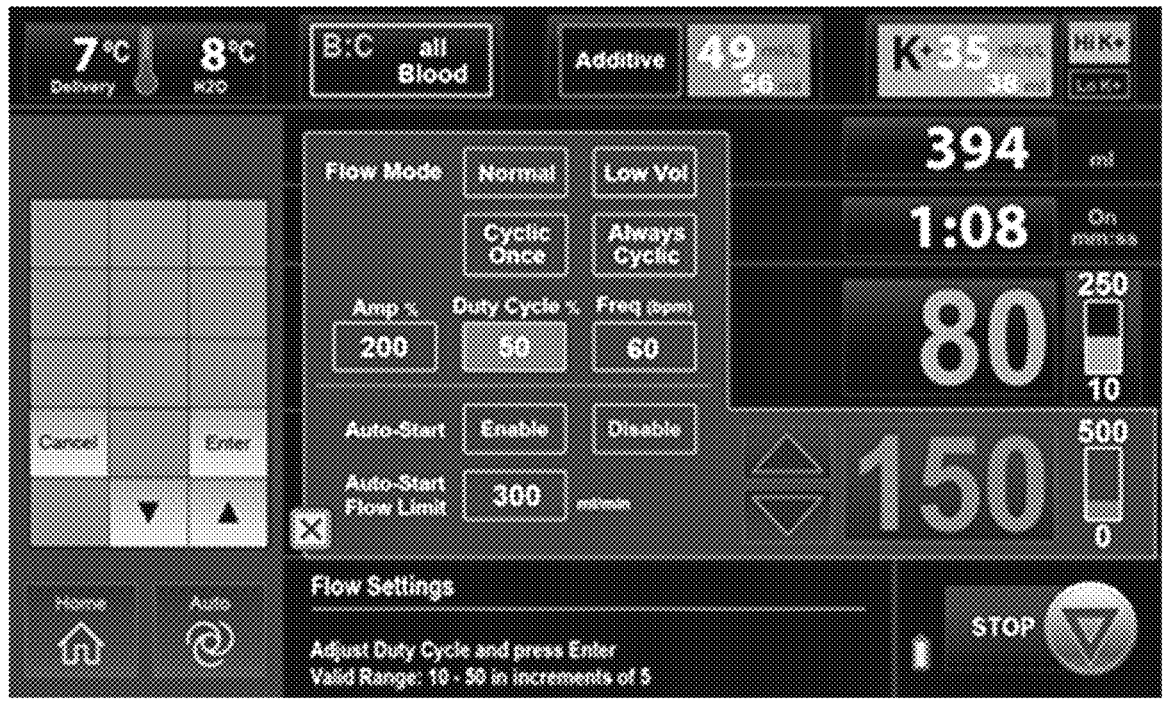

MYOCARDIAL PROTECTION SYSTEM

PRIORITY CLAIM

This application claims priority to: U.S. Provisional Patent Application No. 62/781,301 filed on Dec. 18, 2018 and entitled "MYOCARDIAL PROTECTION SYSTEM", and U.S. Provisional Patent Application No. 62/782,143 filed on Dec. 19, 2019 and entitled "MYOCARDIAL PROTECTION SYSTEM". The content of each of the above applications is hereby incorporated by reference.

TECHNICAL FIELD

Embodiments of the invention are in the field of cardiopulmonary bypass surgery equipment and, more specifically, cardioplegia delivery systems

BACKGROUND

As described in U.S. Pat. No. 9,770,554, in the performance of open-heart surgery, the patient is supported by an extracorporeal blood circuit employing a heart/lung machine. The heart is isolated from the vascular system, and venous blood is diverted into the extracorporeal blood circuit where it is oxygenated, temperature-controlled and returned to the patient's arterial side. A separate circuit is established for supplying a cardioplegia solution to the heart as the surgery proceeds.

The cardioplegia circuit functions to still the heart, lower the metabolic requirements of the heart, protect the heart during periods of ischemia and, finally, prepare the heart for reperfusion at the end of the procedure. Operation of the extracorporeal blood circuit as well as the cardioplegia delivery is performed by a trained perfusionist under the direction of the surgeon. The principal elements of cardioplegia solution are blood, representing a small fraction diverted from the output of the heart/lung machine, combined with a crystalloid solution. In addition, an amount of potassium solution is added to the cardioplegia flow to still the heart.

Depending upon the requirements of the particular surgery, the cardioplegia solution may be cooled or warmed, and may be delivered in antegrade fashion to the aortic root or coronary ostia, or in a retrograde mode to the coronary sinus. The requirements placed upon the cardioplegia solution vary as the surgery proceeds, and are subject to the clinical judgment of individual surgeons.

By way of background, an early cardioplegia delivery system typically employed two tubes supplying the blood solution and the crystalloid solution respectively that were routed through a single rotary peristaltic pump whereupon the separate blood and crystalloid solutions in the respective tubes were combined into a single flow delivery line. The ratio between the blood solution and the crystalloid solution was determined by the relative diameters of the respective tubing carrying the two solutions, since each was mounted on the same rotary peristaltic mechanism and thus was forwarded by the same action. The tubing was usually provided in a 4:1 ratio of blood-to-crystalloid cross-sectional flow area, so that the rotary peristaltic pump would be delivering the blood solution and the crystalloid solution to the delivery line in a ratio of approximately 4:1. Potassium was typically provided to the delivery line upstream of the pump from two alternate crystalloid solutions containing potassium, one having a relatively low concentration of potassium, the other a higher concentration. The higher potassium concentration was utilized to arrest the heart, while the lower was used to maintain the stilled condition. While monitoring of the patient's condition during surgery, the perfusionist would select the higher concentration to provide sufficient potassium in the cardioplegia solution to establish the stilled condition of the heart and then select the lower concentration to maintain the heart in a stilled condition. The perfusionist would minimize the delivery of excessive potassium thereby minimizing the risks associated with hyperkalemia.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIG. 10A depicts a home screen and FIGS. 10B, 10C, 10D, 10E provide details regarding the function of various aspects of the home screen.

FIGS. 11, 12A, 12B, 12C, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 provide graphical user interfaces in embodiments.

DETAILED DESCRIPTION

Figure 1A:
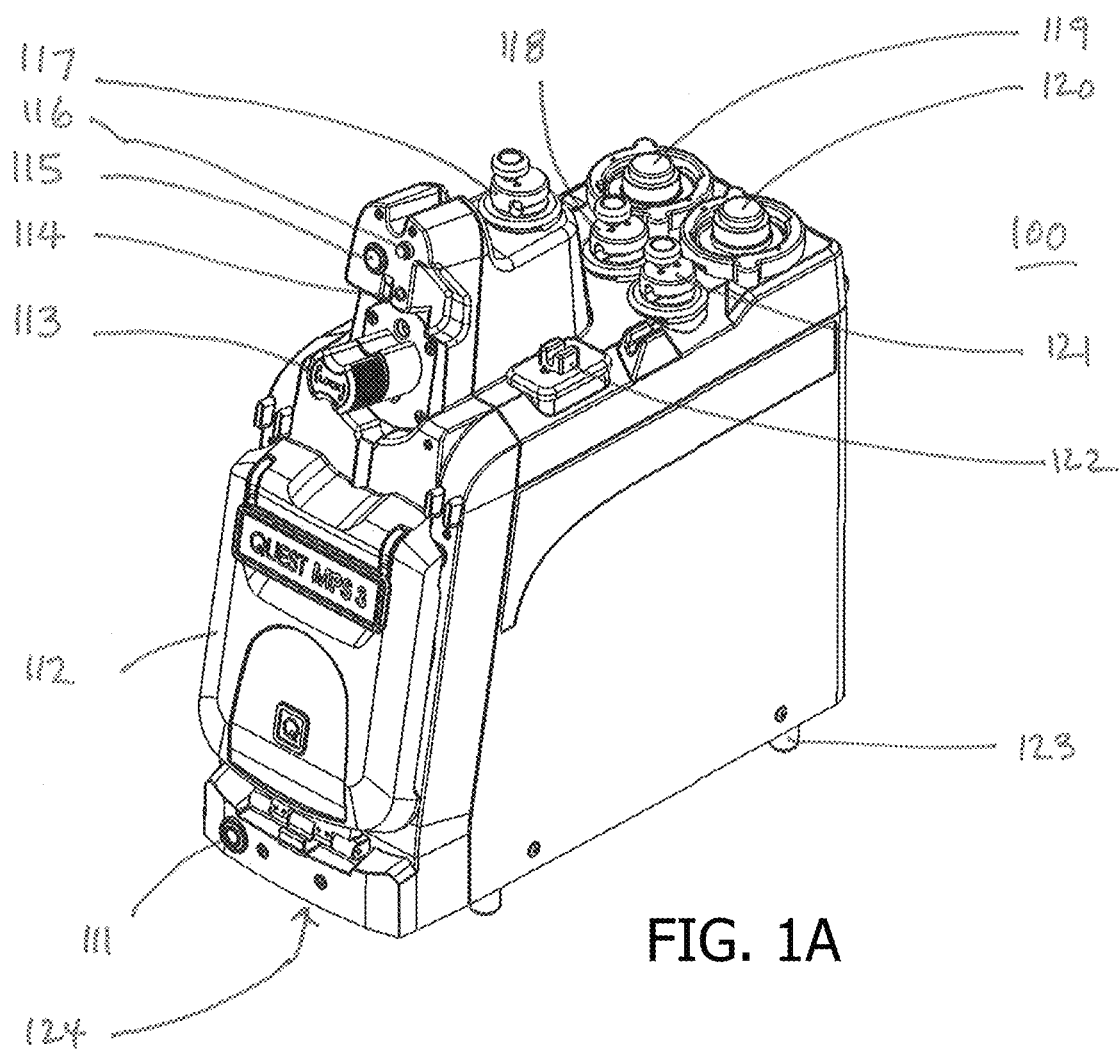
FIGS. 1A and 1B provide front and rear views of the console in an embodiment.

Reference will now be made to the drawings wherein like structures may be provided with like suffix reference designations. In order to show the structures of various embodiments more clearly, the drawings included herein are diagrammatic representations of structures. Thus, the actual appearance of the fabricated structures, for example in a photo, may appear different while still incorporating the claimed structures of the illustrated embodiments. Moreover, the drawings may only show the structures useful to understand the illustrated embodiments. Additional structures known in the art may not have been included to maintain the clarity of the drawings. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner "Connected" may indicate elements are in direct physical or electrical contact with each other and "coupled" may indicate elements co-operate or interact with each other, but they may or may not be in direct physical or electrical contact. Phrases such as "comprising at least one of A and B" include situations with A, B, or A and B.

Applicant determined early cardioplegia delivery systems were characterized by poor adaptability to varying requirements as may be required by the surgeon during surgery, such as the ratios of the solutions in the delivery flow and the control of the temperature of the delivery flow. Applicant determined the systems suffered from particularly poor control over the cardioplegia delivery flow at low flow rates. Moreover, the blood in the cardioplegia line was subjected to the peristaltic pumping action that produced shearing forces on the blood, thereby risking damage to the blood. However, embodiments addressed herein address some or all of these shortcomings.

For example, an embodiment of a cardioplegia delivery system consists of a console, controller, and disposables. However, these three components may exit separately from one another. For example, a controller may be sold separate from the console and more than one type of controller may function with the console and more than one type of console may function with the controller. Further, disposables may be operable with more than one type of console.

A function of an embodiment of the system is to aid the perfusionist in cardioplegia delivery to the patient during Cardiopulmonary Bypass Surgery. The console, in conjunction with the disposables, combines blood from the heart-lung machine and crystalloid from the IV-bag in a specified ratio and then adds in the drug (arrest agent and/or additive). The electro-mechanical console incorporates a blood/crystalloid pump, temperature controllable water circulation system, pressure and temperature monitors, a sensor interface with the disposables, an arrest agent pump, an additive pump and ultra-sonic air detection sensors. The system monitors and controls the blood-crystalloid ratio, drug concentration, flow rate, pressure, temperature, and delivery route of the cardioplegia solution delivered to the patient. The system is a software-controlled system with a touchscreen, graphical user interface controller. The controller can be positioned remotely from the console affording flexibility in equipment setup to achieve the most desirable circuit setup. The controller is utilized by the operator to select some or all parameters, initiate/stop cardioplegia delivery, monitor delivery parameters and view/save relevant case information and data.

In an embodiment, the console combines the blood and crystalloid solution to a proportion set by the operator and adds the arrest agent or additive drug to the solution. This delivery solution is then passed through the heat exchanger, where the temperature of the delivery fluid is set by the operator and regulated by the console water circulation system. The delivery fluid is monitored for delivery pressure, temperature, and air bubbles before it is delivered to a patient, at the desired flow rate.

In an embodiment, the controller is used to select and set cardioplegia parameters including blood/crystalloid ratio, drug concentrations, flow rate, pressure limits and delivery temperature among others. The controller is controlled by the operator to start and stop cardioplegia delivery via the touchscreen interface or the flow knob on the front of the controller. The controller interfaces with the console through the console to controller communicable cable attached on the back of both modules. Power is supplied to the controller through the console to controller communication cable.

The controller allows the operator to perform one or more of the following functions: Start/Stop Cardioplegia Delivery; Set, View, and Control System Parameters (Pressure, Volume, Flow Rate, and Temperature); View/Address Alarm Notifications; Toggle System Settings; View Case Logs/Dose Data; View ECG Trace; Protocol Management; Monitor System Status/Diagnostics. Embodiments exist where only a subset of the above functions are available.

In an embodiment, the disposables are designed to work in conjunction with the console. In an embodiment the disposables are sterile, single use disposables which consist of at least one of a blood/crystalloid cassette, heat exchanger, blood/crystalloid source lines, delivery extension line, or appropriate tubing and luer fittings to complete the cardioplegia circuit. The disposables may be included in a kit or "delivery set". Arrest agent and additive cartridges may be included with the delivery set or may be acquired/purchased separately to allow for pharmacy filling.

FIG. 1 includes an embodiment of a cardioplegia delivery system comprising a console 100. The console includes a first pump to pump at least one of blood or crystalloid; a second pump to pump an arrest drug; a third pump to pump an additive. However, other embodiments may use fewer pumps to perform the operations of the above described three pumps. The console includes a temperature controllable water circulation system configured to couple to a reservoir of coolant and a first heat exchanger (HEX) 101 to couple to the water circulation system. The console includes a first sensor to sense pressure; a second sensor to sense temperature; and a third sensor to sense air. Other embodiments may include fewer or more sensors. The system includes at least one processor-based computing node coupled to a graphical user interface (GUI) 102. The at least one processor-based computing node and GUI are configured to separably couple to the console. The system includes a first container 103 that includes the crystalloid, a second container 104 including an arrest drug, and a third container 105 including additive. The first, second, and third containers are configured to releasably couple to the console. Alternative embodiments may include fewer or more containers than these three containers. Node 102 couples to or includes at least one machine-readable medium, wherein the at least one machine-readable medium has stored thereon data which, if used by the at least one processor based computing node, causes the at least one processor based computing node to perform operations comprising: (1) control a ratio of crystalloid to blood to be delivered to the patient; (2) control an amount of the arrest drug to be delivered to the patient; (3) control an amount of the additive to be delivered to the patient; (4) control a temperature of at least one of the crystalloid, the blood, the arrest drug, or the additive to be delivered to the patient; (5) control a pressure of at least one of the crystalloid, the blood, the arrest drug, or the additive to be delivered to the patient; (6) control a delivery rate of at least one of the crystalloid, the blood, the arrest drug, or the additive to be delivered to the patient; (7) record an amount of at least one of the crystalloid, the blood, the arrest drug, or the additive administered to the patient; (8) record an amount of time at least one of the crystalloid, the blood, the arrest drug, or the additive are administered to the patient; (9) in response to recording the amount of at least one of the crystalloid, the blood, the arrest drug, or the additive administered to the patient, determine a volume amount of the at least one of the crystalloid, the blood, the arrest drug, or the additive that remains and is available to be administered to the patient; (10) store at least one delivery protocol. Some embodiments may include fewer or more functions. The at least delivery protocol includes a predetermined setting for at least one of: (a) pressure of at least one of the crystalloid, the blood, the arrest drug, or the additive to be delivered to the patient, (b) temperature of at least one of the crystalloid, the blood, the arrest drug, or the additive to be delivered to the patient, (c) flow rate of at least one of the crystalloid, the blood, the arrest drug, or the additive to be delivered to the patient, or (d) ratio of crystalloid to blood. Some embodiments may include fewer or more functions. The system is configured to deliver blood and crystalloid solutions (including crystalloid and drugs) to the heart during cardiopulmonary bypass surgery.

Figure 1B:
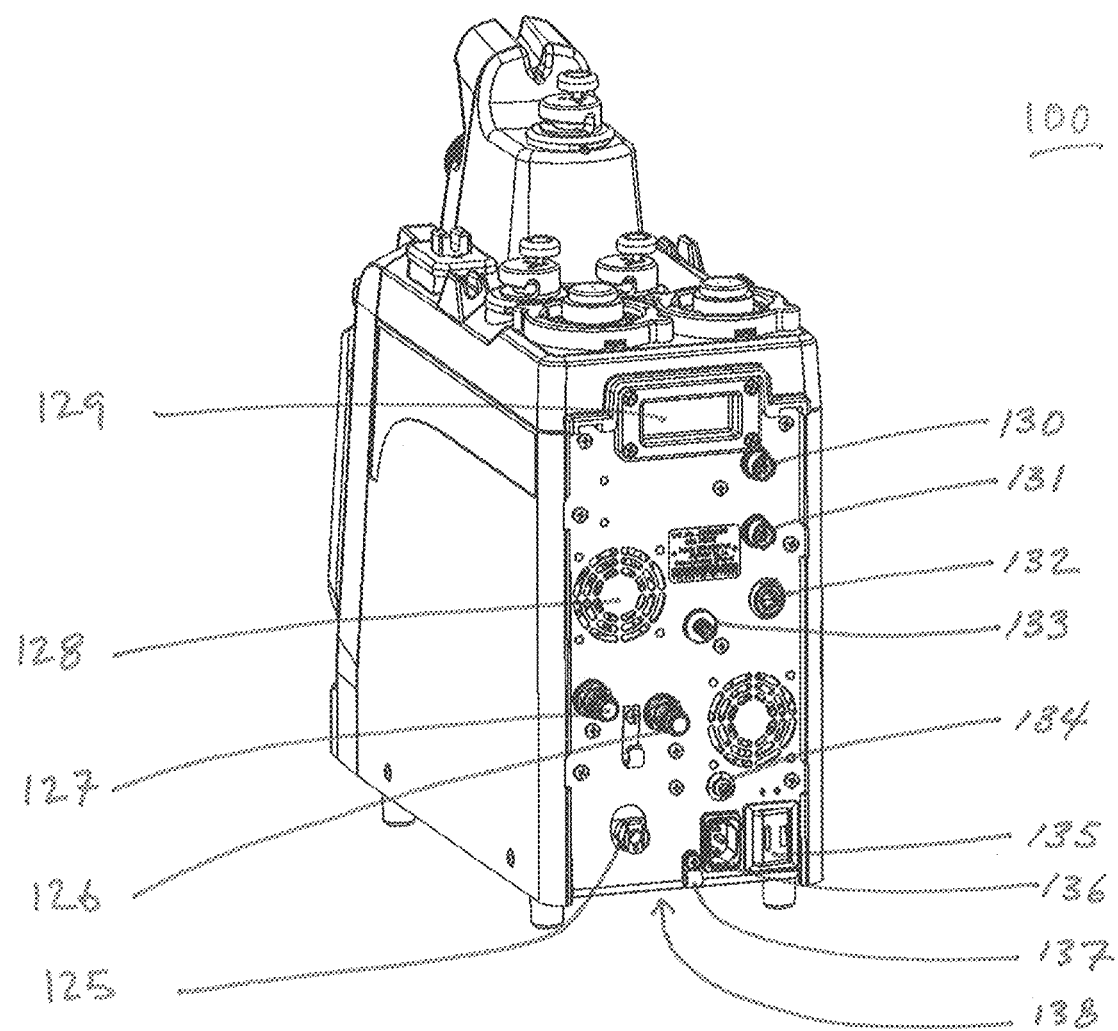

Regarding console 100 and, more generally, FIGS. 1A and 1B, the following is a list of components with respective functions:

or a heater cooler unit. The system may use a supply of cold water from the water source to properly regulate cardioplegia delivery temperature.

As used herein, heater-cooler devices may be used during surgeries to warm or cool patients. They can be important tools for surgeries involving the heart and lungs (cardiothoracic surgeries). Heater-cooler devices may include tanks that provide temperature-controlled water to external heat exchangers or to warming/cooling blankets through closed water circuits.

To prime the system using a hypothermic reservoir, an embodiment follows these steps. Connect the hypothermic reservoir to the console. Verify that the hypothermic reservoir is positioned so that the outlet of the hypothermic reservoir is located above the heat exchanger to ensure

| | | |
|---|---|---|
| 111 | Push Button Switch | Sleep (OFF)/Wake (ON) |
| 112 | Door | Contain Blood/Crystalloid Cassette |
| 113 | Heat Exchanger (HEX) Locking Knob | Secure Heat Exchanger |
| 114 | Temperature Sensors | Monitor Delivery Temperature |
| 115 | Pressure Transducer | Monitor System Pressure |
| 116 | Fluid Level Sensor | Monitor Air in Heat Exchanger |
| 117 | Vent Valve | Control Vent Delivery/Expel Air from HEX |
| 118 | Retrograde Valve | Control Retrograde Delivery |
| 119 | Additive Pump | Control Additive Delivery |
| 120 | Arrest Agent Pump | Control Arrest Agent Delivery |
| 121 | Antegrade Valve | Control Antegrade Delivery |
| 122 | Air In Line Sensor | Detect Air in Delivery Line |
| 123 | Mounting Feet (4X) | Facilitate Mounting |
| 124 | Front Handle (under mount) | Facilitate Transport |
| 125 | Circulation System Drain Port | Drain Circulation System |
| 126 | Water Outlet Port | Water Outlet to Cold Water Source |
| 127 | Water Inlet Port | Water Inlet from Cold Water Source |
| 128 | Cooling Fans (2X) | Maintain Internal Temperature |
| 129 | Rear Handle | Facilitate Transport |
| 130 | Antegrade Ext. Pressure Connector | Monitor External Antegrade Pressure Transducer |
| 131 | Retrograde Ext. Pressure Connector | Monitor External Retrograde Pressure Transducer |
| 132 | Console to Controller Comm Port | Connect Console to Controller Cable |
| 133 | Medical Air Inlet | Connect Medical Air to Console |
| 134 | Ground Equalization Plug | Ground Console |
| 135 | Main Power Switch | AC Mains Power Switch |
| 136 | Power Plug Socket | Connect AC Mains Power Plug |
| 137 | Power Cable Strain Relief | Secure Power Cable |
| 138 | Drip Pan Drain Port (under mount) | Drain Drip Pan |
| 102 | Controller | |
| 139 | Touchscreen Display | Monitor/Select/Set Parameters |
| 140 | Set Knob | Scroll Through Parameters |
| 141 | USB Port | Connect USB Drive |
| 142 | Flow Control Knob | Start/Stop Cardioplegia Delivery |
| 143 | Type A USB Port | Connect USB Drive |
| 144 | Type B USB Port | Service Connection |
| 145 | Communication Cable Port | Connect Console to Controller Communication Cable |
| 146 | Analog ECG Port | Connect Analog ECG Cable |
| 147 | RS-232 Input Port | Connect Electronic Data Management System |
| 148 | Controller Mounting Bracket | Connect to Controller Mounting Arm |
| 149 | Delivery Set | |
| 103 | Blood/Crystalloid Cassette | Ratio Blood/Crystalloid and pump to HEX |
| 105 | Additive Cartridge | Deliver Additive |
| 106 | Additive Delivery Line | Fill/Refill/Deliver Additive to HEX |
| 101 | Heat Exchanger (HEX) | Regulate Temperature of Cardioplegia |
| 150 | Blood Source Line | Connect Blood Source to System Circuit |
| 151 | Vent Line Extension | Connect Vent Line to Reservoir |
| 152 | Blood Delivery Extension Line | Line to Table |
| 153 | Crystalloid Source Line | Connect Crystalloid Source to Circuit |
| 154 | Arrest Agent Delivery Line | Fill/Refill/Deliver Arrest Agent to HEX |
| 104 | Arrest Agent Cartridge | Deliver Arrest Agent |

Regarding the HEX, in an embodiment the water circulation system must be fully primed and purged of all air prior to use to ensure full functionality of the system. Failure to do may result in loss of temperature control, inadequate cooling, and inability to perform leak tests during priming and may result in premature wear or damage to the equipment. The system may be used with a hypothermic reservoir proper priming. Ensure the locking knob 113 is in the 10-convolution position (position configured to receive a HEX with 10 convolutions of metal exchange elements) and install the water circuit adapter 101 to the console using the locking knob. To put the knob in the 10-convolution position, push in on the knob and rotate clockwise until the knob will no longer turn. Remove the lid and fill the hypothermic reservoir with at least 3 liters of sterile water or filtered tap water filtered. Verify the water level is covering the drain port, at a minimum. Replace hypothermic reservoir lid on the reservoir. Squeeze the tubing connected to the inlet to remove all air before attempting to prime the system. Power on the System. Select "MENU" and "H2O Circ". The Start button may be used to prime the H2O Circulation system. This is needed to eliminate any air that might be trapped in the circulation system. It takes approximately 24 seconds to complete the H2O Prime in an embodiment. A countdown timer is displayed during the process. The process can be stopped and resumed. Verify that water flow is established by checking the inlet of the hypothermic reservoir during the priming sequence.

Figure 2A:
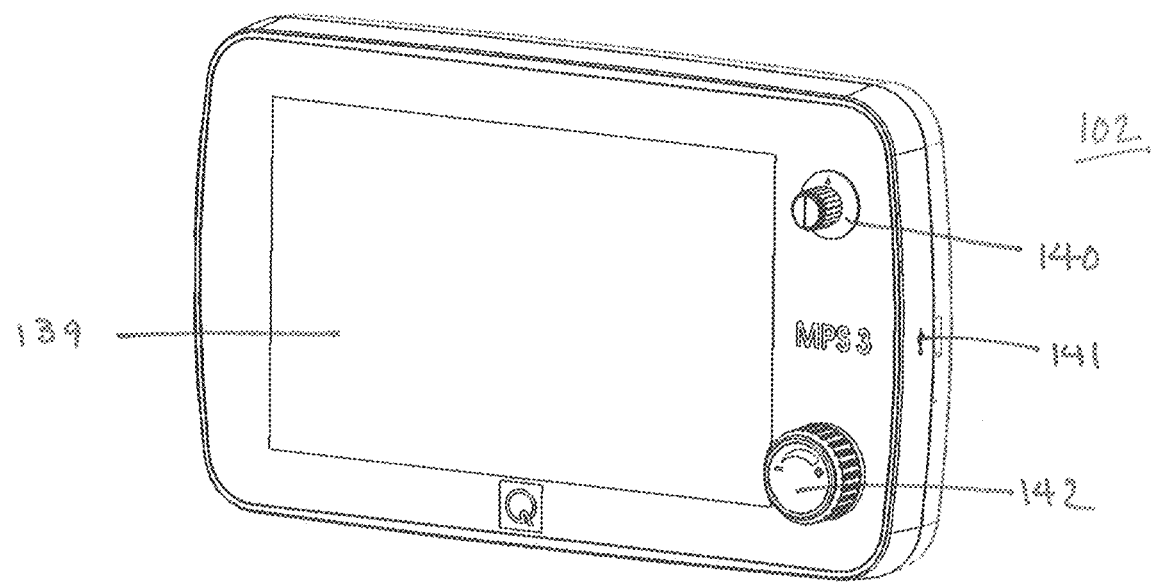
FIGS. 2A and 2B provide front and rear views of the controller in an embodiment.
Figure 2B:
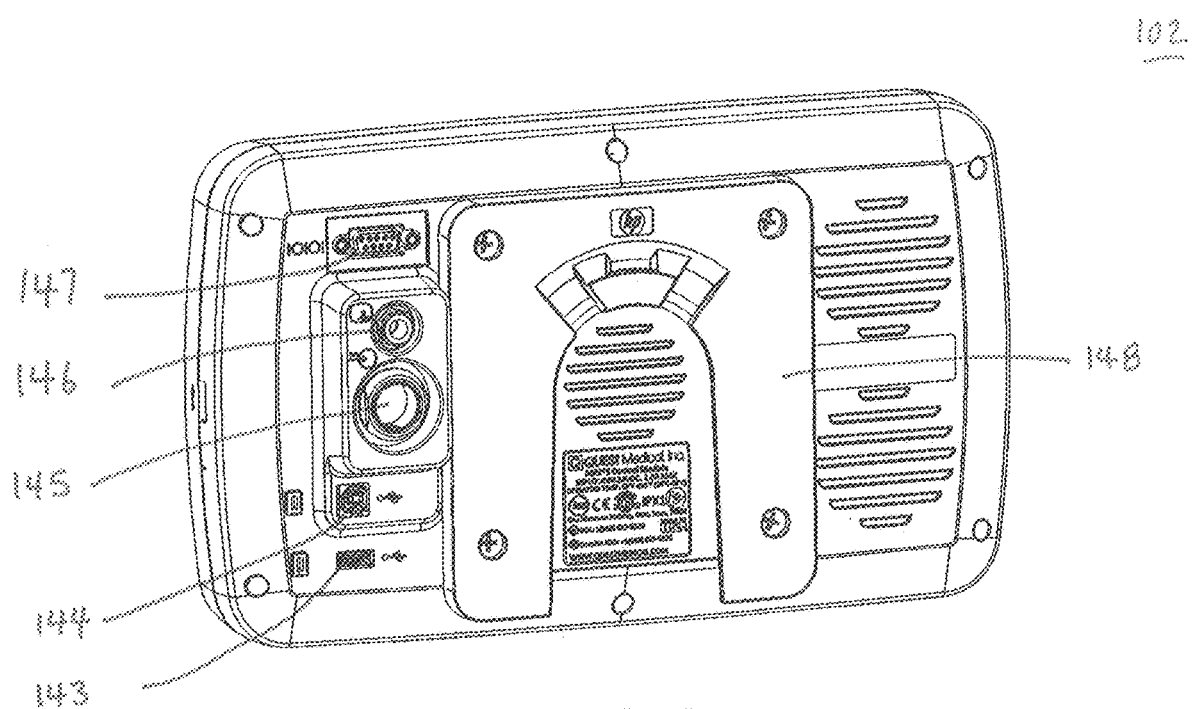

Regarding the controller, in an embodiment the system may be connected to a third-party Electronic Data Management System via port 147 (FIG. 2B) to export Case Log and Dose History data. The System can be connected to a third-party Electrocardiogram (ECG) to display the ECG signal on the controller via port 146. The System may be connected to external Antegrade or Retrograde Pressure Transducers, if desired, via ports 130, 131. These pressure transducers can be used to measure the pressure in the Aortic Root or Coronary Sinus to be displayed on the controller display.

The controller utilizes a Graphical User Interface (GUI) to allow the operator to set parameters, start/stop cardioplegia delivery and monitor delivery parameters. As shown in FIGS. 10A-10E, the interface is intuitive in operation.

In an embodiment, case parameters can be set and monitored by the operator at any time during the case. Additionally, the System can store and recall up to 64 delivery protocols. For Flow Settings, the user may touch the flow display on the home screen (FIG. 10A). A Flow setting screen is displayed at FIG. 11. The Low Vol button is only active if the current flow rate is 0 ml/min. Selecting the Low Vol button will put the system in a flow mode where it pumps with a reduced stroke volume. The maximum flow rate is limited to 200 ml/min in an embodiment. The Low Vol icon shall be displayed in the Flow display. When flowing in Normal Flow mode, the Cyclic Once and Always Cyclic buttons are enabled. When selected, the system pumps in a cyclic (pulsatile) profile. The Amplitude, Duty Cycle and Frequency parameters can be adjusted to obtain the desired profile. The Cyclic mode icon and the calculated pulsatile pressure are displayed in Cyclic Mode. If Cyclic Once is selected, cyclic mode is exited after one use. If Always Cyclic is selected, the System pumps in cyclic mode until Normal flow mode is selected. The user can adjust the flow rate by using the flow increment/decrement buttons or the flow knob. The Auto-Start Enable button is used to enable Auto-Start Mode. The Auto-Start Flow Limit is the maximum flow rate that will not be crossed when ramping up the flow to achieve the desired Target pressure. When flow is Zero and delivery route is Ante, the user has the option to select the Auto-Start button which causes the flow to ramp up until the Target pressure is reached. Auto-Start is disabled for Retro, Simulgrade and Graft mode.

Figure 12A:
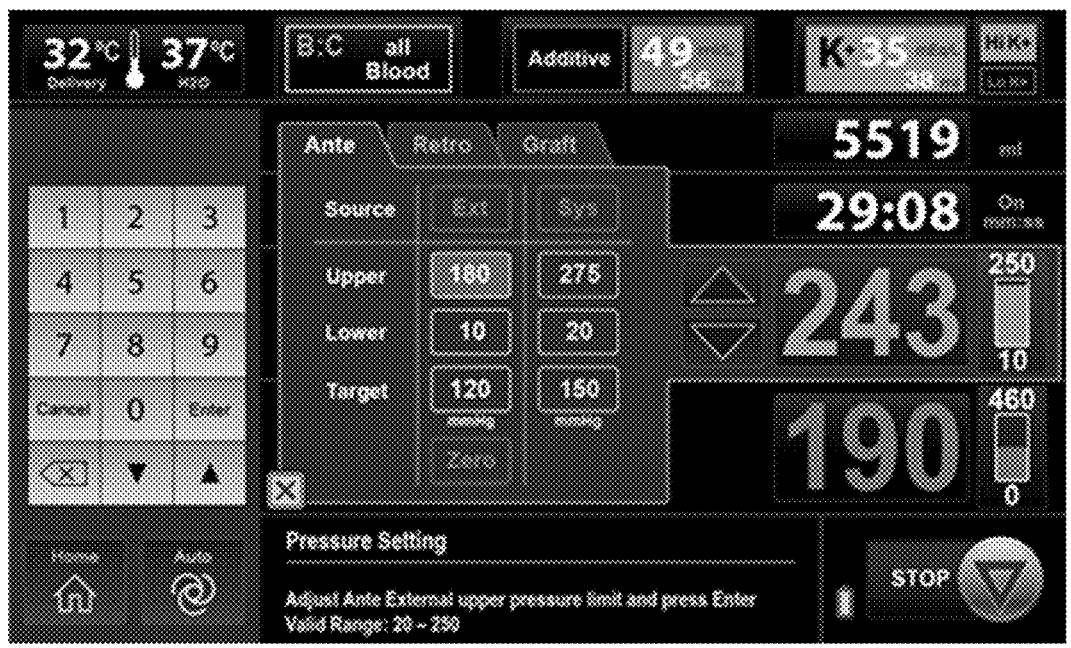
Figure 12B:
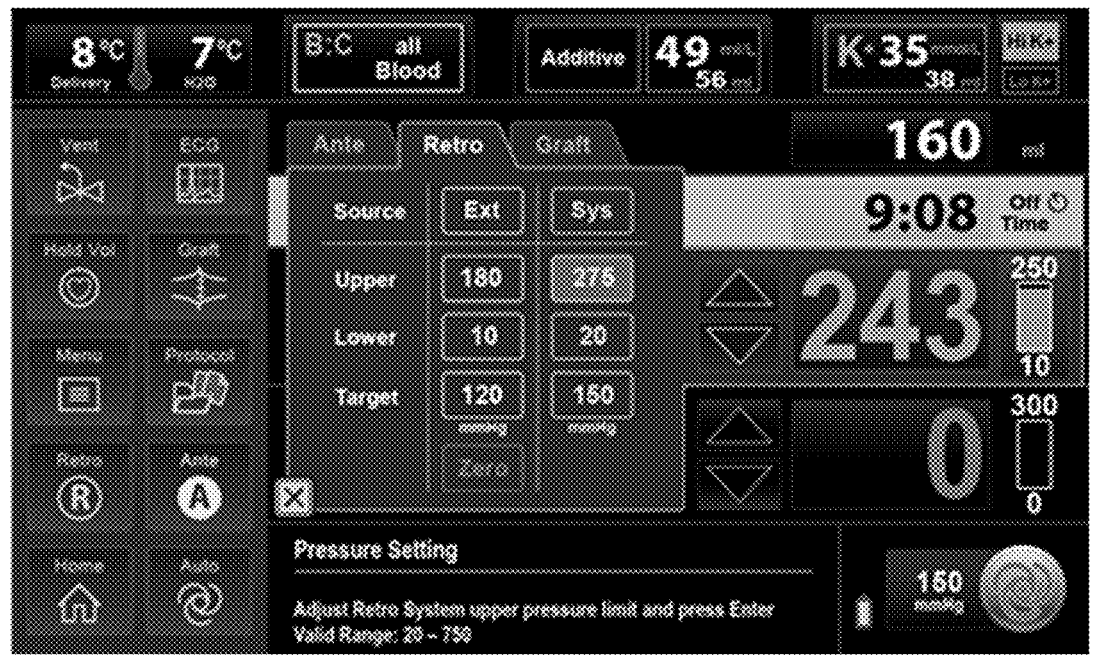
Figure 12C:
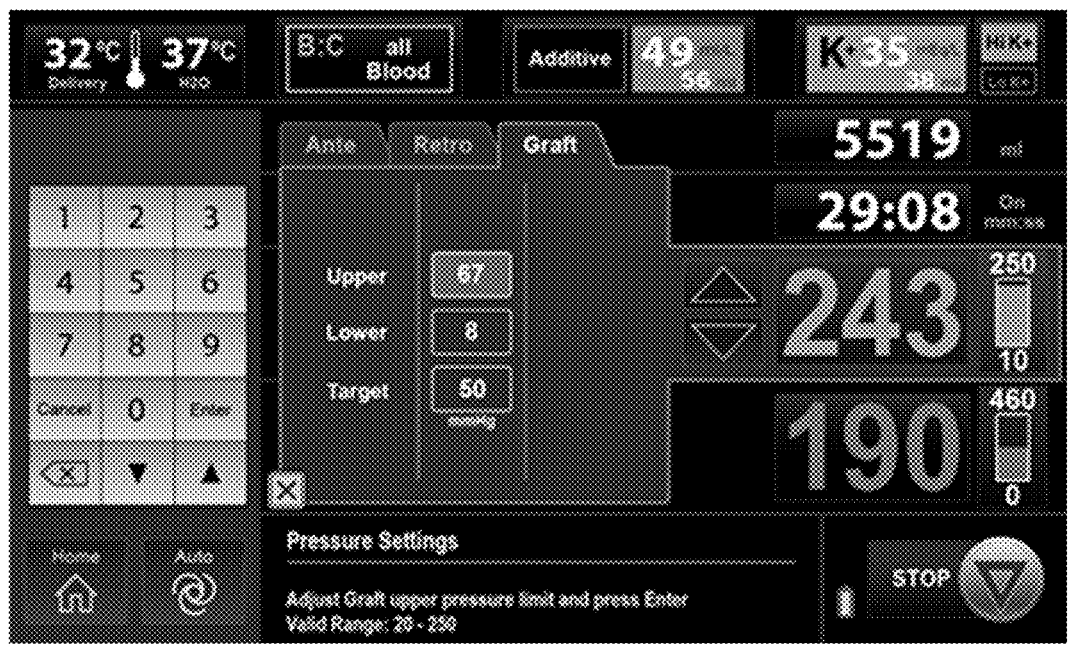

Regarding Delivery Pressure Settings, in an embodiment the system pressure is displayed. If the pressure source is selected as external, the corresponding external Antegrade or Retrograde pressure is displayed, and the system pressure is displayed with the 'Sys' label. The upper and lower pressure limits are displayed. To adjust either pressure limit, touch the limit and edit the value. As shown in FIG. 12A (ante pressure settings), 12B (retro pressure settings), and 12C (graft pressure settings) to set the pressure limits: Touch the Pressure display on the home screen. The Pressure Settings screen is displayed. Select the Antegrade, Retrograde or Graft tabs to select the respective pressure limits. Only one pressure source (System or External) can be selected at a given time. The Zero button is used to Zero the Antegrade or Retrograde External Pressure sensor. The following table summarizes the pressure limits for Antegrade, Retrograde and Graft modes. All are settable in increments of 1. The lower pressure limit maximum will be limited to 20 mm Hg less than the current upper pressure limit setting. The target pressure maximum will be limited to 20 mm Hg less than the current upper pressure limit.

| | Antegrade | | Retrograde | | |
| --- | --- | --- | --- | --- | --- |
| Source | System (mmHg) | External (mmHg) | System (mmHg) | External (mmHg) | Graft (mmHg) |
| Upper | 20-750 | 20-250 | 20-750 | 20-250 | 20-200 |
| Lower | 0-500 | 0-200 | 0-500 | 0-200 | 0-180 |
| Target | 20-700 | 20-200 | 20-700 | 20-250 | 20-180 |

Regarding time, in an embodiment the Time displays the On/Off time for the pump. The 'On Time' displays when the dose is delivering and 'Off Time' is displayed when not delivering. The Stopwatch Timer will be displayed in the 'On Time' display, if it is activated. Touch the 'Off Time' Time. It displays an "Add?" tab for three seconds. If the Add? tab is selected within the three seconds, the previous 'On' Time and the previous 'Off' time is added to the current 'Off' Time and the total 'Off' Time is displayed. This allows combining 2 doses that are separated by an unintentional pause.

Figure 13:
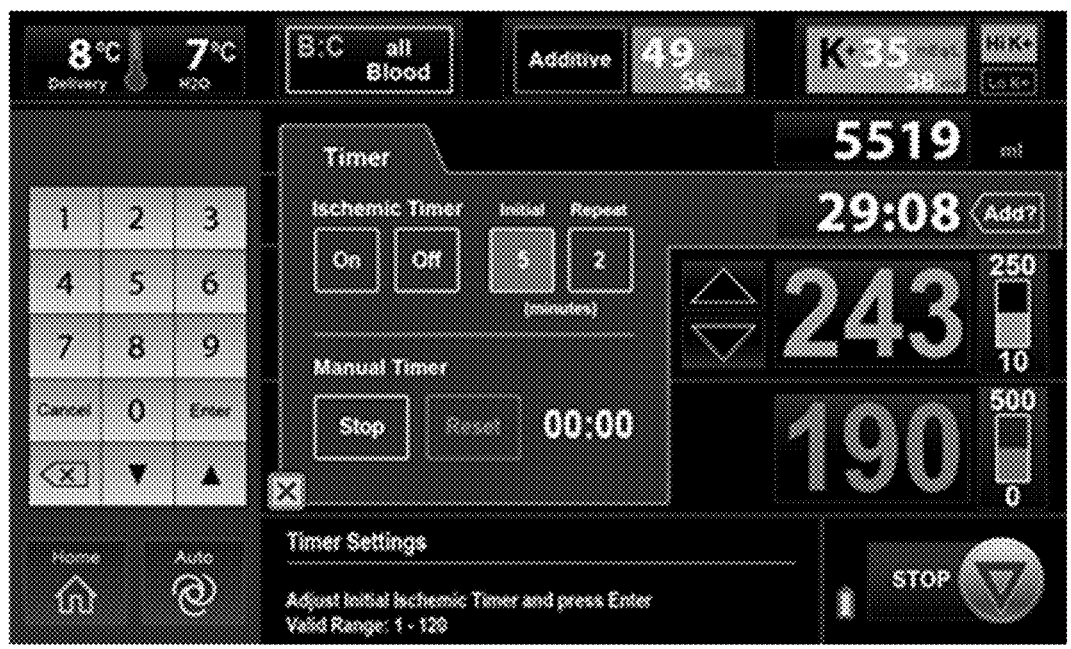

In an embodiment the Ischemic Timer (FIG. 13) gives the user the ability to be notified when a set period of non-delivery has elapsed. This notification is provided by an audible tone and by flashing the timer display. There are two different timers that can be set: The Initial Timer and the Repeat Timer. To set the Ischemic Timer: touch the Time display on the home screen and a delivery time setting screen displays. Use the numeric keypad to set the Initial and Repeat timer values in minutes. Use the On and Off buttons to turn the Ischemic Timer On or Off. The Initial and Repeat Timers have a range of 1 to 120 minutes in 1-minute intervals.

Regarding Volume, in an embodiment the Incremental Volume displays the total Cardioplegia volume (blood+crystalloid+arrest+additive) delivered during the current 'On' Time. When flow is stopped, the Incremental Volume display shall continue showing the incremental volume. If flow is resumed before Off Time displays, the Incremental Volume continues counting from the previous value. If flow is resumed after Off Time displays the counter resets to zero and starts counting.

Figure 14:
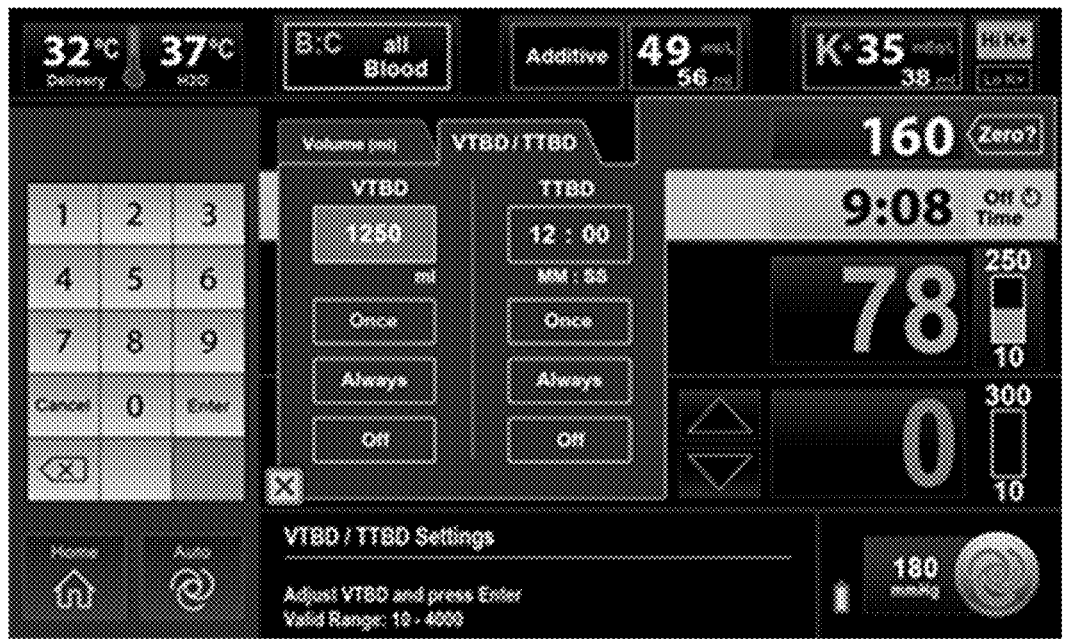

In an embodiment the VTBD button is used to set a specific volume to be delivered and the TTBD button is used to set a specific duration to deliver the cardioplegia to the patient. When the total specified volume/duration is delivered, the system automatically stops the flow. To set the VTBD/TTBD values: touch the Incremental Volume button on the Home Screen, touch the VTBD/TTBD tab, the VTBD/TTBD settings screen is displayed (FIG. 14), Set the VTBD and TTBD values.

| Button | VTBD | TTBD |
| --- | --- | --- |
| One Time | Delivers the set volume for a single dose | Delivers for the set duration for a single dose |
| Always | Delivers the set volume for every dose until the user cancels the VTBD mode. | Delivers for the set duration for every dose until the user cancels the TTBD mode. |
| Off | Turns Off VTBD | Turns Off TTBD |

Figure 15:
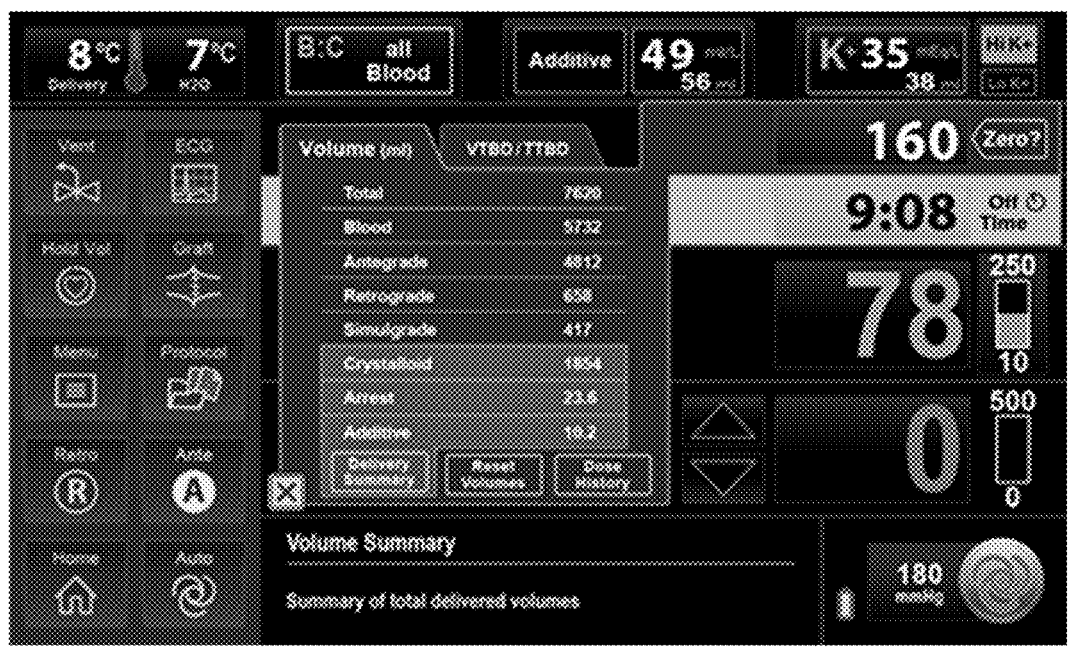
Figure 16:
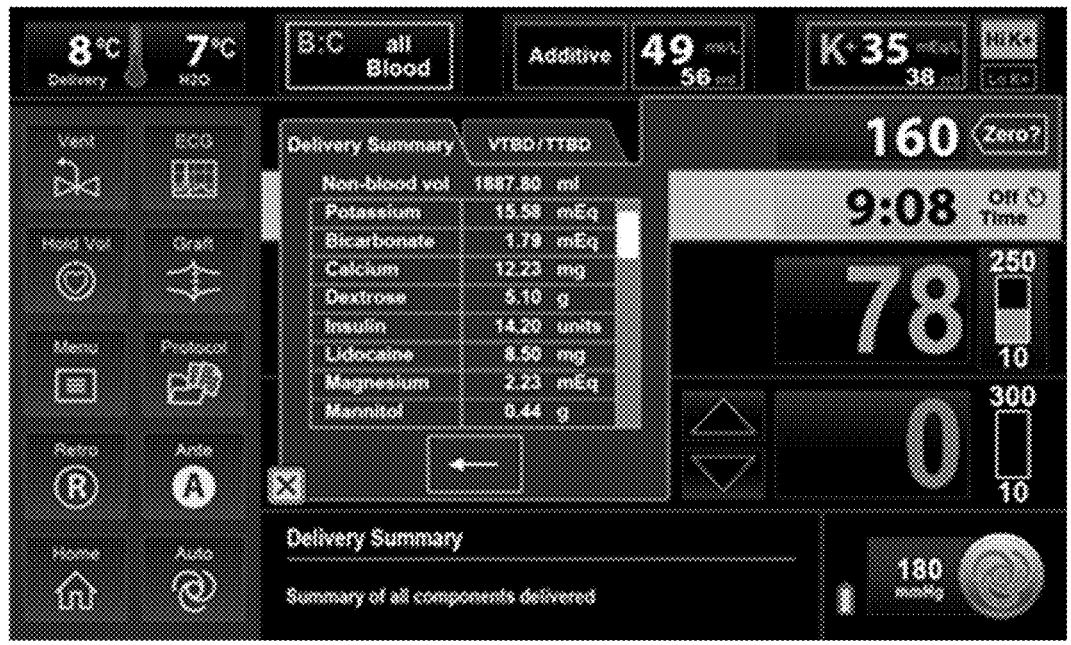

Regarding Volume Summary/Delivery Summary, in an embodiment the Total, Blood, Crystalloid, Arrest, Additive, Antegrade, Retrograde and Simulgrade volume counters shall be tracked and dynamically displayed to the user. Use the Reset Volumes button to reset all the counters to zero. When Flow=0, the Dose History button transitions to the Dose History screen for the current Dose. See FIG. 15 (volume summary) The Delivery Summary button is used to display the summary of all delivered components to the patient. First the total non-blood volume is displayed. This is the sum of crystalloid+arrest agent+additive volume delivered. Next, the total potassium delivered to the patient is displayed. This includes the potassium delivered by the arrest pump as well as the potassium delivered from additive and crystalloid solutions. Finally, all other volumes of delivered components in the additive and crystalloid solutions are displayed alphabetically. See FIG. 15 (delivery summary).

Figure 17:
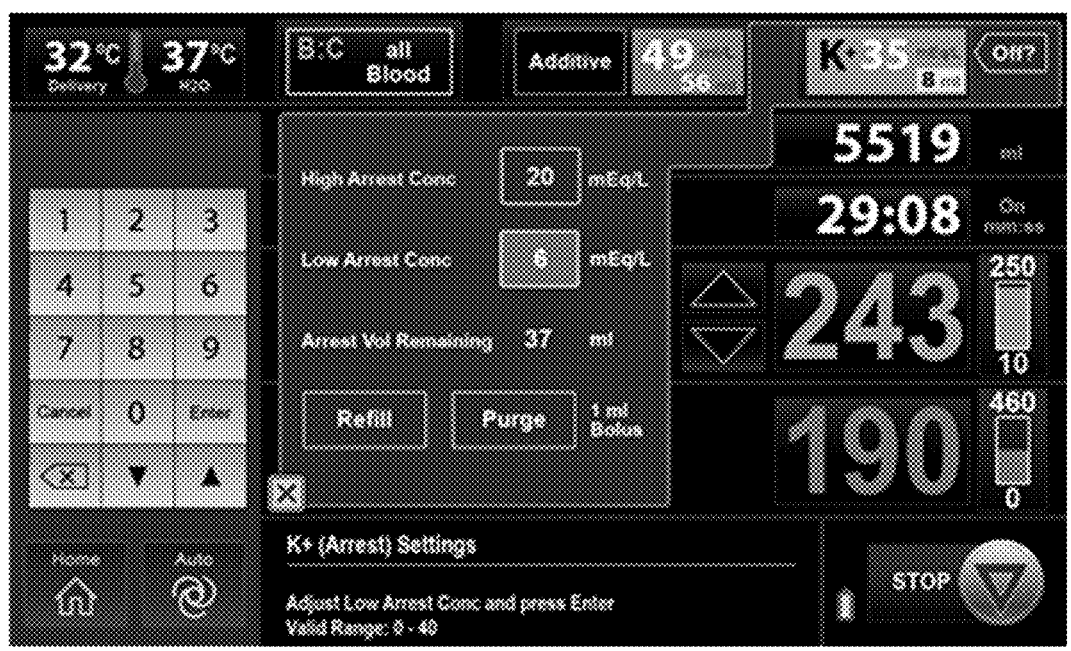

Regarding arrest agent, in an embodiment the system offers the capability to set two arrest agent delivery concentrations as High K+ and Low K+. The High/Low K+button allows the user to change between the two concentrations and also, when highlighted, indicates which concentration is displayed. The arrest agent concentration range is between 0 mEq/L to 40 mEq/L. To set arrest agent settings, touch button 8 on the Home Screen. The arrest agent Setting screen is displayed. The display has the solid-yellow look and the yellow LED on the Arrest pump is turned on to indicate to the operator that the arrest agent is being delivered. See FIG. 17. Touch the High Arrest Conc and Low Arrest Conc fields to modify the values. A numeric keypad is displayed to modify the values. The Arrest Volume Remaining displays the remaining arrest volume present in the Arrest cartridge. The volume is measured, and the value cannot be changed by the operator. When the volume remaining is <10 ml, it is highlighted in yellow. To refill or purge the Arrest agent, touch the Refill or Purge button.

Figure 18:
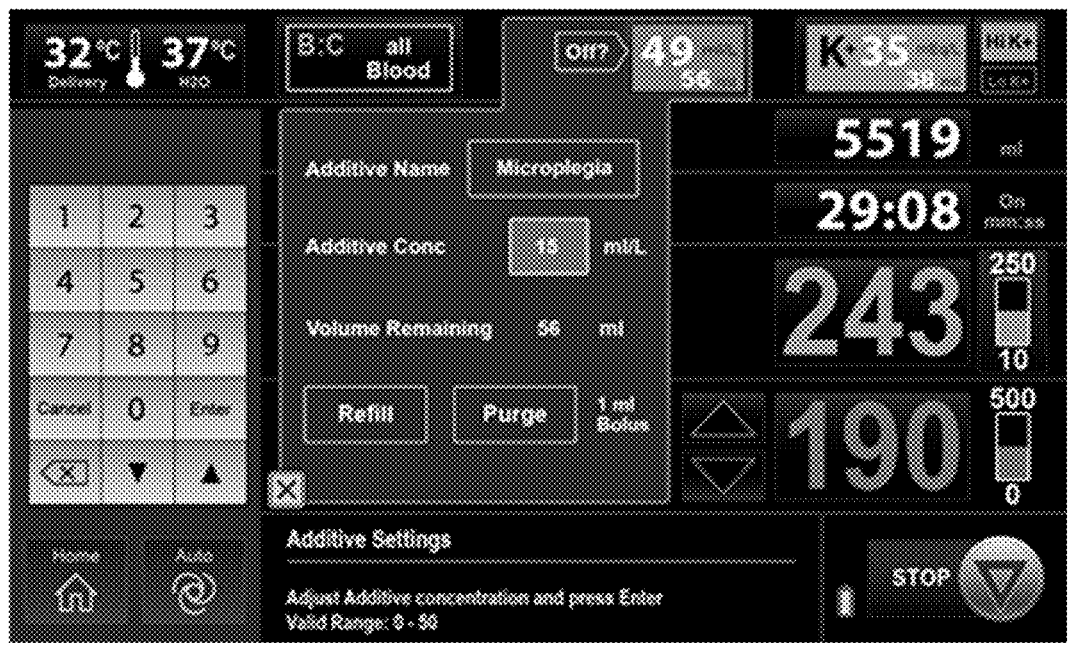

Regarding Additive, the system offers the capability to select the name of the additive and to set the delivery concentration. The additive concentration range is between 0 ml/L to 50 ml/L. To set additive settings, touch button 9 on the Home Screen. The Additive Setting screen is displayed. The display has the solid-green look and the green LED on the additive pump is turned on to indicate to the operator that the additive drug is being delivered. See FIG. 18. The user may touch the Additive Name. A list of previously created additive names is displayed. Select the desired additive drug/solution. Touch the additive concentration value. A numeric keypad is displayed to modify the value. The Volume Remaining displays the remaining additive volume present in the cartridge. The volume is measured and cannot be changed by the operator. When the volume remaining is <10 ml, it is highlighted in yellow. To refill or purge the additive, touch the Refill or Purge button.

Regarding Blood: Crystalloid, in an embodiment the system offers the capability to deliver blood and crystalloid in various ratios. In an embodiment, the available options are: All crystalloid (Cryst); Blood:Crystalloid Ratios of 1:9 to 1:1 and 2:1 to 66:1; All blood (Blood).

| Blood: Crystalloid Ratio | Percentage of Crystalloid |
| --- | --- |
| 20:1 | 4.8% |
| 21:1 | 4.5% |
| 24:1 | 4.0% |
| 27:1 | 3.5% |
| 32:1 | 3.0% |
| 39:1 | 2.5% |
| 49:1 | 2.0% |
| 66:1 | 1.5% |

Figure 19:
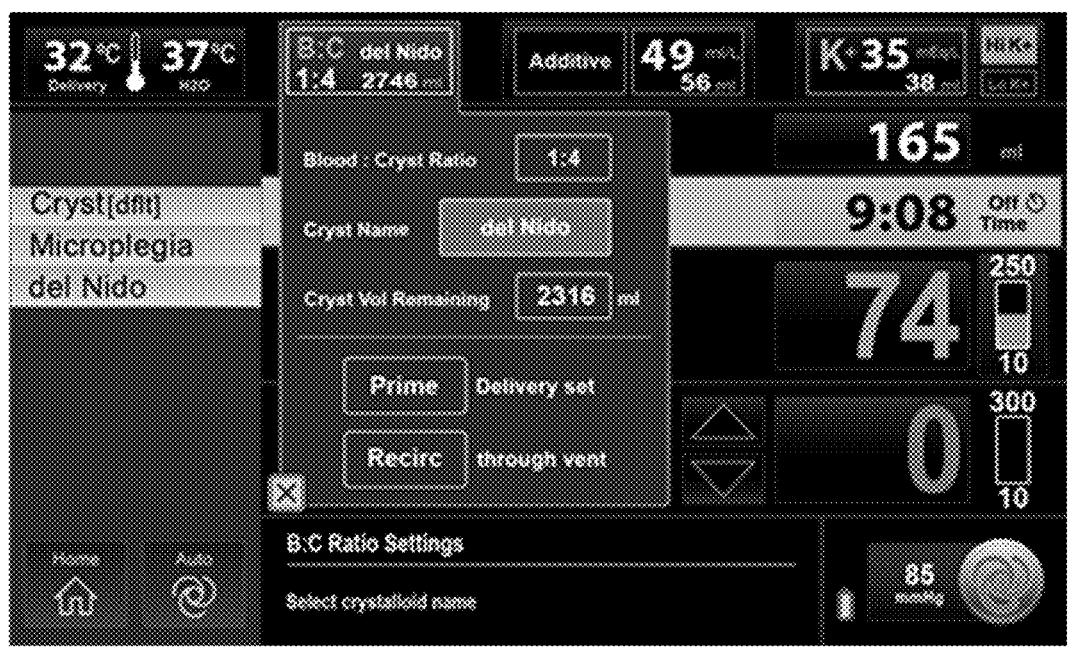

When the remaining crystalloid volume reaches zero, flow is stopped and the ratio is changed to 'all blood' after getting user confirmation. To set Blood:Crystalloid settings, touch button 10 on the Home Screen. The B:C Settings screen is displayed. See FIG. 19. Touch the Blood:Cryst Ratio value. A numeric keypad with commonly used ratios is displayed to set the ratio. Use the set knob for access to the full range of blood:crystalloid ratio settings. Touch the Cryst Name. A list of previously created crystalloid names is displayed. Select the desired crystalloid solution. The B:C ratio is automatically changed to the ratio that was saved when the crystalloid solution was created. The Cryst Volume Remaining displays the remaining crystalloid volume present in the crystalloid bag. The volume is calculated and can be changed by the operator at any time. When the volume remaining is <150 ml, it is highlighted in yellow. Prime and Recirc are allowed when flow is zero. Touch the Prime or Recirc button to initiate the Prime or Recirc processes.

Figure 20:
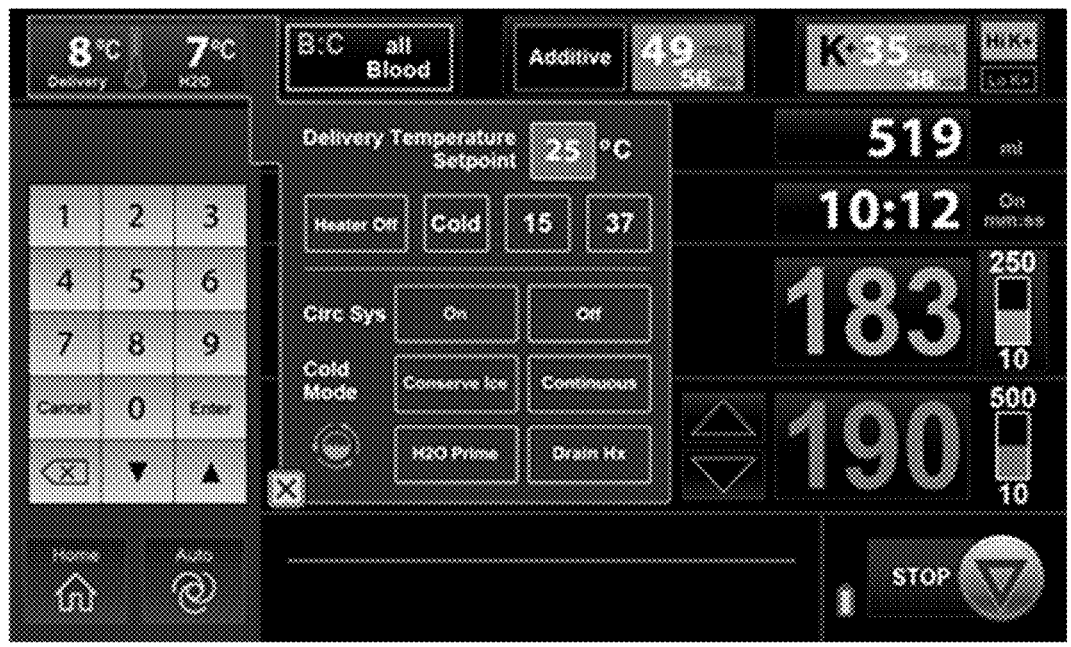

Regarding Temperature, in an embodiment the system offers the capability to set the temperature of the cardioplegia solution delivered to the patient. The delivery temperature as measured in the heat exchanger and the H2O temperature as measured in the water circuit path are displayed. The display shows the various circulation system conditions such as circulation system off, priming, heater diagnostics, heater disabled and temperature sensor error. To set temperature settings, touch button 11 icon on the Home screen. The temperature setting screen is displayed. See FIG. 20. Touch the temperature value. A numeric keypad is displayed to set the delivery temperature between 15 degrees C. and 39 degrees C. The heater off, Cold, Preset 1 and Preset 2 buttons may be used as shortcuts to set the desired value. The circulation system may be turned On or Off by using the Circ On and Off buttons. The Cold Mode may be set to "Conserve Ice" or "Continuous". In Conserve Ice mode, water is not circulated through the external reservoir when cardioplegia flow is stopped. In Continuous mode, water is always circulated through the external reservoir. The "Drain Hex" button may be used at the end of the case to drain the water in the heat exchanger to prevent dripping during removal. H2O Circ has to be turned Off to enable the Drain Hex button. The "H2O Prime" button may be used to prime the H2O Circulation system. This is needed to eliminate any air that might be trapped in the circulation system. The Circ flow icon (adjacent the H2O Prime button) conveys the health of the water circulation flow. The green icon is displayed when the water flow is healthy. A gray icon is displayed if the water flow is suboptimal.

The home screen (FIG. 10A) shows various Function buttons including: Vent, ECG, Hold Volume, Graft, Menu, Protocol, Retro, Ante, Home, Auto.

Regarding the vent function button, in an embodiment the operator can purge air from the bubble trap by selecting the Vent button. The system opens the vent valve 117 instead of the delivery valve. Any air that is trapped in the heat exchanger bubble trap can now be purged via the vent line. The system controls ratios and temperature but does not deliver Arrest or Additive drugs in Vent mode. During normal delivery, the vent valve will automatically open when air is detected in the bubble trap. The vent valve will stay open as long as air is sensed. If the vent valve stays open for an extended period of time, the message "Vent valve is open. Check for Air in the bubble trap. Ensure the heat exchanger is locked" displays. Touch Confirm if there is air in the heat exchanger bubble trap. The pump console continues to flow with the vent valve open.

Figure 21:
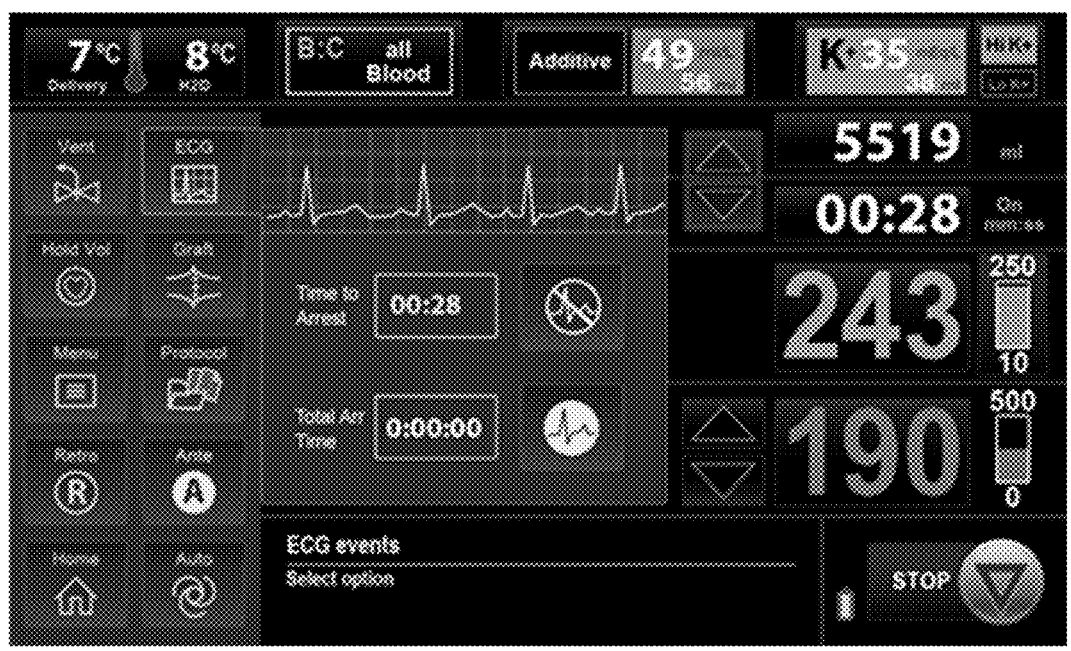

Regarding the ECG function button, in an embodiment to view the ECG trace, connect the controller to the ECG Monitor using the ECG cable. This option allows the operator to view the ECG strip chart. To view the ECG chart, touch the ECG button in the home screen. The ECG icon turns yellow and the ECG strip chart is displayed. The DC baseline Shift increment and decrement buttons can be used to shift the baseline of the ECG trace in the strip chart. Touching the ECG chart displays the ECG Event screen. The Time to Arrest Counter displays the current 'On Time'. When the Arrested button is pressed and confirmed, the Time To Arrest value freezes and is recorded. The Total Arrest Time counter also starts counting. When the Restarted button is pressed, the user has to select if the heart restart was Spontaneous or Defibrillated. See FIG. 21.

Regarding the "Hold Volume" function button, in an embodiment the Hold Vol button indicates the Hold Volume mode is active/inactive. When activated the Hold Vol icon flashes yellow. The incremental volume stops counting and the Off timer starts counting (even if flow >0). The Air inline sensor is deactivated. This mode is recommended when priming the extension line or when purging air bubbles down the delivery line.

Figure 22:
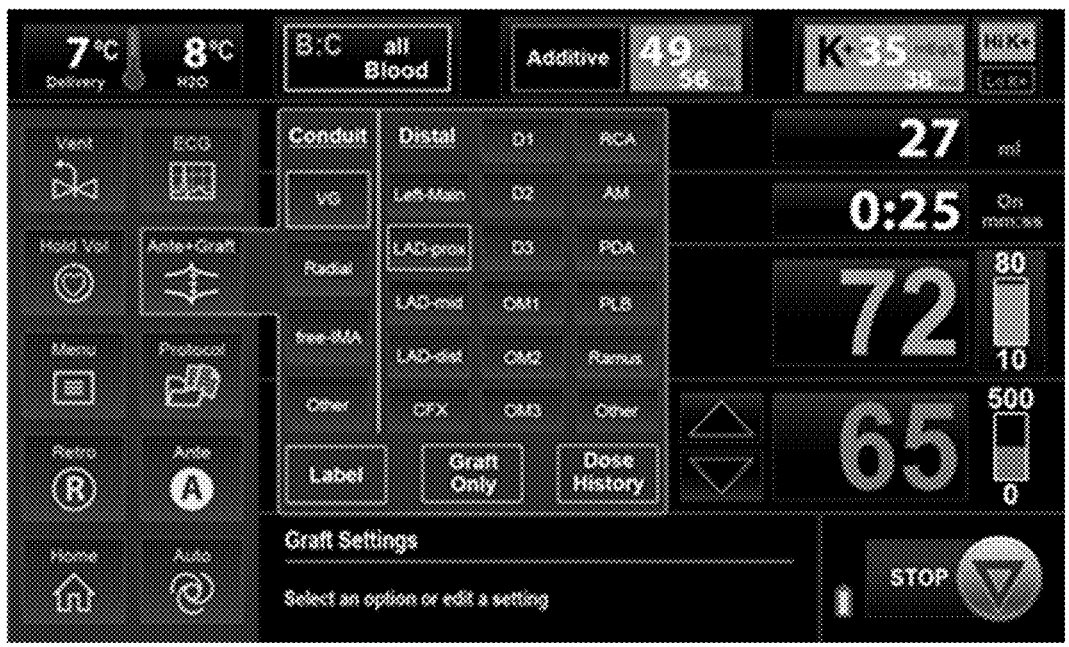

Regarding the "Graft" function button, in an embodiment the Graft button is used to activate the Graft mode and to label the Graft. Touch the Graft button to activate Graft mode and to display the Graft settings screen. The label changes to 'Ante+Graft' or 'Retro+Graft' as the case may be. See FIG. 22. Select a Conduit label and a Distal label(s) and then touch the label button. This creates a new Dose Record with the selected labels shown in the label field. When the Graft Only button is selected, the Graft pressure limits are activated and the label changes to 'Graft Only'.

Figure 23:

Regarding the "Protocol" button, in an embodiment the Protocol displays the protocol name, if a Protocol was selected. An asterisk '*' next to the name indicates that one or more parameters have been modified from the original Protocol. Operator can modify the protocol parameters by touching the protocol name or can select a new protocol from the existing protocol list. Selecting the Launch button when flow rate=0, launches the Protocol. To go to the Protocol Manager, touch the Protocol Mgr button (when flow rate=0). See FIG. 23.

Regarding the Ante/Retro function buttons, in an embodiment cardioplegia can be delivered in one of three delivery routes: Antegrade, Retrograde, Simulgrade. The delivery route is selected by pressing button(s) 16 from the Home Screen. When a delivery route is selected, the button is highlighted in yellow. Selecting a delivery route implements the pressure limits set up for that route. When flow is initiated with Single Line selected, the system only opens the Antegrade valve (121). If Double Line is selected, the system opens the Antegrade valve when Antegrade is selected or the Retrograde valve (117) when Retrograde or Simulgrade is selected. The Simulgrade delivery route is selected by holding down (long press) the Antegrade or Retrograde button. When activated, both the A and R buttons are highlighted and the retrograde pressure limits are displayed.

Regarding the Auto Mode and Auto-Start Mode, in an embodiment the auto mode feature provides constant pressure cardioplegia delivery. To activate Auto mode, the operator first adjusts the flow rate to achieve the desired delivery pressure and then touches the Auto button. The system calculates the flow rate limits and automatically increases/decreases the cardioplegia flow within these limits to maintain the selected delivery pressure.

Auto-Start mode is also a constant pressure delivery mode where the flow is automatically ramped up from zero until the target pressure is reached and then the system automatically increases/decreases the flow rate to maintain the Target pressure. To activate the Auto-Start mode, first ensure that the mode is Enabled in the Flow Settings screen. Press and hold the Auto-Start button on the Home screen when flow is zero to activate Auto-Start mode. This is a safety factor to prevent accidental activation. Auto-Start is only allowed in Antegrade delivery mode. The target pressure value is displayed in the Auto-Start button. The Auto-Start button is disabled when VENT mode is activated. The Target pressure displays an Increment button and a Decrement button. The Target pressure can be adjusted by using the increment and decrement buttons. During Auto or Auto-Start mode, the upper and lower flow limits are displayed. The upper flow limit is twice the flow rate value when Auto mode is touched or when target pressure is reached. The system exits auto mode when the Auto or Stop button is pressed or the flow is adjusted using the flow knob.

Attention now turns towards disposables. In an embodiment a setup sequence prepares the system to deliver cardioplegia to the patient. During setup, the operator will install the system, fill the disposable components, set the delivery parameters, and prime the system. In an embodiment, a standard Delivery Set (i.e., a kit) consists of at least one or more of the following: Heat Exchanger, Blood: Crystalloid Cassette, Blood Source Line, Crystalloid Source Line with I.V. Spike, Vent Line, Extension line, arrest agent Cartridge, Additive Cartridge.

Figure 3:
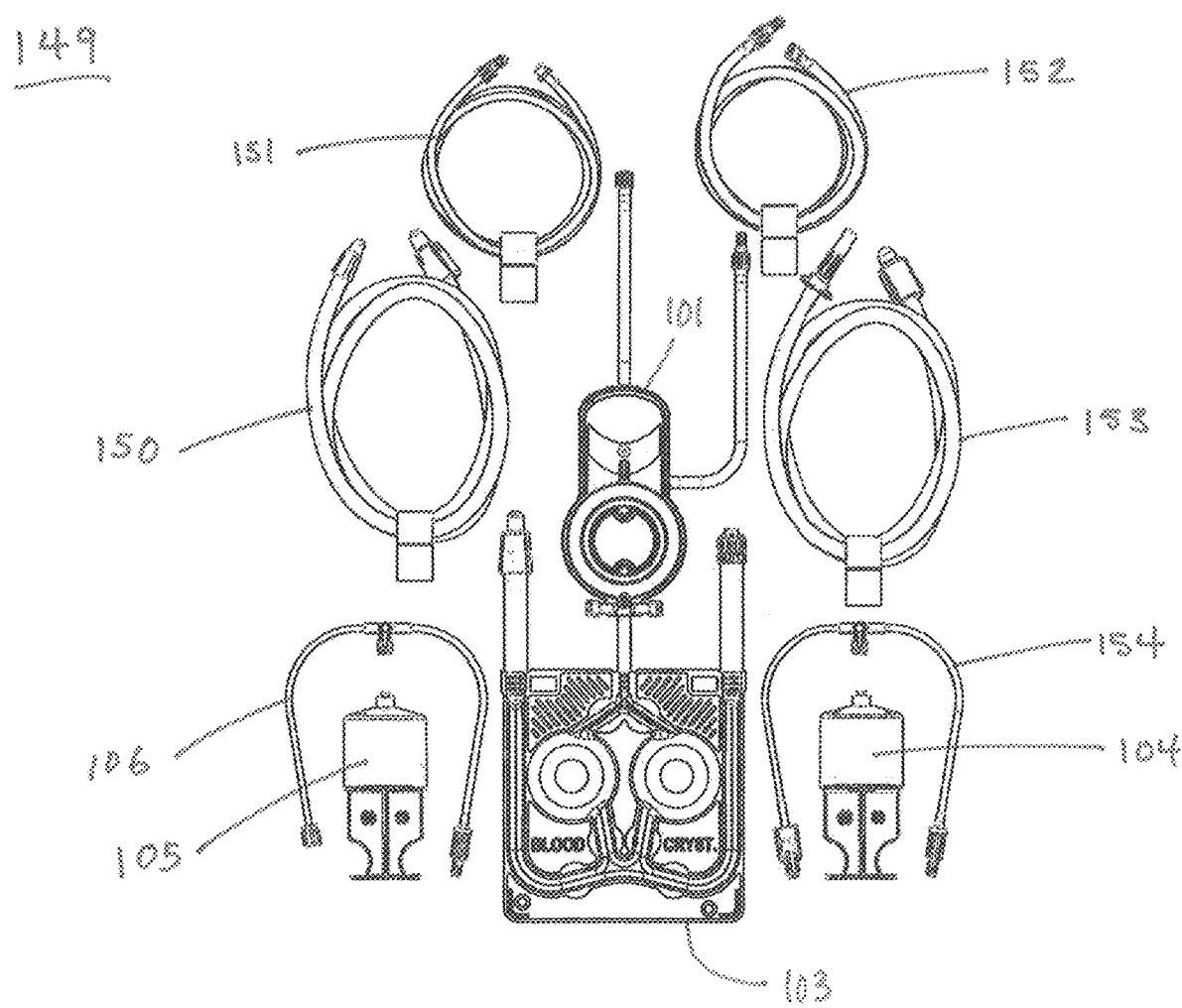
FIG. 3 provides a kit of disposables in an embodiment.
Figure 4:
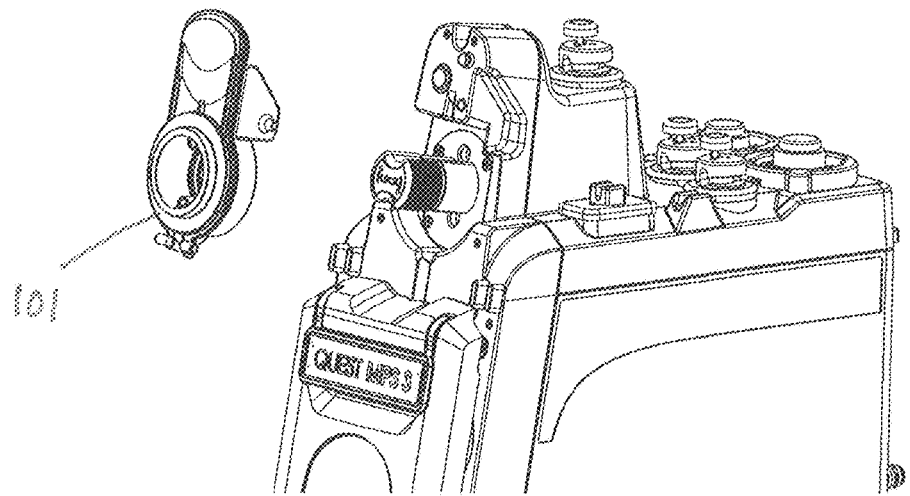
FIGS. 4 and 5A depict loading a heat exchanger onto console in an embodiment.
Figure 5A:
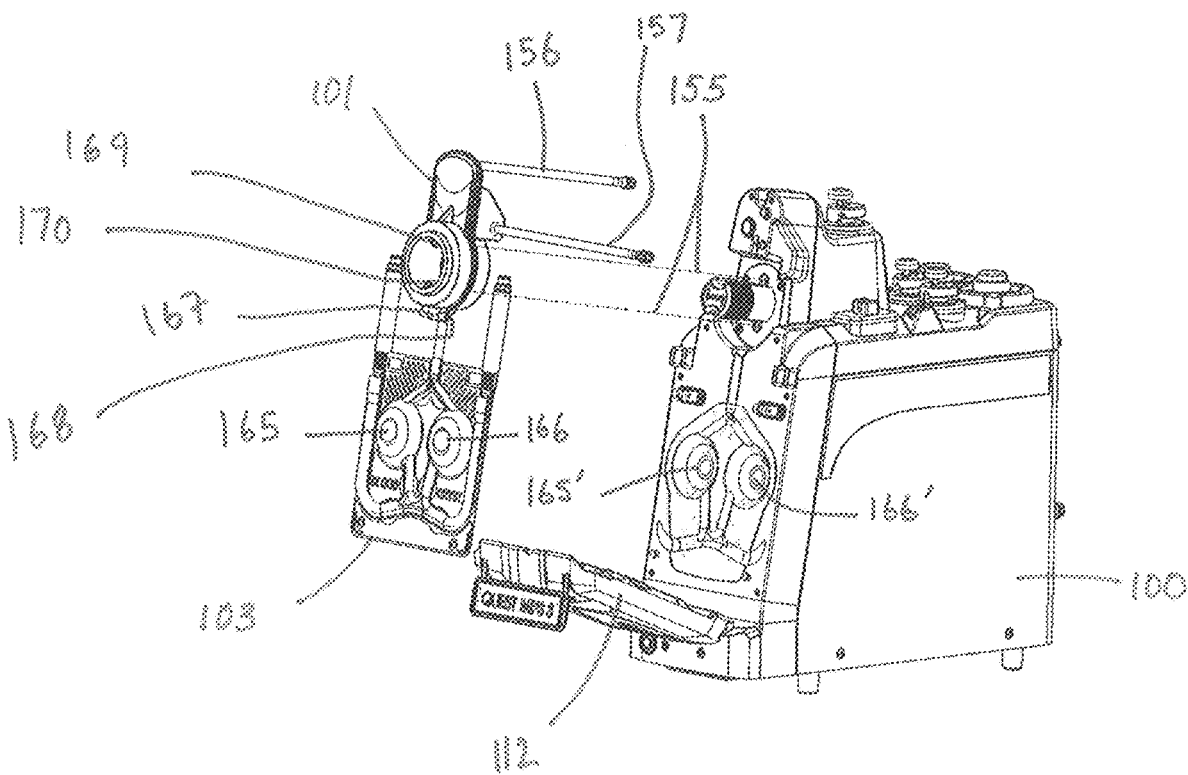
Figure 5B:
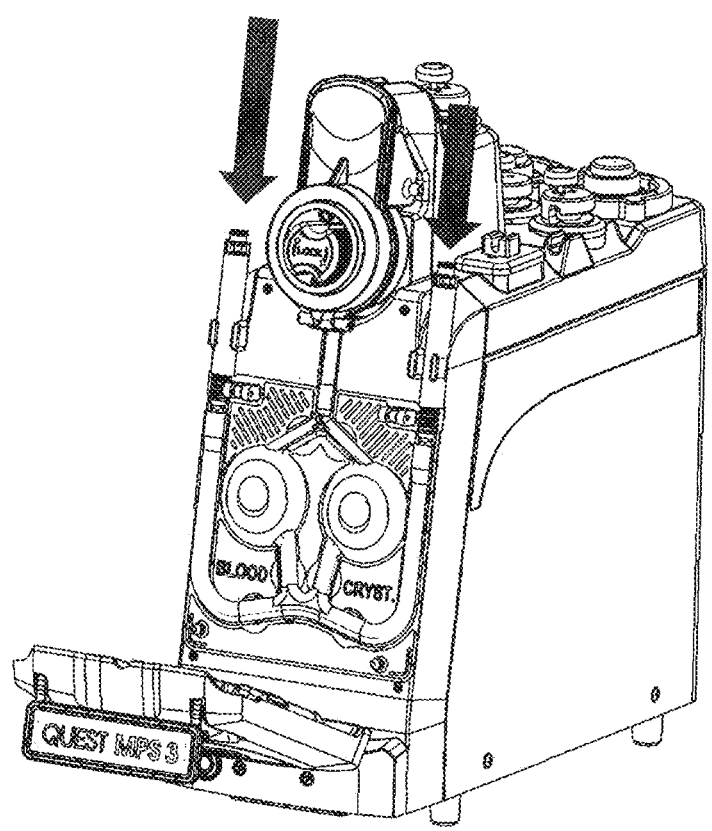
FIG. 5B depicts entry ports for fluids in an embodiment.

To install the HEX, turn the console power switch off and then on to ensure the pump pistons are retracted. Open the door (FIG. 5A) to reveal the pumping chambers. Verify the heat exchanger locking knob is in the proper position to secure either the 10 or 16 convolution heat exchanger. To put the knob in the 10-convolution position, push in on the knob and rotate clockwise until the knob will no longer turn. To put the knob in the 16-convolution position, push in on the knob and turn counterclockwise until the knob will no longer turn. Verify the knob is unlocked (rotate Counter Clockwise). Using proper technique, open the outer tray, remove the extension line, source lines, drug cartridges and drug lines and set aside. See above description regarding FIG. 3. With one hand, grasp the heat exchanger bubble trap and remove the heat exchanger and blood/crystalloid cassette from the tray. To ensure proper installation when installing the heat exchanger, allow the blood/crystalloid cassette to lay inside the door over the pump chambers. The words "Blood" and "Cryst" should be in the correct orientation facing the operator. See FIG. 5A. With the cassette oriented properly in the door, place the vent line from the heat exchanger through the vent line channel on the top of the console so the vent line tubing may pass through the vent valve. With the bubble trap oriented upwards, insert the two water ports of the heat exchanger into the two water ports 155 on the console. While applying pressure to the heat exchanger, turn the knob clockwise to lock the heat exchanger in position. Once the knob is locked, the water port seals and bubble trap sensor interface will automatically engage with the console. Route the vent line 156 through the vent valve 117 on the console (FIG. 6) by pressing down on the vent valve manual operation button. Ensure tubing is not overstressed or kinked upon installation Installing the Blood/Crystalloid Cassette: Secure the blood/crystalloid cassette by firmly seating the cassette over the two bottom pins and door latches. Route the blood and crystalloid inlet tubes through the tubing clamps located on the console and carefully close the door. Connect the blood source line (red covers) to the blood inlet tubing (see arrow on left in FIG. 5B) and route the tubing along the top of the console using the tubing clamps on the console. If necessary, remove the cap and connect the crystalloid source line (see arrow on right in FIG. 5B) to the crystalloid inlet tubing and route the tubing along the top of the console using the tubing clamps on the console.

Connecting the Delivery Set to the Extracorporeal Circuit: Connect the blood source to the cardioplegia outlet on the oxygenator. If necessary, insert the spike on the crystalloid line into the crystalloid bag and hang the bag. The crystalloid bag may hang at least 3 feet (1 m) above the pumping chamber to ensure adequate pressure is supplied to fill the pump. Route the delivery line 157 from the heat exchanger through the air in line detector 122 and antegrade delivery valve (121). To open the valve, press down firmly on the manual button and hold while inserting the tubing. Uncoil the vent line and attach the luer connector to the non-pressurized luer port of the cardiotomy reservoir. Following catheterization, connect the extension line to the delivery catheter.

Figure 7:
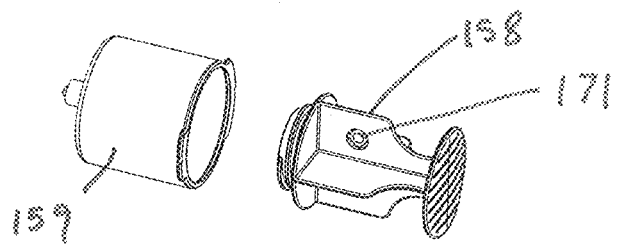
FIGS. 7, 8A, 8B depicts disposables in an embodiment.
Figure 9A:
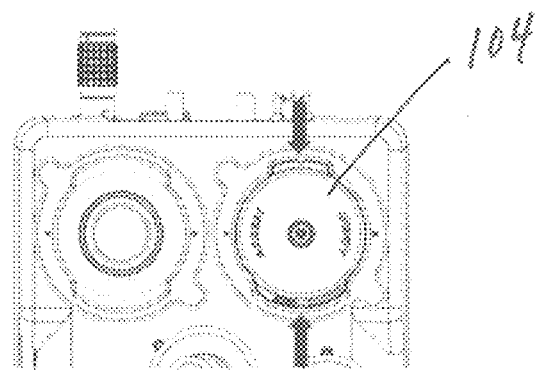
FIGS. 9A, 9B, 9C, 9D depict installing disposables in an embodiment.
Figure 9B:
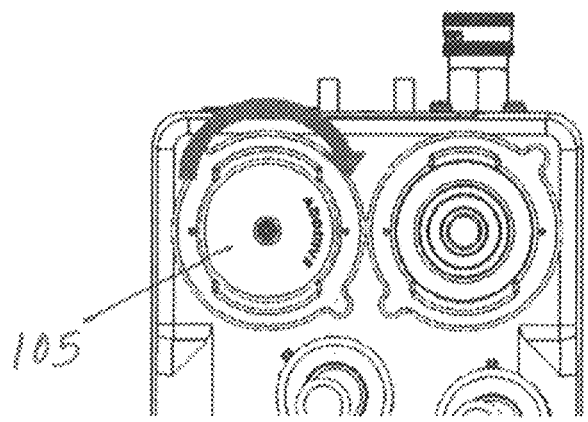
Figure 9C:
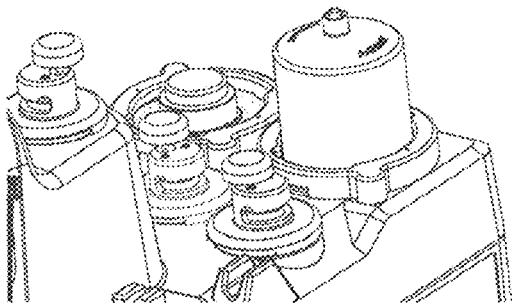

Installing and Filling the arrest agent Cartridge: the plunger 158 includes threads to mate with a movable seal (not visible in FIG. 7) included in barrel 159. Ensure the plunger tip is fully inserted to the end of the arrest agent Cartridge barrel by pushing the plunger into the cartridge (to evacuate air from barrel). Remove the plunger by unscrewing it in a counter clockwise motion (leaving the seal deep within barrel). Align the two flanges 160, 161 on the Arrest Cartridge with the matching features on the Arrest Pump on the console. See FIG. 9A. Insert the Arrest Cartridge into the Arrest Pump and turn clockwise 90° to lock into the pump. See FIG. 9C. Confirm the Arrest Cartridge is properly installed by verifying its detection on the controller. Connect the Yellow stopcock Arrest Cartridge Delivery Line 154 (stopcock is located midway on length of line 154) with the non-standard luer fitting attaching to the Arrest cartridge and the check valve fitting to the heat exchanger. Connect the filling syringe to the fill port of the yellow stopcock and turn the handle to the fill position. Carefully fill the Arrest cartridge by moving the solution from the filling syringe to the Arrest Cartridge. Disconnect the filling syringe from the stopcock and turn the stopcock handle to the delivery position. During the console setup procedure, set the desired high and low arrest agent delivery concentrations between 0 and 40 mEq/L of cardioplegia solution. When fully installed line 154 couples container 104 to one of ports 167, 168.

Figure 9D:
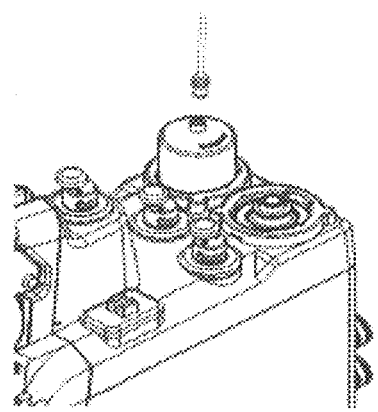

Installing and Filling the Additive Cartridge: ensure the plunger tip is fully inserted to the end of the arrest agent cartridge barrel by pushing the plunger into the cartridge. Remove the plunger by unscrewing it in a counter clockwise motion. Align the two flanges on the additive cartridge with the matching features on the additive pump on the console. See FIG. 9B. Insert the additive cartridge into the additive pump and turn clockwise 90° to lock into the pump. Confirm the additive cartridge is properly installed by verifying its detection on the controller. Connect the green stopcock of Additive Cartridge Delivery Line 106 (stopcock is located midway on length of line 106) with the standard luer fitting attaching to the additive cartridge (FIG. 9D) and the check valve fitting to the heat exchanger. Connect the filling syringe to the fill port of the green stopcock and turn the handle to the fill position. Carefully fill the additive cartridge by moving the solution from the filling syringe to the Cartridge. Disconnect the filling syringe from the stopcock and turn the stopcock handle to the delivery position. The coupler for the additive pump allows either the arrest or additive cartridge to be loaded. During the console setup procedure, set the desired additive delivery concentration between 0 and 50 ml/L of cardioplegia solution. When fully installed line 106 couples container 105 to another of ports 167, 168.

Figure 24:
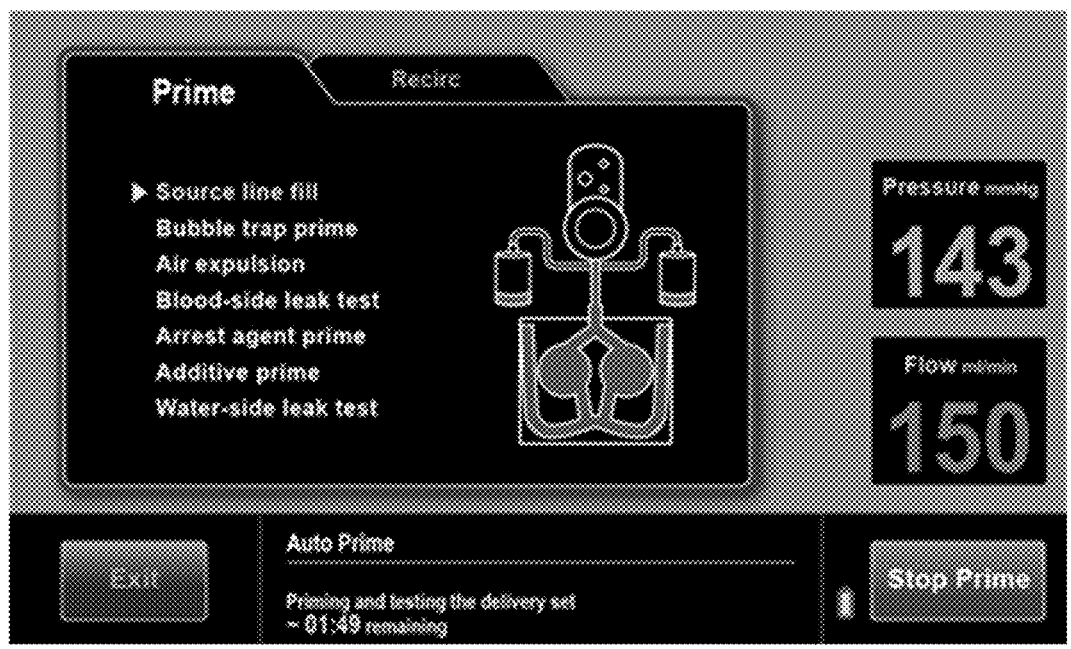
Figure 25:
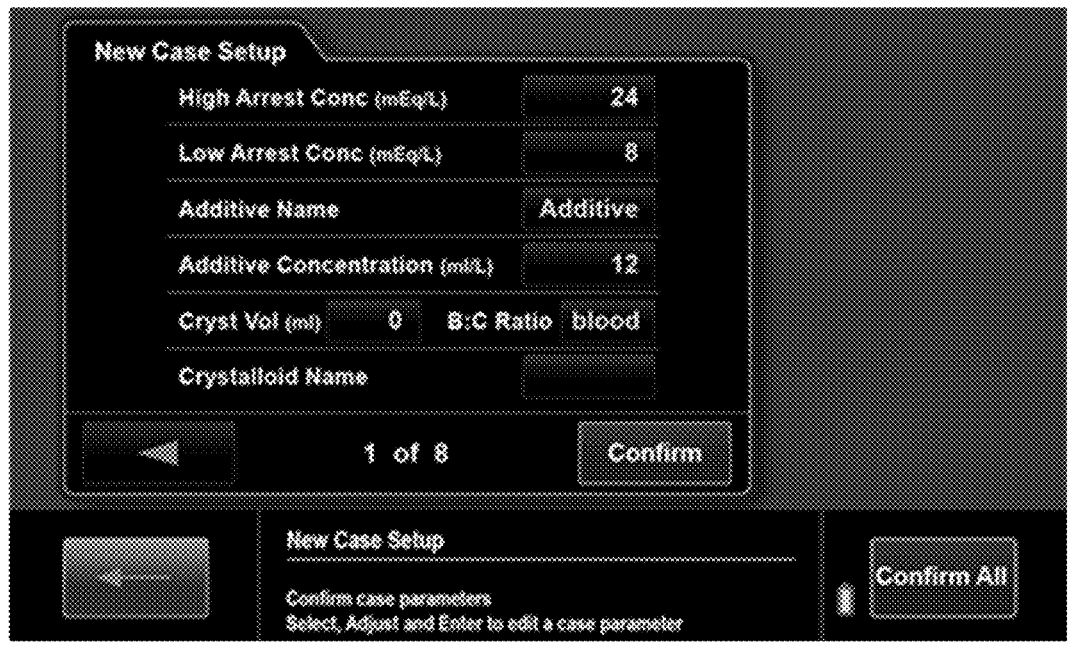
Figure 26:
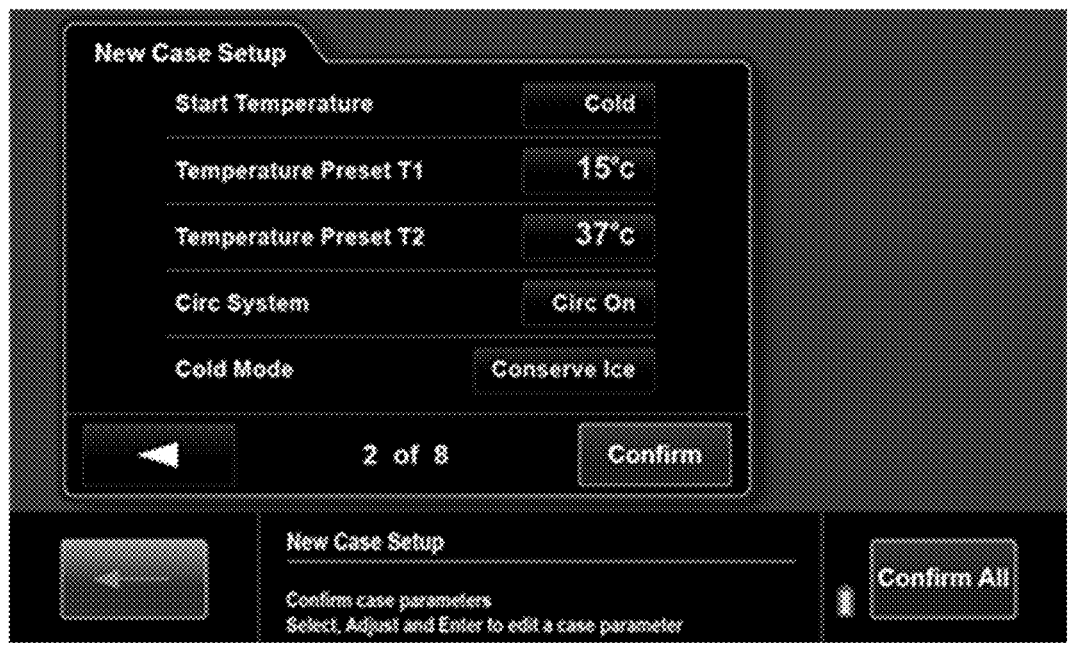
Figure 27:
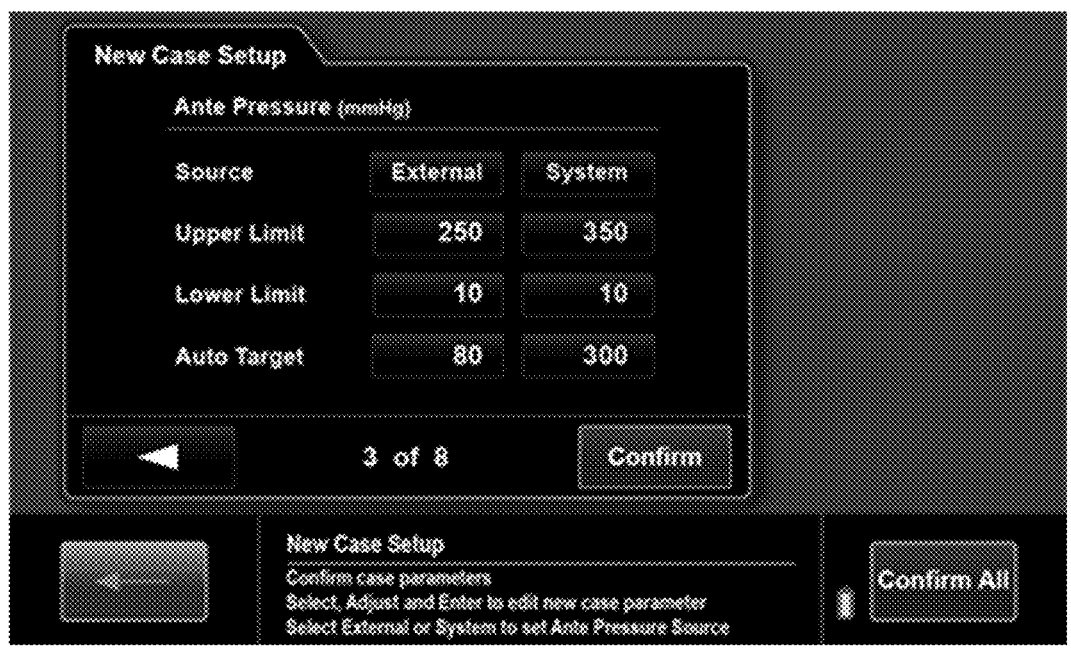
Figure 28:
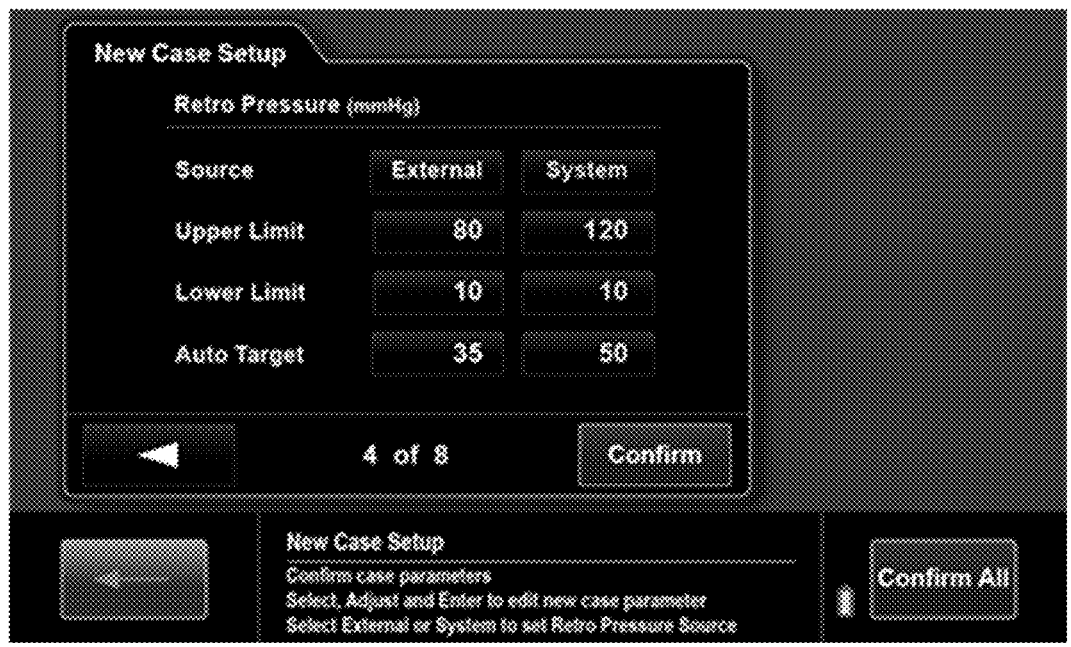
Figure 29:
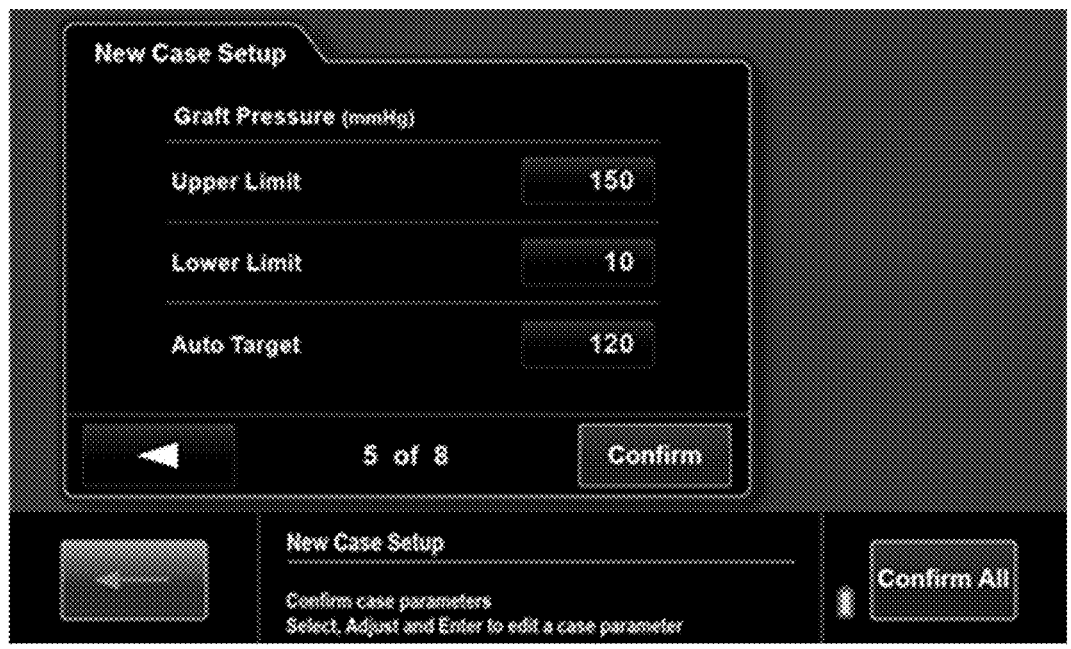
Figure 30:
Figure 31:

Priming and Recirculation: prior to delivering cardioplegia, the delivery set may be primed to remove all air in the delivery set and the drug cartridges. After the disposable is loaded, the system is powered on, and case parameters have been entered, the system is ready to perform the priming sequence. On completion of prime the operator has the option to recirculate fluid through the Vent Valve. When an operator presses the Prime button, the system initiates the priming sequence. During the automatic priming sequence, the system circulates just enough cardioplegia solution to clear air bubbles in the delivery line. At the completion of the auto priming sequence, the manual recirculation mode screen displays. Prior to starting the priming process, the arrest agent and additive cartridges must be filled. If a cartridge is not detected, a message is displayed giving the operator an option to disable the specific pump or retest. To start the Auto Prime sequence, follow the steps outlined below: touch the Prime button on the New Case Setup screen and a start prime screen displays. Touch the Start Prime button on the Prime screen, and the Auto Prime sequence will initiate. See FIG. 24. During the Auto Prime process, the following operations are performed: Source line fill, Bubble trap prime, Air expulsion, Blood-side leak test, Arrest agent prime, Additive prime, Water-side leak test. The approximate time to complete the priming operation is 1:50 minutes and the remaining time is displayed in the screen. When the Auto Prime sequence is complete, the operator has the option to recirculate through the delivery set by adjusting the flow knob. During recirculation mode (Recirc) the system switches to all blood mode and recirculates the solution through the vent valve to the cardiotomy reservoir. To perform Recirc set the flow rate by adjusting the flow knob. When finished, adjust the flow knob to zero and touch the Done button to go to the Home screen.

Attention now turns to functional use of the system.

When an operator touches a New Case option from the Selection screen, the system allows operator to review and edit the case parameters and start a new case. The New Case Setup screen allows the operator to select case parameters to be used in setting up the new case. To enter the New Case Setup menu, press the New Case button on the Selection Screen. In an embodiment, two options are available: User Defaults, An Existing Protocol.

User Defaults allows the operator to setup the new case parameter using the default values. The default values are saved in memory and displayed for editing or conformation during the setup sequence. In the New Case Setup screen press Defaults to select user default values. The operator can customize the parameters in setting up the current case. Use the Confirm button to confirm the displayed case parameters. Use Confirm All button to accept all the parameters and go directly to the Auto Prime screen. See FIGS. 25-31. The following table summarizes, in an embodiment, the New Case parameters that can be set by the operator during each new case setup.

| Item | Parameter Name | Description | Minimum Value (Range) | Maximum Value (Range) | Factory Default Value |
|---|---|---|---|---|---|
| 1 | High Arrest Conc (mEq/L) | High arrest agent delivery concentration | 0 | 40 | 24 |
| 2 | Low Arrest Conc (mEq/L) | Low arrest agent delivery concentration | 0 | 40 | 10 |
| 3 | Additive Name | Name of Additive solution | NA | NA | Additive |
| 4 | Additive Concentration (ml/L) | Additive Concentration | 0 | 50 | 2 |
| 5 | Blood: Cryst Ratio | Blood to crystalloid ratio | Blood, 66:1, 49:1, 39:1, 32:1, 27:1, 24:1, 21-2:1, 1:1, 1:2-9, Cryst | | Blood |
| 6 | Cryst Bag Volume (ml) | Crystalloid bag volume | 0 | 3000 | 1000 |
| 7 | Start Temperature | Start Temperature | Cold, T1,T2 | | Cold |
| 8 | Temperature Preset T1 | Temperature Preset T1 | Off, 15-39 | | 15 |
| 9 | Temperature Preset T2 | Temperature Preset T2 | Off, 15-39 | | 37 |
| 10 | Circ System | Water circulation | On, Off | | On |
| 11 | Cold Mode | Cold mode | Conserve Ice, Continuous | | Conserve Ice |
| 12 | Ante Source | Pressure source for Antegrade | External, System | | System |
| 13 | Ante Ext Upper Limit | Ante Ext Pressure upper limit | 20 | 250 | 100 |
|  | Ante Sys Upper Limit | Ante Sys Pressure upper limit | 20 | 750 | 350 |
| 14 | Ante Ext Lower Limit | Ante Ext Pressure lower limit | 0 | 200 | 10 |
|  | Ante Sys Lower Limit | Ante Sys Pressure lower limit | 0 | 500 | 25 |
| 15 | Ante Ext Auto Target | Ante Ext Target Pressure for auto flow mode | 20 | 200 | 50 |
|  | Ante Sys Auto Target | Ante Sys Target Pressure for auto flow mode | 20 | 700 | 200 |
| 16 | Retro Source | Pressure source for Retro | External, System | | System |
| 17 | Retro Ext Upper Limit | Retro Ext Pressure upper limit | 20 | 250 | 50 |
|  | Retro Sys Upper Limit | Retro Sys Pressure upper limit | 20 | 750 | 200 |
| 18 | Retro Ext Lower Limit | Retro Ext Pressure lower limit | 0 | 200 | 10 |
|  | Retro Sys Lower Limit | Retro Sys Pressure lower limit | 0 | 500 | 25 |
| 19 | Retro Ext Auto Target | Retro Ext Target Pressure for auto flow mode | 20 | 250 | 30 |
|  | Retro Sys Auto Target | Retro Sys Target Pressure for auto flow mode | 20 | 700 | 150 |
| 20 | Graft Upper Limit | Vein Graft Pressure upper limit | 20 | 200 | 100 |
| 21 | Graft Lower Limit | Vein Graft Pressure lower limit | 0 | 120 | 10 |
| 22 | Graft Auto Target | Vein Graft Target Pressure for auto flow mode | 1 | 200 | 60 |
| 23 | VTBD Volume (ml) | VTBD volume | 10 | 4000 | 1000 |
| 24 | VTBD Mode | VTBD mode | Once, Always, Off | | Off |
| 25 | TTBT Time (min) | TTBD time | 1:00 | 15:00 | 4:00 |
| 26 | TTBD Mode | TTBD mode | Once, Always, Off | | Off |
| 27 | Initial Ischemic Timer (min) | initial ischemic time | 1 | 120 | 20 |

-continued

| Item | Parameter Name | Description | Range Minimum Value | Range Maximum Value | Factory Default Value |
|---|---|---|---|---|---|
| 28 | Repeat Ischemic Timer (min) | Repeat time for ischemic time | 1 | 120 | 5 |
| 29 | Ischemic Timer | ischemic timer mode | On, Off | | Off |
| 30 | Initial Del Route | Initial Delivery route setting after prime | Antegrade, Retrograde, Simulgrade | | Antegrade |
| 31 | Del Line Type | Delivery Line Type | Single, Double | | Single |
| 32 | Initial Arrest Mode | Initial Arrest Mode setting after Prime. | High, Low | | High |
| 33 | LCD Brightness (%) | LCD Brightness | 30, 40, 50, 60, 70, 80, 90, 100 | | 100 |
| 34 | Flow Mode | Flow mode | Normal, Low Vol, Always Cyclic | | Normal |
| 35 | Flow Knob Sensitivity | sensitivity setting of flow knob | 10, 20, 30, 40, 50, 60, 70, 80, 90, 100 | | 70 |
| 36 | Off-Time Delay (Seconds) | Off time delay setting used to define a dose | 1 | 60 | 20 |
| 37 | Home View | Set the view of home screen | Chart, Home | | Home |
| 38 | Arrest Source Units | Set units for arrest source | mEq, mMol | | mEq |

Using an Existing Protocol: New Case Setup Using an Existing Protocol allows the operator to select an existing protocol from a list of previously saved protocols. The saved protocol feature can standardize cardioplegia delivery parameters and shorten set-up time. The operator can customize the protocol in setting up the current case. To utilize an existing protocol, press the Existing Protocol option from the New Case Setup screen and select any of the existing protocols.

Figure 32:
Figure 33:
Figure 34:

Using Protocol Manager: The Protocol Manager allows the operator to recall and edit an existing protocol or to create a new protocol and store it on the system for future use. To create a new protocol, touch the Protocol Manager Button in the Selection screen. A Protocol list screen is displayed with an existing protocol list. Select an option and the Protocol Name screen displays where the new protocol name may be entered. Enter the protocol name and touch the Done button to save the protocol name. The maximum character length for the protocol name is 14 alpha-numeric characters. All parameters can be reviewed and edited. See FIGS. 32-34.

File Transfer: The Operator is able to transfer the Master files and Case History from/to an external USB memory device. Users are encouraged to use the Master Copy feature to standardize all devices in their account to have identical user customizable data. Touch Menu, File Transfer, Create Master after inserting a USB memory device. A master copy of Protocols, Additive, Crystalloid and Personnel is created on the USB memory. Touch Menu, File Transfer, Copy from Master to replace all the Protocols, Additive, Crystalloid and Personnel data on the system with that from the Master File on the inserted USB memory device.

Figure 35:
Figures 36, 37:
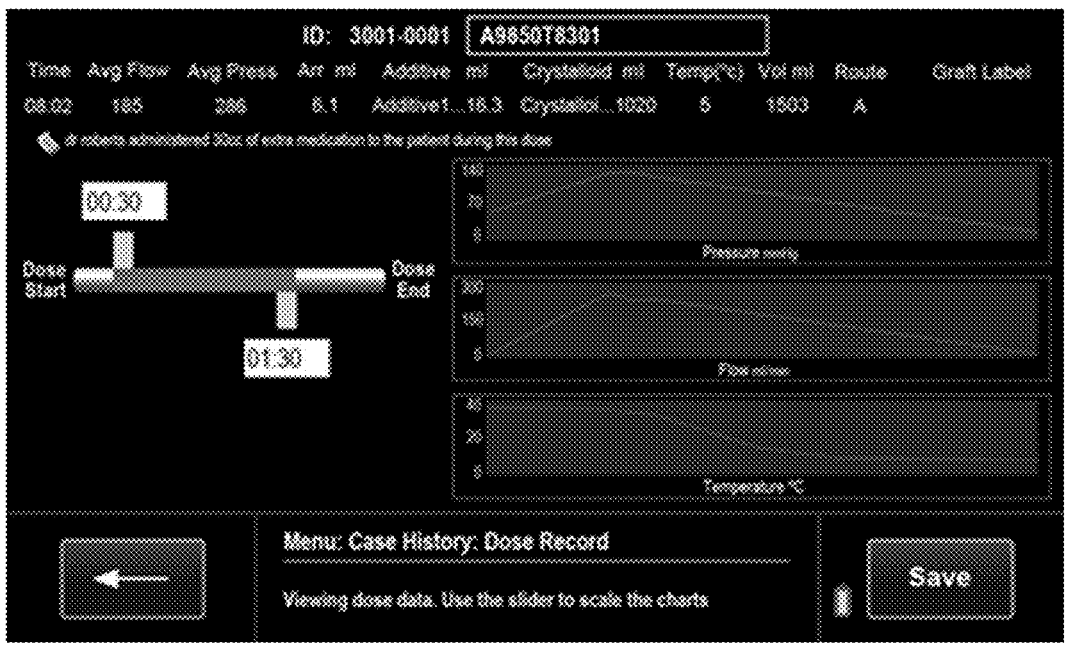
Figure 40:
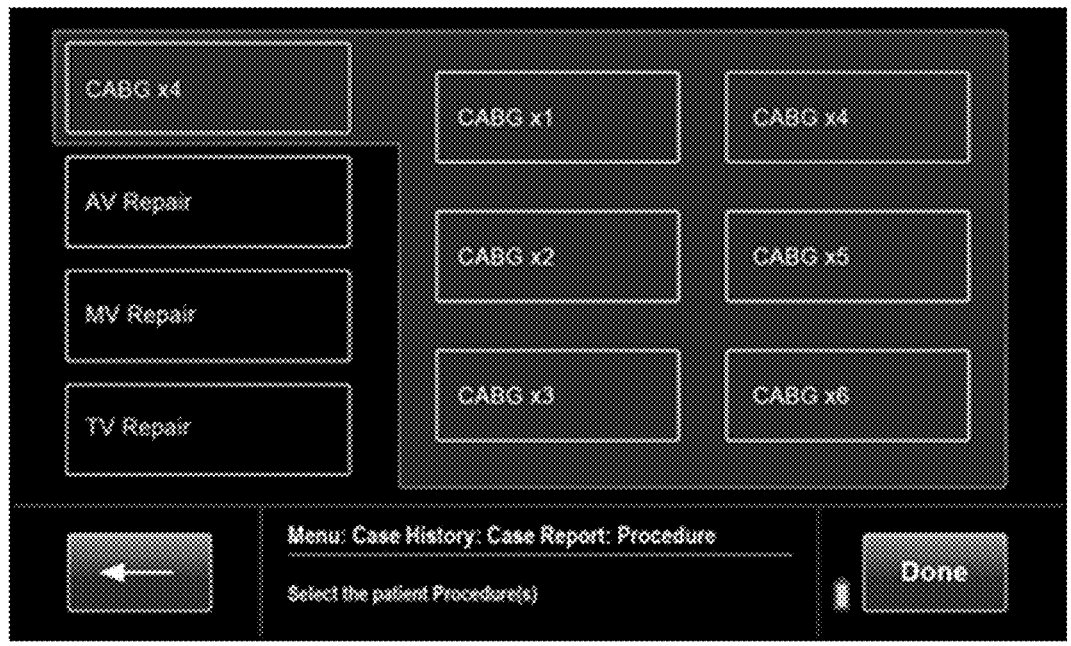
Figure 41:
Figure 42:
Figure 43:
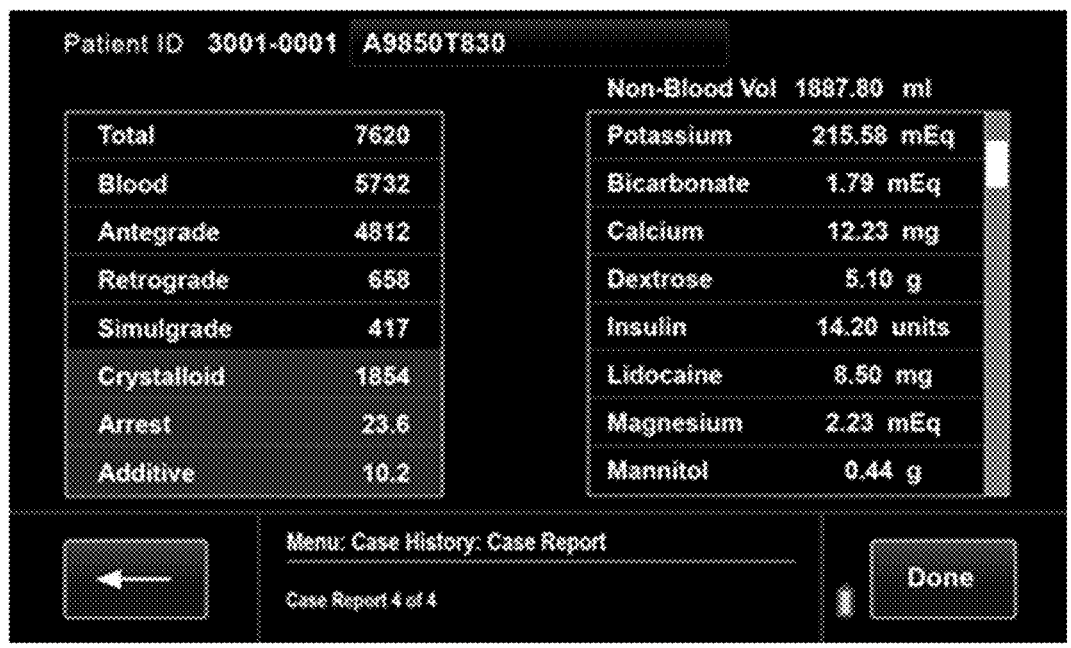

Case History: The Case History function allows the operator to view the list of 225 most recent case records. These records are identified by the case start date and time, for example [21 Jun. 2018 13:15]. When an external storage device is plugged in, a case record can be copied to the memory. The Dose records, all Pressure, Flow & Temperature data and Case Report data associated with that case are saved as part of Case Data. See FIGS. 35-36. The dose history displays in a table where each row or record corresponds to a dose. The column headings are explained as follows. Time: Shows the time corresponding to the start of the record. If a note was previously entered for this record, the Note icon is displayed. Avg Flow: Shows the average flow rate during the dose and whether the AutoStart (AS) was utilized. Avg Pressure: Shows the average system pressure (and external pressure, if applicable) during the dose. Arr: Shows the volume of arrest agent delivered in mL. Additive/Crystalloid: Shows the Additive/Crystalloid Name and the volume delivered. If no volume was delivered, show '- -'. Avg Temp: Shows the average delivery temperature for the dose in ° C. Volume: Shows the total delivered volume for the dose in ml. Route: Shows the route selected in the dose (A-Antegrade, R-Retrograde, S-Simulgrade or G-Graft Only). Graft Label: Shows the Graft Label if it was named previously.

Dose Record View: When a dose is selected, the corresponding pressure, flow and temperature data is displayed on three separate graphs. A single dose is limited to a maximum of four hours (looped data). The data corresponding to the dose is displayed. Operator can zoom in or out using the Slider bars. Save button can be used to save the dose data to the external memory when connected. The ID displays the serial number followed by the case number followed by a customizable 20 character alphanumeric ID field.

Case Report: The Case Report contains Patient and Procedure details in one place. To view the Case Report: Touch Menu, then Case History, then Case, then Case Report. The Case Report screen 1 of 4 is displayed. The fields in Case Report 1 of 4 screen are explained below. ID: This field displays the ID if previously entered or blank by default. Age: This field displays the patient age with range 0-120 years. Weight: This field displays the patient weight with range 1-200 Kg. Gender: This field displays the patient gender. BSA: This field displays the BSA with range 0.5 to 3.0 in 0.1 increments. Procedure: This field displays the selected Procedure if a single Procedure was previously selected or 'Combo' if multiple Procedures are selected. The procedure screen has 2 levels to allow you to select any combination of all available Procedure options. Surgeon:

This field displays the Surgeon Name that is selected from the Surgeon List. The Surgeon List is customizable using the Personnel Menu option. Perfusionist: This field displays the Perfusionist Name that is selected from the Perfusionist List. The Perfusionist List is customizable using the Personnel Menu option. Anesthesiologist: This field displays the Anesthesiologist Name that is selected from the Anesthesiologist List. The Anesthesiologist List is customizable using the Personnel Menu option.

The fields in Case Report 2 of 4 screen are explained as follows. Time To Arrest: This field displays the Time to Arrest as recorded in ECG Setting screen. Total Arrest Time: This field displays the Total Arrest Time as recorded in ECG Setting screen. Total Ischemic Time: This non-editable field displays the Total Ischemic Time as Total Arrest Time minus the Total Delivery Time. Total Delivery Time: This field displays the sum of all 'On' Times. Spontaneous Rhythm: This field displays the Restart method selection made in the ECG Settings screen when the Restarted button was pressed. Defib Count: Use this field to record the number of times the heart needed to defibrillated to restart. Paced Rhythm: Use this field to record if the Pacing was used for this case.

The fields in Case Report 3 of 4 screen are explained as follows. TEE Score: Enter the TEE score with range 0-9. PRBC: Enter PRBC given with range 0-9 Units. FFP: Enter FFP given with range 0-9 Units. Whole Blood: Enter Whole Blood given with range 0-9 Units. Platelets: Enter Platelets given with range 0-9 Units.

Case Report 4 of 4 screen shows the Volume summary for the case. See FIGS. 38-43.

Additive List: The Additive List contains a list of Additives created by the operator. Items in the list can be added, deleted or edited. To add an item to the Additive list: In Selection Screen, touch Menu then Additives. The Additive List screen is displayed.

Figure 44:
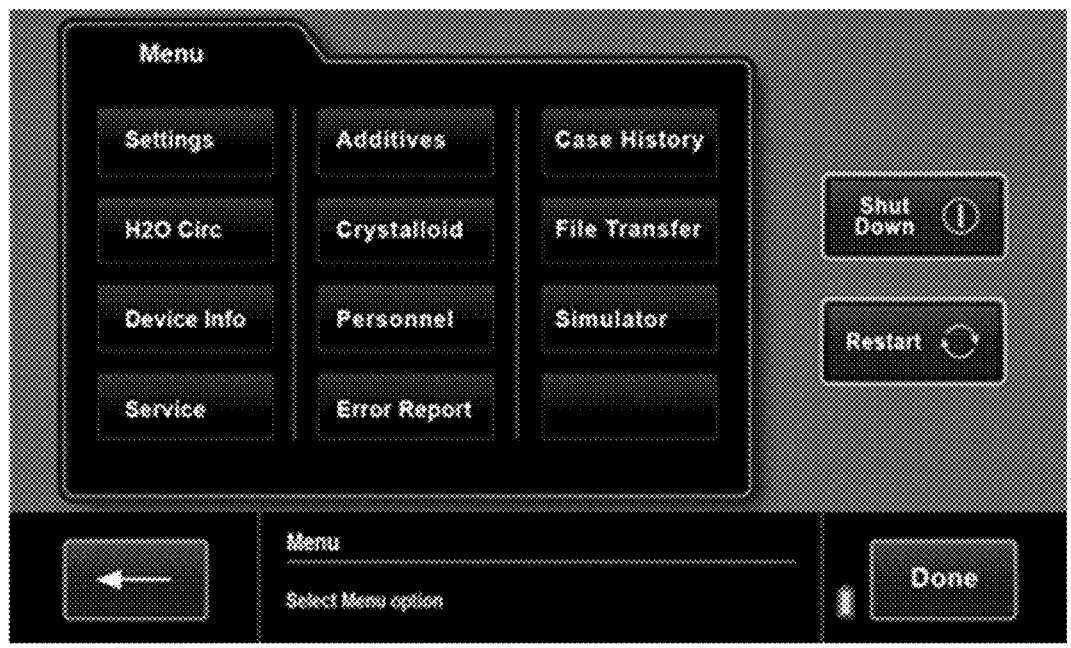
Figure 45:
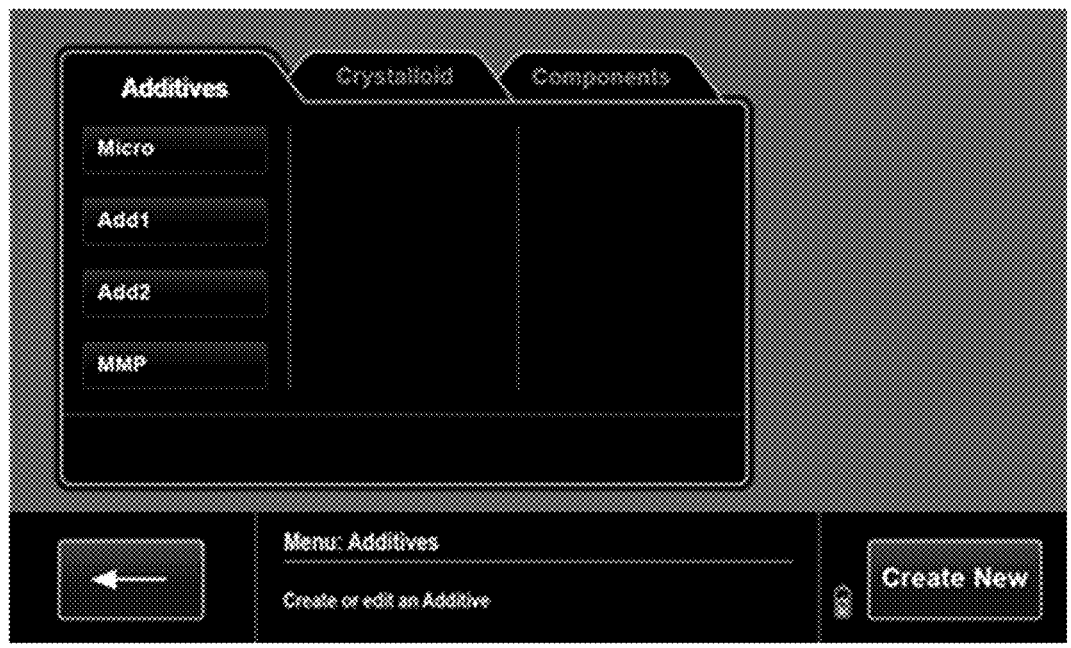
Figure 46:

Touch an Additive name to edit an existing Additive or select Create New to add a new Additive to the List. The Operator is able to use a Blank Template or Existing Additive as a baseline for the New Additive and then naming it using a maximum of up to 8 characters. All the fields in the Additive Template have to be filled to match the Additive solution being used. The 'per L cdpg' (quantity of component delivered per liter of cardioplegia) and 'Total Volume' fields are calculated by the system based on the provided information. See FIGS. 44-46.

Figure 47:
Figure 48:
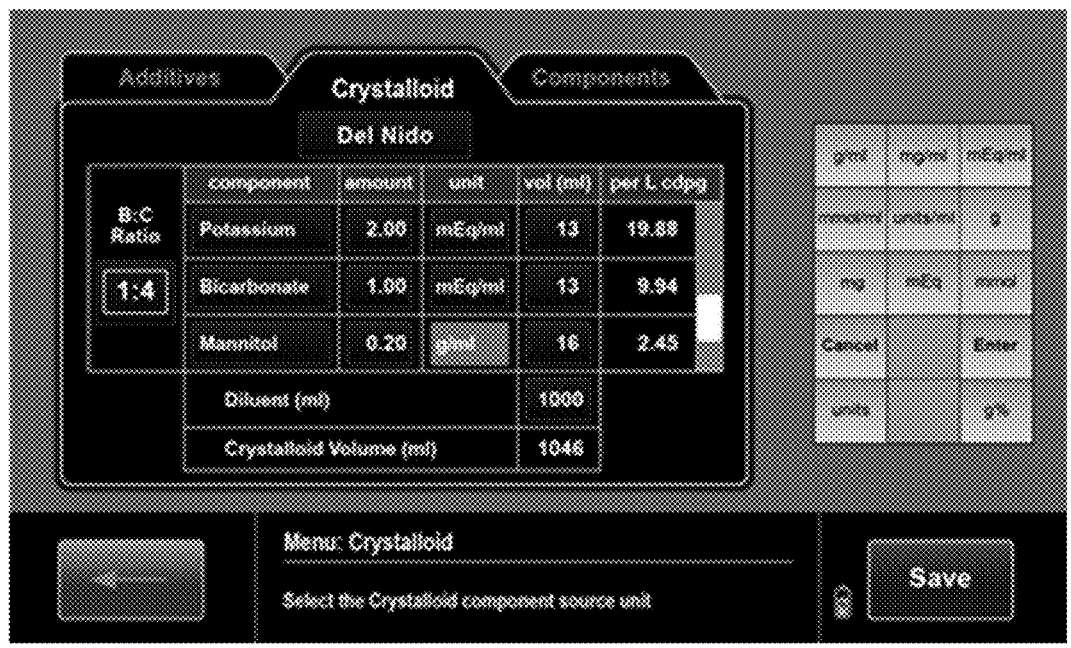

Crystalloid List: The Crystalloid List contains a list of crystalloid solutions created by the operator. Items in the list can be added, deleted or edited. To add an item to the Crystalloid list: In Selection Screen, touch Menu then Crystalloid. The Crystalloid List screen is displayed. Touch a Crystalloid name to edit an existing crystalloid or select Create New to add a new crystalloid to the List. Operator is able to use a Blank Template or an existing crystalloid as a baseline for the New Crystalloid and then naming it using a maximum of up to 8 characters. All the fields in the Crystalloid Template have to be filled to match the crystalloid solution being used. The 'per L cdpg' and 'Crystalloid Volume' fields are calculated by the system based on the provided information. See FIGS. 47-48.

Figure 49:
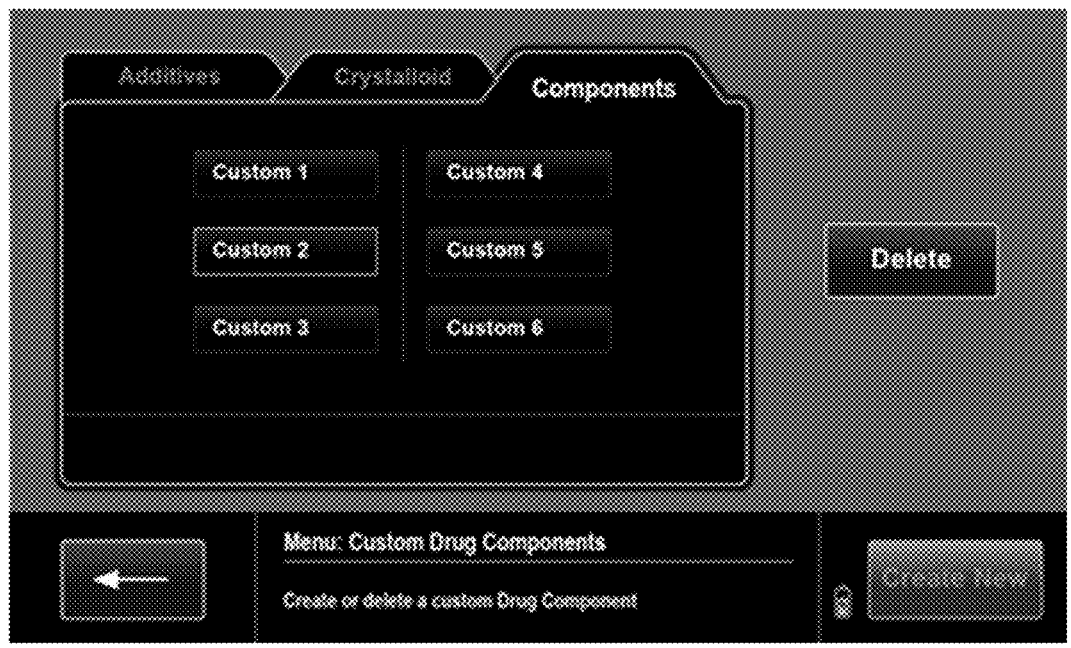

Component List: The Component List contains a list of up to 6 (or more) custom Components created by the operator. In an embodiment the Component List already has 9 reserved Component names (Magnesium, Potassium, Sodium, Dextrose, Lidocaine, Bicarbonate, Mannitol, Insulin & Calcium). To add or delete a custom to the Component list: In Additive or Crystalloid screen, touch the Components tab. The Component List screen is displayed. Select Create New to add a new Component to the List. Operator is able to name it using a maximum of up to 8 characters. Select an existing Component from the list and select Delete to delete the custom component from the list. See FIG. 49.

Figure 50:
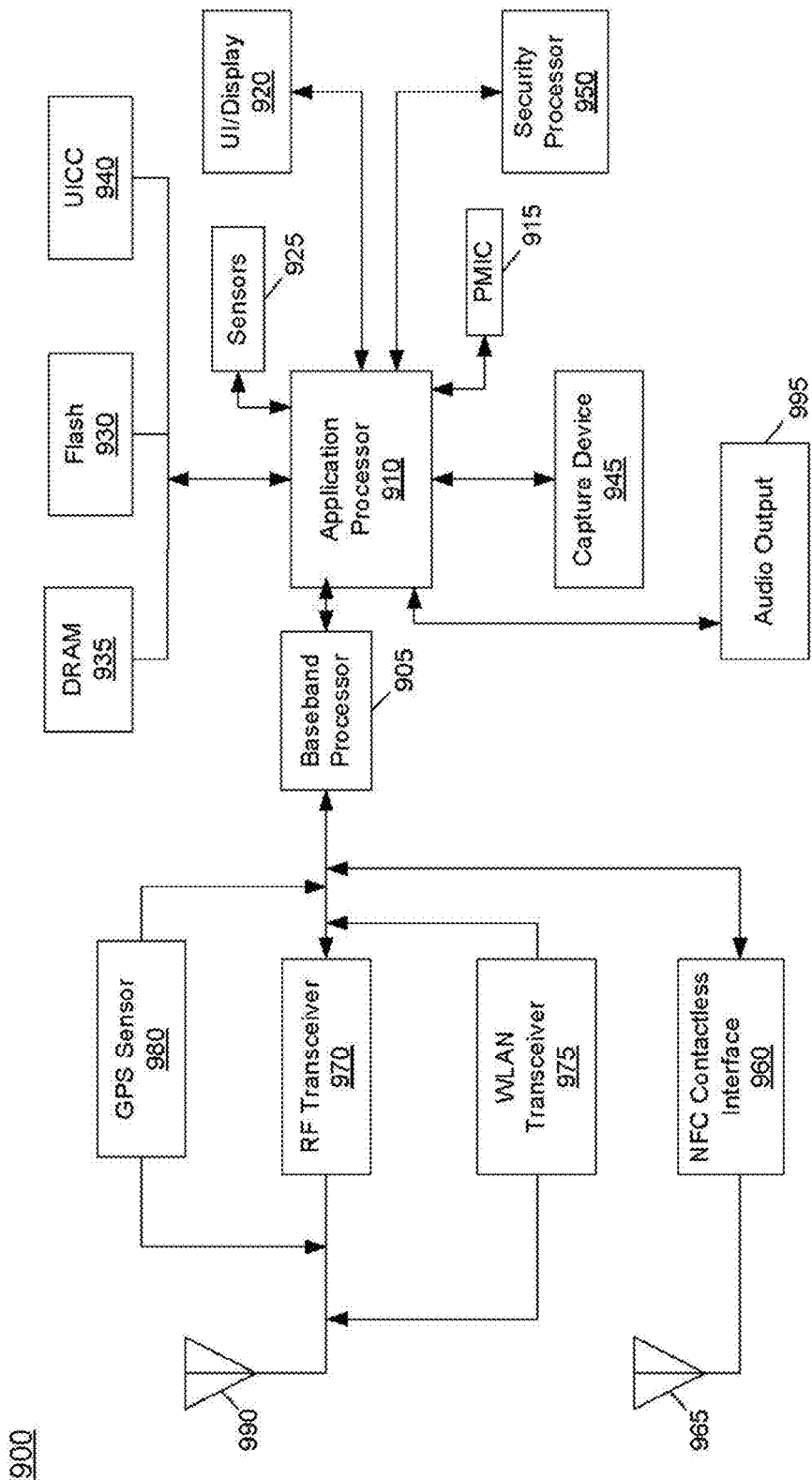
FIGS. 50, 51, 52 provides systems used to implement the controller and other elements of embodiments.
Figure 51:
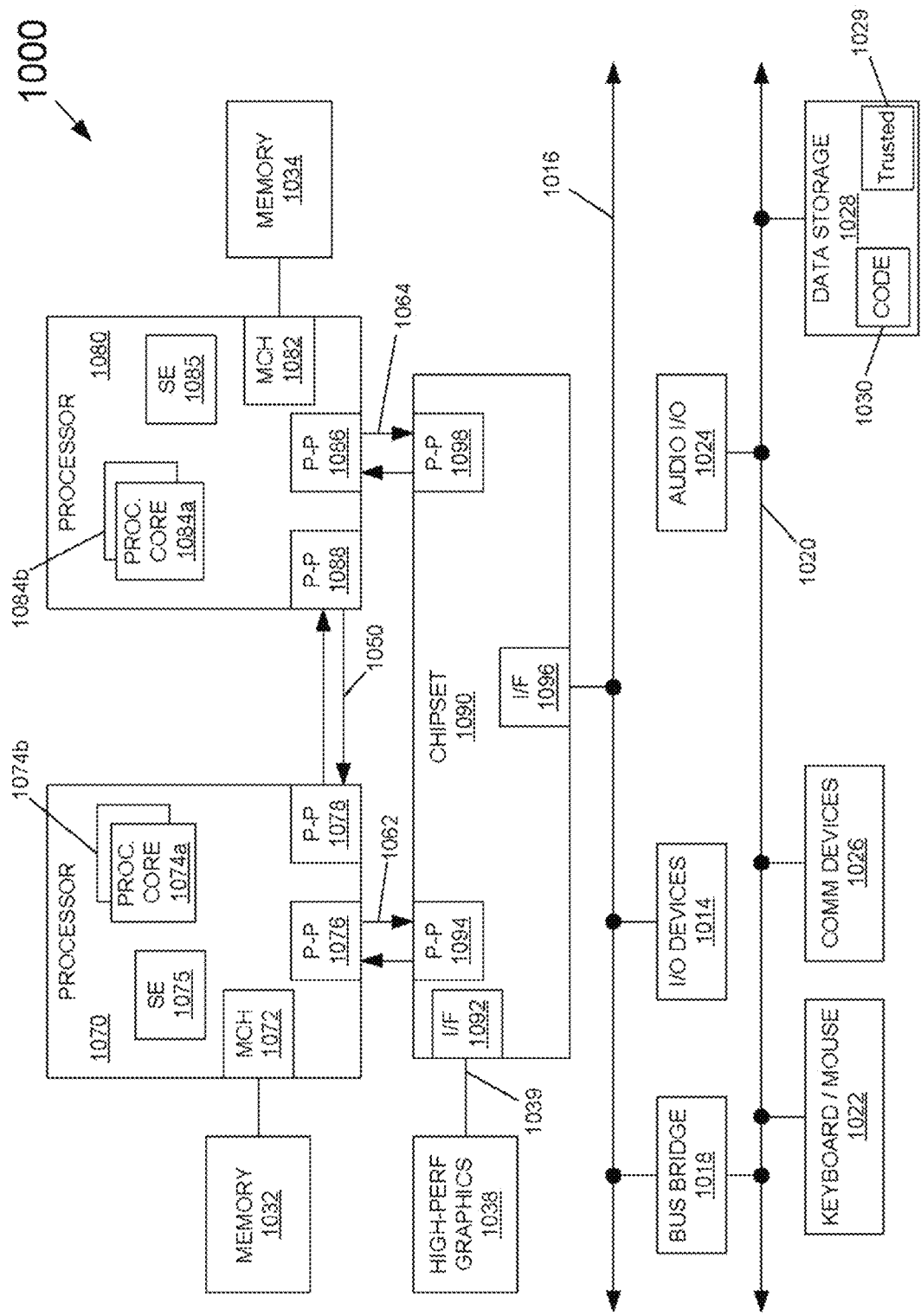
Figure 52:
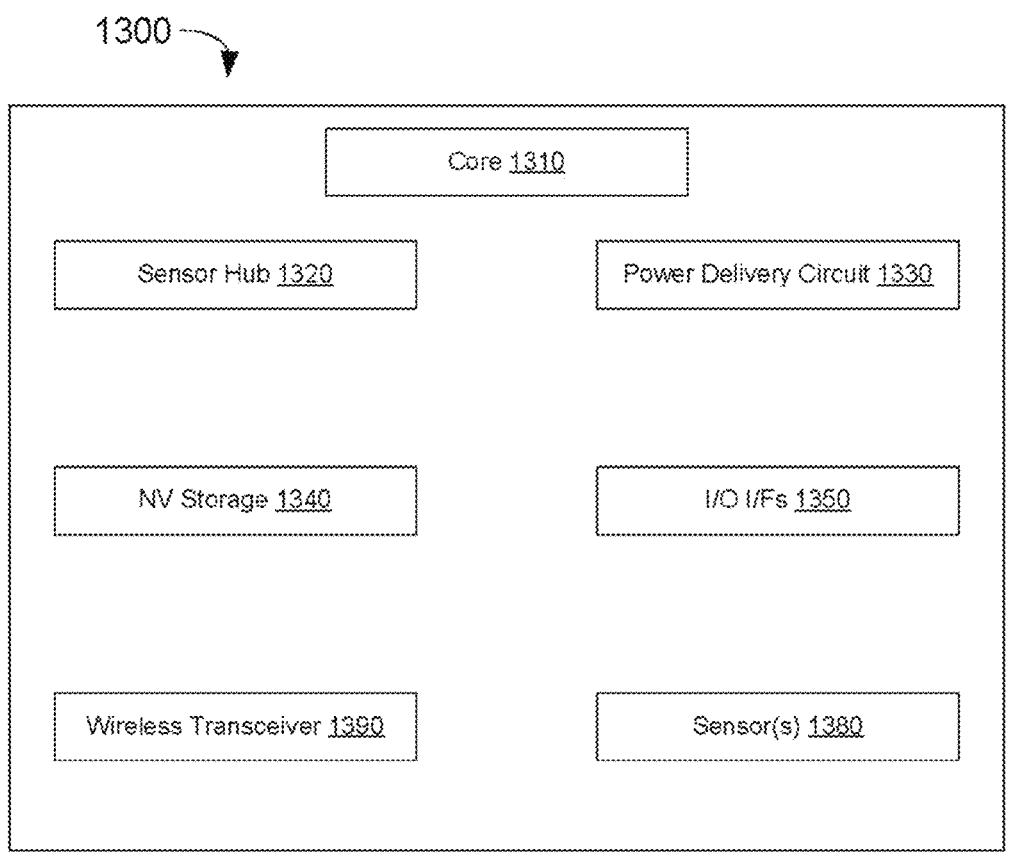

The systems of any of FIGS. 50, 51, 52 may be used to implement any of the computer-based functions of elements such as the controller.

In FIG. 50, shown is a block diagram of an example system with which embodiments can be used. As seen, system 900 may be a smartphone or other wireless communicator or any other Internet of Things (IoT) device. System 900 may be used as the controller and/or GUI and/or console. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920 (e.g., touch screen display). In addition, application processor 910 may couple to a memory system including a non-volatile memory, namely a flash memory 930 and a system memory, namely a DRAM 935. As further seen, application processor 910 also couples to audio output 995 and a capture device 945 such as one or more image capture devices that can record video and/or still images.

A universal integrated circuit card (UICC) 940 comprises a subscriber identity module, which in some embodiments includes a secure storage to store secure user information. System 900 may further include a security processor 950 (e.g., Trusted Platform Module (TPM)) that may couple to application processor 910. A plurality of sensors 925, including one or more multi-axis accelerometers may couple to application processor 910 to enable input of a variety of sensed information such as motion and other environmental information. In addition, one or more authentication devices may be used to receive, for example, user biometric input for use in authentication operations.

As further illustrated, a near field communication (NFC) contactless interface 960 is provided that communicates in an NFC near field via an NFC antenna 965. While separate antennae are shown, understand that in some implementations one antenna or a different set of antennae may be provided to enable various wireless functionalities.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more internet of things (IoT) networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition, a GPS sensor 980 may be present, with location information being provided to security processor 950 for use as described herein when context information is to be used in a pairing process. Other wireless communications such as receipt or transmission of radio signals (e.g., AM/FM) and other signals may also be provided. In addition, via WLAN transceiver 975, local wireless communications, such as according to a Bluetooth™ or IEEE 802.11 standard can also be realized.

Referring now to FIG. 51, shown is a block diagram of a system in accordance with another embodiment of the present invention. System 1000 may be used as the controller and/or GUI and/or console. Multiprocessor system 1000 is a point-to-point interconnect system such as a server system, and includes a first processor 1070 and a second processor 1080 coupled via a point-to-point interconnect 1050. Each of processors 1070 and 1080 may be multicore processors such as SoCs, including first and second processor cores (i.e., processor cores 1074*a* and 1074*b* and processor cores 1084*a* and 1084*b*), although potentially many more cores may be present in the processors. In addition, processors 1070 and 1080 each may include a secure engine 1075 and 1085 to perform security operations such as attestations, IoT network onboarding or so forth.

First processor 1070 further includes a memory controller hub (MCH) 1072 and point-to-point (P-P) interfaces 1076 and 1078. Similarly, second processor 1080 includes a MCH 1082 and P-P interfaces 1086 and 1088. MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1062 and 1064, respectively. Chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. Various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Referring now to FIG. 51, embodiments may be used in environments where IoT devices may include wearable devices or other small form factor IoT devices. Shown is a block diagram of a wearable module 1300 in accordance with another embodiment. System 1300 may be used as the controller and/or GUI and/or console. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a Trusted Execution Environment (TEE). Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I2C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms. Wearable and/or IoT devices have, in comparison with a typical general purpose CPU or a GPU, a small form factor, low power requirements, limited instruction sets, relatively slow computation throughput, or any of the above.

The following examples pertain to further embodiments.

1. A cardioplegia delivery system comprising: a console including: a first pump to pump at least one of blood or crystalloid; a second pump to pump an arrest drug; a third pump to pump an additive; a temperature controllable water circulation system configured to couple to a reservoir of coolant; a first heat exchanger (HEX) to couple to the water circulation system; a first sensor to sense pressure; a second sensor to sense temperature; a third sensor to sense air; at least one processor based computing node coupled to a graphical user interface (GUI), the at least one processor based computing node and GUI being configured to separably couple to the console; a first container to include the crystalloid, a second container to include the arrest drug, and a third container to include the additive, wherein the first, second, and third containers are configured to releasably couple to the console; at least one machine-readable medium, wherein the at least one machine-readable medium has stored thereon data which, if used by the at least one processor based computing node, causes the at least one processor based computing node to perform operations comprising: control a ratio of crystalloid to blood to be delivered to the patient (button 10 of Home Screen); control an amount of the arrest drug to be delivered to the patient (button 8 of Home Screen); control an amount of the additive to be delivered to the patient (button 9 of Home Screen); control a temperature of at least one of the crystalloid, the blood, the arrest drug, or the additive to be delivered to the patient (button 11 of Home Screen); control a pressure of at least one of the crystalloid, the blood, the arrest drug, or the additive to be delivered to the patient (button 5 of Home Screen); control a delivery rate of at least one of the crystalloid, the blood, the arrest drug, or the additive to be delivered to the patient (button 1 of Home Screen); record an amount of at least one of the crystalloid, the blood, the arrest drug, or the additive administered to the patient (button 4 of Home Screen); record an amount of time at least one of the crystalloid, the blood, the arrest drug, or the additive administered to the patient (button 3 of Home Screen); in response to recording the amount of at least one of the crystalloid, the blood, the arrest drug, or the additive administered to the patient, determine a volume amount of the at least one of the crystalloid, the blood, the arrest drug, or the additive that remains and is available to be administered to the patient (buttons 8, 9, 10 of Home Screen); store at least one delivery protocol, the at least delivery protocol (button 6 of Home Screen) including a predetermined setting for at least one of (a) pressure of at least one of the crystalloid, the blood, the arrest drug, or the additive to be delivered to the patient, (b) temperature of at least one of the crystalloid, the blood, the arrest drug, or the additive to be delivered to the patient, (c) flow rate of at least one of the crystalloid, the blood, the arrest drug, or the additive to be delivered to the patient, or (d) ratio of crystalloid to blood; wherein the system is configured to deliver blood and crystalloid solutions (including crystalloid and drugs) to the heart during cardiopulmonary bypass surgery.

For instance, the first pump may include a dual piston pump that operates pistons 165', 166' to compress containers 165, 166. The second pump may include an actuator 120 to pump arrest into one of ports 167, 168 (via line 154). The third pump may include an actuator 119 to pump additive into another of ports 167, 168 (via line 106). The temperature controllable water circulation system couples to a reservoir of coolant with input/output ports 169, 170. The first, second, and third sensors are included at, for example, sensors 115, 114, 116.

As further explanation, please see the above explanation of "graft mode" regarding controlling flow rates, pressure, and the like. A separate graft mode may be used for antegrade, retrograde, or graft only. Thus, many different settings may be used for varying situations. Protocols, graft modes, and the like make desired settings (which are often the same for many different patients) more easily attainable.

In another embodiment the first sensor to sense pressure may instead be not included in the console but may be included in a transducer or the like that is external to the console.

Alternative version of Example 1. A cardioplegia delivery system comprising: a console including: a first pump to pump at least one of blood or crystalloid; a second pump to pump an arrest drug; a third pump to pump an additive; a first heat exchanger (HEX) to couple to a water circulation system; a first sensor to sense pressure; a second sensor to sense temperature; a third sensor to sense air; at least one processor based computing node coupled to a graphical user interface (GUI), the at least one processor based computing node and GUI being configured to separably couple to the console; a first container to include the crystalloid, a second container to include the arrest drug, and a third container to include the additive, wherein the first, second, and third containers are configured to releasably couple to the console; at least one machine-readable medium, wherein the at least one machine-readable medium has stored thereon data which, if used by the at least one processor based computing node, causes the at least one processor based computing node to perform operations comprising: control a ratio of crystalloid to blood to be delivered to the patient (button 10 of Home Screen); control an amount of the arrest drug to be delivered to the patient (button 8 of Home Screen); control an amount of the additive to be delivered to the patient (button 9 of Home Screen); control a temperature of at least one of the crystalloid, the blood, the arrest drug, or the additive to be delivered to the patient (button 11 of Home Screen); control a pressure of at least one of the crystalloid, the blood, the arrest drug, or the additive to be delivered to the patient (button 5 of Home Screen); control a delivery rate of at least one of the crystalloid, the blood, the arrest drug, or the additive to be delivered to the patient (button 1 of Home Screen); record an amount of at least one of the crystalloid, the blood, the arrest drug, or the additive administered to the patient (button 4 of Home Screen); record an amount of time at least one of the crystalloid, the blood, the arrest drug, or the additive administered to the patient (button 3 of Home Screen); in response to recording the amount of at least one of the crystalloid, the blood, the arrest drug, or the additive administered to the patient, determine a volume amount of the at least one of the crystalloid, the blood, the arrest drug, or the additive that remains and is available to be administered to the patient (buttons 8, 9, 10 of Home Screen); store at least one delivery protocol, the at least delivery protocol (button 6 of Home Screen) including a predetermined setting for at least one of (a) pressure of at least one of the crystalloid, the blood, the arrest drug, or the additive to be delivered to the patient, (b) temperature of at least one of the crystalloid, the blood, the arrest drug, or the additive to be delivered to the patient, (c) flow rate of at least one of the crystalloid, the blood, the arrest drug, or the additive to be delivered to the patient, or (d) ratio of crystalloid to blood; wherein the system is configured to deliver blood and crystalloid solutions (including crystalloid and drugs) to the heart during cardiopulmonary bypass surgery.

Thus, in an embodiment the console may not include a temperature controllable water circulation system configured to couple to a reservoir of coolant. In other words, there are various embodiments that handle cooling and heating in various ways. In a first embodiment the console may include a pump with which to circulate a heat transfer medium (e.g., water) to a HEX. The console may include a reservoir for the medium and heating elements with which to heat the medium. A valve may function to direct heated water to the HEX or instead take water from a cooling reservoir that is external to the console and direct cooled medium to the HEX. Further still, the console may include a heater/cooler element with which to regulate temperature of the medium that is circulated to the HEX. However, another embodiment may include a lighter console option where the console does not include the pump for circulating coolant (cooling and/or heating medium such as water). Instead, such an embodiment may include a panel or manifold (e.g., such as the panel in FIG. 1B). Tubes from a heater/cooler unit (that is external to the console) interface the panel and medium is then transmitted to the HEX via tubes included in the console and which interface the panel. In an embodiment that does not need disinfecting, the HEX has tubes that interface an external heater/cooler unit (not included in the console) and the tubes and HEX may be disposable (with no residual tubing or conduit in console left behind to disinfect).

These above cooling scenarios are also applicable to alternative versions of, for example, Examples 3, 4, 6.

2. The system of example 1 wherein the at least one medium comprises instructions to perform operations comprising displaying the pressure of at least one of the crystalloid, the blood, the arrest drug, or the additive to be delivered to the patient via the GUI.

3. A cardioplegia delivery system comprising: a console including: at least one pump to pump at least one of blood, crystalloid, an arrest drug, or an additive; temperature controllable water circulation system configured to couple to a reservoir of coolant; a first heat exchanger (HEX) to couple to the water circulation system; at least one sensor to sense at least one of pressure or temperature; a processor based system including a graphical user interface (GUI); a first container to include the crystalloid, a second container to include the arrest drug, and a third container to include the additive, wherein the first, second, and third containers are configured to releasably couple to the console; at least one machine-readable medium, wherein the at least one machine-readable medium has stored thereon data which, if used by at least one machine, causes the at least one machine to perform operations comprising: control a ratio of crystalloid to blood to be delivered to the patient; control an amount of the arrest drug to be delivered to the patient; control an amount of the additive to be delivered to the patient; control a temperature of at least one of the crystalloid, the blood, the arrest drug, or the additive to be delivered to the patient; control a pressure of at least one of the crystalloid, the blood, the arrest drug, or the additive to be delivered to the patient; control a delivery rate of at least one of the crystalloid, the blood, the arrest drug, or the additive to be delivered to the patient; record an amount of at least one of the crystalloid, the blood, the arrest drug, or the additive administered to the patient; record an amount of time at least one of the crystalloid, the blood, the arrest drug, or the additive administered to the patient; store at least one delivery protocol, the at least delivery protocol including a predetermined setting for at least one of (a) pressure of at least one of the crystalloid, the blood, the arrest drug, or the additive to be delivered to the patient, (b) temperature of at least one of the crystalloid, the blood, the arrest drug, or the additive to be delivered to the patient, (c) flow rate of at least one of the crystalloid, the blood, the arrest drug, or the additive to be delivered to the patient, or (d) ratio of crystalloid to blood; wherein the system is configured to deliver blood and crystalloid solutions (including crystalloid and drugs) to the heart during cardiopulmonary bypass surgery.

Thus, the first container may include crystalloid alone or in combination with other elements (e.g., blood).

Further, not all embodiments include three pumps. Instead fewer, more, or different propulsion systems may be used to move elements (e.g., fluids) to and from the patient.

An alternative version of Example 3. A cardioplegia delivery system comprising: a console including: at least one pump to pump at least one of blood, crystalloid, an arrest drug, or an additive; temperature controllable water circulation system configured to couple to a reservoir of coolant; a first heat exchanger (HEX) to couple to the water circulation system; at least one sensor to sense at least one of pressure or temperature; a processor based system including a graphical user interface (GUI); a first container to include the blood, a second container to include the arrest drug, and a third container to include the additive, wherein the first, second, and third containers are configured to releasably couple to the console; at least one machine-readable medium, wherein the at least one machine-readable medium has stored thereon data which, if used by at least one machine, causes the at least one machine to perform operations comprising: control a ratio of crystalloid to blood to be delivered to the patient; control an amount of the arrest drug to be delivered to the patient; control an amount of the additive to be delivered to the patient; control a temperature of at least one of the crystalloid, the blood, the arrest drug, or the additive to be delivered to the patient; control a pressure of at least one of the crystalloid, the blood, the arrest drug, or the additive to be delivered to the patient; control a delivery rate of at least one of the crystalloid, the blood, the arrest drug, or the additive to be delivered to the patient; record an amount of at least one of the crystalloid, the blood, the arrest drug, or the additive administered to the patient; record an amount of time at least one of the crystalloid, the blood, the arrest drug, or the additive administered to the patient; store at least one delivery protocol, the at least delivery protocol including a predetermined setting for at least one of (a) pressure of at least one of the crystalloid, the blood, the arrest drug, or the additive to be delivered to the patient, (b) temperature of at least one of the crystalloid, the blood, the arrest drug, or the additive to be delivered to the patient, (c) flow rate of at least one of the crystalloid, the blood, the arrest drug, or the additive to be delivered to the patient, or (d) ratio of crystalloid to blood; wherein the system is configured to deliver blood and crystalloid solutions (including crystalloid and drugs) to the heart during cardiopulmonary bypass surgery.

Thus, in some embodiments the first container may include blood but not necessarily crystalloid.

An additional alternative version of Example 3. A cardioplegia delivery system comprising: a console including: at least one pump to pump at least one of blood, crystalloid, an arrest drug, or an additive; temperature controllable water circulation system configured to couple to a reservoir of coolant; a first heat exchanger (HEX) to couple to the water circulation system; at least one sensor to sense at least one of pressure or temperature; a processor based system including a graphical user interface (GUI); a first container to include at least one of the crystalloid or the blood, a second container to include the arrest drug, and a third container to include the additive, wherein the first, second, and third containers are configured to releasably couple to the console; at least one machine-readable medium, wherein the at least one machine-readable medium has stored thereon data which, if used by at least one machine, causes the at least one machine to perform operations comprising: control a ratio of crystalloid to blood to be delivered to the patient; control an amount of the arrest drug to be delivered to the patient; control an amount of the additive to be delivered to the patient; control a temperature of at least one of the crystalloid, the blood, the arrest drug, or the additive to be delivered to the patient; control a pressure of at least one of the crystalloid, the blood, the arrest drug, or the additive to be delivered to the patient; control a delivery rate of at least one of the crystalloid, the blood, the arrest drug, or the additive to be delivered to the patient; record an amount of at least one of the crystalloid, the blood, the arrest drug, or the additive administered to the patient; record an amount of time at least one of the crystalloid, the blood, the arrest drug, or the additive administered to the patient; store at least one delivery protocol, the at least delivery protocol including a predetermined setting for at least one of (a) pressure of at least one of the crystalloid, the blood, the arrest drug, or the additive to be delivered to the patient, (b) temperature of at least one of the crystalloid, the blood, the arrest drug, or the additive to be delivered to the patient, (c) flow rate of at least one of the crystalloid, the blood, the arrest drug, or the additive to be delivered to the patient, or (d) ratio of crystalloid to blood; wherein the system is configured to deliver blood and crystalloid solutions (including crystalloid and drugs) to the heart during cardiopulmonary bypass surgery.

Thus, the first container may include blood, crystalloid, or blood and crystalloid.

4. A cardioplegia delivery system comprising: a console including: at least one pump to pump at least one of blood, crystalloid, an arrest drug, or an additive; a temperature controllable water circulation system configured to couple to a reservoir of coolant; at least one sensor to sense at least one of pressure or temperature; at least one processor based computing node coupled to a graphical user interface (GUI), the at least one processor based computing node and GUI being configured to separably couple to the console; wherein the console is configured to releasably couple to a first container including the crystalloid, a second container including the arrest drug, and a third container including the additive; wherein the console is configured to releasably couple to a first heat exchanger (HEX) and the first HEX is configured to couple to the water circulation system; at least one machine-readable medium, wherein the at least one machine-readable medium has stored thereon data which, if used by the at least one processor based computing node, causes the at least one processor based computing node to perform operations comprising: control a ratio of crystalloid to blood to be delivered to the patient; control an amount of the arrest drug to be delivered to the patient; control an amount of the additive to be delivered to the patient; control a temperature of at least one of the crystalloid, the blood, the arrest drug, or the additive to be delivered to the patient; control a pressure of at least one of the crystalloid, the blood, the arrest drug, or the additive to be delivered to the patient; control a delivery rate of at least one of the crystalloid, the blood, the arrest drug, or the additive to be delivered to the patient; record an amount of at least one of the crystalloid, the blood, the arrest drug, or the additive administered to the patient; record an amount of time at least one of the crystalloid, the blood, the arrest drug, or the additive administered to the patient; in response to recording the amount of at least one of the crystalloid, the blood, the arrest drug, or the additive administered to the patient, determine a volume amount of the at least one of the crystalloid, the blood, the arrest drug, or the additive that remains and is available to be administered to the patient; store at least one delivery protocol, the at least delivery protocol including a predetermined setting for at least one of (a) pressure of at least one of the crystalloid, the blood, the arrest drug, or the additive to be delivered to the patient, (b) temperature of at least one of the crystalloid, the blood, the arrest drug, or the additive to be delivered to the patient, (c) flow rate of at least one of the crystalloid, the blood, the arrest drug, or the additive to be delivered to the patient, or (d) ratio of crystalloid to blood; wherein the system is configured to deliver blood and crystalloid solutions (including crystalloid and drugs) to the heart during cardiopulmonary bypass surgery.

5. The system of 4 comprising the first, second, and third containers and the first HEX.

Not all systems include disposables such as the drug and additive containers and/or HEX, all of which may be shipped separately from the console.

The console and controller (e.g., processor-based computing node and GUI) may be shipped separately from the first, second, and third containers and/or the first HEX. By "configured to" the console may have ports that are physically formed to fit to the containers. For example, for the blood/crystalloid cassette the console may have pins or projections or structures that are keyed to couple to the cassette in a "dummy proof" manner. As will be described below, ports may be formed in the console so they couple with flanges of one container but not another container to again provide a keyed system that operates in a "dummy proof" manner.

As used in this context, the GUI does not require power to be a GUI. In other words, the GUI may include the display and is not limited to an active display projected or displayed by the hardware display.

6. A cardioplegia delivery system comprising: a console including: at least one pump to pump at least one of blood, crystalloid, an arrest drug, or an additive; a temperature controllable water circulation system configured to couple to a reservoir of coolant; at least one sensor to sense at least one of pressure or temperature; at least one processor based computing node configured to separably couple to the console; wherein the console is configured to releasably couple to a first container including the crystalloid, a second container including the arrest drug, and a third container including the additive; wherein the console is configured to releasably couple to a first heat exchanger (HEX) and the first HEX is configured to couple to the water circulation system; at least one machine-readable medium, wherein the at least one machine-readable medium has stored thereon data which, if used by the at least one processor based computing node, causes the at least one processor based computing node to perform operations comprising: control a ratio of crystalloid to blood to be delivered to the patient; control an amount of the arrest drug to be delivered to the patient; control an amount of the additive to be delivered to the patient; control a temperature of at least one of the crystalloid, the blood, the arrest drug, or the additive to be delivered to the patient; control a pressure of at least one of the crystalloid, the blood, the arrest drug, or the additive to be delivered to the patient; control a delivery rate of at least one of the crystalloid, the blood, the arrest drug, or the additive to be delivered to the patient; record an amount of at least one of the crystalloid, the blood, the arrest drug, or the additive administered to the patient; record an amount of time at least one of the crystalloid, the blood, the arrest drug, or the additive administered to the patient; in response to recording the amount of at least one of the crystalloid, the blood, the arrest drug, or the additive administered to the patient, determine a volume amount of the at least one of the crystalloid, the blood, the arrest drug, or the additive that remains and is available to be administered to the patient; store at least one delivery protocol, the at least delivery protocol including a predetermined setting for at least one of (a) pressure of at least one of the crystalloid, the blood, the arrest drug, or the additive to be delivered to the patient, (b) temperature of at least one of the crystalloid, the blood, the arrest drug, or the additive to be delivered to the patient, (c) flow rate of at least one of the crystalloid, the blood, the arrest drug, or the additive to be delivered to the patient, or (d) ratio of crystalloid to blood; wherein the system is configured to deliver blood and crystalloid solutions (including crystalloid and drugs) to the heart during cardiopulmonary bypass surgery.

7. The system of example 1 comprising a second HEX, wherein: in a first HEX orientation the first HEX sealingly couples to a port of the console; in a second HEX orientation the second HEX sealingly couples to the port of the console; the first HEX includes a first amount of heat exchange baffling and the second HEX includes a second amount of heat exchange baffling, the second amount of baffling being unequal to the first amount of baffling.

For example, as described herein two different HEX configurations may be available for a cardioplegia delivery system. For example, an embodiment may include metal plates that promote heat transfer. The different HEX configurations may include 8, 12, 16, 24 or other convolutions (e.g., metal plates) to essentially increase in surface area with which to conduct heat transfer. However, these different amounts surface area may still be included in a universal casing (or a casing with a universal portion). Thus, both 10 and 16 convolution HEX configurations may include the same outer housing (or at least a portion of each casing may be similar for multiple configurations). This universal housing may be locked into place using a lock knob such as element 113 described above. Such a knob may be configured to secure both 10 and 16 convolution HEXs to the same console port. Such different HEX configurations may have different prime volumes as well as different amounts of metal (or conductive material) surface area. The knob may be configured to take up space unoccupied by a portion of the housing. For example, a HEX with less heat exchange baffling may have a portion of the casing that is smaller than a HEX with more heat exchange baffling. Both HEX configurations may have a casing portion that is the same, such as an upper casing portion that includes a bubble trap compartment. Thus, a HEX with less heat transfer material may have a housing that is not the same as the HEX with more heater transfer material. However, they both may fit into the same port of the console due in part to an adaptor, such as the lock knob 113.

8. The system of example 7 wherein the first amount of baffling includes a first surface area of a metal material and the second amount of baffling includes a second surface area of the metal material, the second surface area being unequal to the first surface area.

9. The system of example 7 wherein the first HEX includes a first prime volume and the second HEX includes a second prime volume that is unequal to the first prime volume.

10. The system of example 9 comprising a coupler, the coupler being configured to couple the first HEX to the port of the console and further configured to couple the second HEX to the port of the console.

11. The system of example 1 wherein the console is configurable to couple to the first HEX and to a second HEX, wherein: in a first HEX orientation the first HEX sealingly couples to the console; in a second HEX orientation the second HEX sealingly couples to the console; the first HEX includes a first amount of heat exchange baffling and the second HEX includes a second amount of heat exchange baffling, the second amount of baffling being unequal to the first amount of baffling.

12. The system of example 1 wherein the at least one medium comprises instructions to perform operations comprising: change at least one of amplitude, frequency, duty cycle for delivering at least one of the crystalloid, the blood, the arrest drug, or the additive to the patient; set a maximum flow rate for delivering at least one of the crystalloid, the blood, the arrest drug, or the additive to the patient; set an acceleration rate for delivering at least one of the crystalloid, the blood, the arrest drug, or the additive to the patient; set a lower pressure limit for delivering at least one of the crystalloid, the blood, the arrest drug, or the additive to the patient; set an upper pressure limit for delivering at least one of the crystalloid, the blood, the arrest drug, or the additive to the patient; record an amount of time at least one of the crystalloid, the blood, the arrest drug, or the additive is not being administered to the patient; set a predetermined volume amount of at least one of the crystalloid, the blood, the arrest drug, or the additive to be administered to the patient; set a predetermined time of at least one of the crystalloid, the blood, the arrest drug, or the additive to be administered to the patient; recording an amount of potassium administered to the patient, wherein a portion of the amount of potassium is included in the arrest drug and another portion of the amount of potassium is not included in the arrest drug; set a first predetermined concentration of the arrest drug and a second predetermined concentration of the arrest drug.

For example, the acceleration rate may be used with the "auto-start" feature described above. For example, controlling a pressure of at least one of the crystalloid, the blood, the arrest drug, or the additive to be delivered to the patient (see Example 1) may be included within "Auto mode". Auto mode embodiments may adjust valves and pump activity to keep cardioplegia pressure, flow rate, and the like within predetermined bounds (see upper pressure limit and lower pressure limit of Example 12). Those predetermined bounds may change on the fly or be stored within a protocol.

13. The system of example 1 wherein the at least one medium comprises instructions to perform operations comprising: set a maximum flow rate for delivering at least one of the crystalloid, the blood, the arrest drug, or the additive to the patient; set a minimum flow rate for delivering at least one of the crystalloid, the blood, the arrest drug, or the additive to the patient; set a lower pressure limit for delivering at least one of the crystalloid, the blood, the arrest drug, or the additive to the patient; set an upper pressure limit for delivering at least one of the crystalloid, the blood, the arrest drug, or the additive to the patient.

14. The system of example 1 wherein the at least one medium comprises instructions to perform operations comprising: set an acceleration rate for delivering at least one of the crystalloid, the blood, the arrest drug, or the additive to the patient; set a minimum flow rate for delivering at least one of the crystalloid, the blood, the arrest drug, or the additive to the patient; set a maximum flow rate for delivering at least one of the crystalloid, the blood, the arrest drug, or the additive to the patient; set a lower pressure limit for delivering at least one of the crystalloid, the blood, the arrest drug, or the additive to the patient; set an upper pressure limit for delivering at least one of the crystalloid, the blood, the arrest drug, or the additive to the patient; accelerating the delivery rate of at least one of the crystalloid, the blood, the arrest drug, or the additive to be delivered to the patient in response to setting the acceleration rate; discontinuing accelerating the deliver rate of at least one of the crystalloid, the blood, the arrest drug, or the additive to be delivered to the patient in response to at least one of the maximum flow rate, the minimum flow rate, the lower pressure limit, and the upper pressure limit.

For example, in an embodiment a system autonomously converts from auto-start mode to auto mode once a desired parameter (e.g., a desired pressure for the cardioplegia) is attained.

15. The system of example 1 wherein the at least one medium comprises instructions to perform operations comprising: set an acceleration rate for delivering at least one of the crystalloid, the blood, the arrest drug, or the additive to the patient; set a predetermined pressure for delivering at least one of the crystalloid, the blood, the arrest drug, or the additive to the patient; discontinuing accelerating the delivery rate of at least one of the crystalloid, the blood, the arrest drug, or the additive to be delivered to the patient in response to attaining the predetermined pressure for delivering at least one of the crystalloid, the blood, the arrest drug, or the additive to the patient.

16. The system of example 12 wherein controlling the ratio of crystalloid to blood to be delivered to the patient includes providing a plurality of predetermined ratios of crystalloid to blood from which a user may select via the GUI.

17. The system of example 1 wherein the at least one medium comprises instructions to perform operations comprising purging fluid from the first HEX.

For example, the system may use compressed air from a compressor (possibly include within the console or coupled to the console) to eliminate a majority of the coolant from the first HEX.

18. The system of example 1 wherein the at least one medium comprises instructions to perform operations comprising determine a flow rate of coolant to the HEX.

19. The system of example 1 wherein the at least one medium comprises instructions to perform operations comprising determining whether the flow rate of coolant to the HEX satisfies a threshold.

For example, see the above discussion of the "Circ flow" icon.

20. The system of example 1 wherein the at least one medium comprises instructions to perform operations comprising determining a direction of flow of the coolant.

For example, an embodiment may issue an alarm if coolant flow reverses into an undesirable flow direction.

21. The system of example 1 wherein the at least one medium comprises instructions to perform operations comprising determining a direction of flow of at least one of the crystalloid, the blood, the arrest drug, or the additive to be delivered to the patient.

For example, an embodiment may issue an alarm if cardioplegia flow reverses into an undesirable flow direction.

22. The system of example 1 wherein the at least one medium comprises instructions to perform operations comprising recording an amount of time the patient's heart is arrested.

23. The system of example 22 wherein the at least one medium comprises instructions to perform operations comprising determining an amount of time that passes between a start time and a user input, submitted via the GUI, that indicates the patient's heart is arrested.

See, for example, the above discussion regarding "time to arrest."

24. The system of example 23 wherein the at least one medium comprises instructions to perform operations comprising recording the amount of time the patient's heart is arrested in response to the user input, submitted via the GUI, that indicates the patient's heart is arrested.

See, for example, the above section regarding "time to arrest."

25. The system of example 22 wherein the at least one medium comprises instructions to perform operations comprising determining an amount of time that passes between a start time and when the patient's heart is arrested.

26. The system of example 25 wherein the at least one medium comprises instructions to perform operations comprising: processing ECG data; in response to processing ECG data, determining the patient's heart is arrested.

Thus, in some embodiments detection of arrest may be automated based on ECG analysis conducted by the controller.

27. The system of example 12 wherein the at least one medium comprises instructions to perform operations comprising: set an additional lower pressure limit for delivering at least one of the crystalloid, the blood, the arrest drug, or the additive to the patient; set an additional upper pressure limit for delivering at least one of the crystalloid, the blood, the arrest drug, or the additive to the patient.

28. The system of example 1 wherein controlling a pressure of at least one of the crystalloid, the blood, the arrest drug, or the additive to be delivered to the patient includes autonomously adjusting flow rate of at least one of the crystalloid, the blood, the arrest drug, or the additive to control the pressure of at least one of the crystalloid, the blood, the arrest drug, or the additive within a range of pressure.

For example, see the above discussion regarding "auto mode".

29. The system of example 1 wherein the at least one medium comprises instructions to perform operations comprising: set an acceleration rate for delivering at least one of the crystalloid, the blood, the arrest drug, or the additive to the patients; autonomously discontinuing acceleration of at least one of the crystalloid, the blood, the arrest drug, or the additive to the patients in response to achieving a predetermined target pressure for the at least one of the crystalloid, the blood, the arrest drug, or the additive.

For example, see the above discussion regarding "auto start".

30. The system of example 1 wherein: the second container is keyed with a key pattern and the third container is keyed with an additional key pattern; the key pattern is unequal to the additional key pattern.

Figures 8A, 8B:
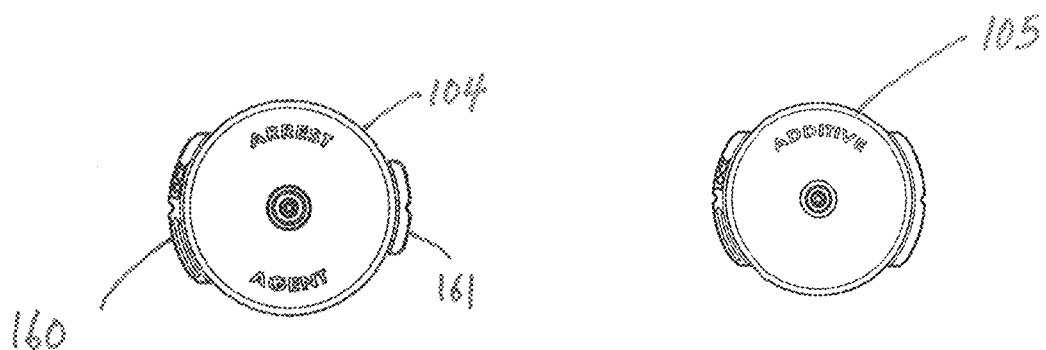

For example, see FIGS. 8A and 8B. The keyed flanges help ensure a user does not mistakenly supply arrest via the console's additive port (or vice versa). In an embodiment, the keyed flanges allow for one of the second and third containers to be "universal" while the other container is not universal. For instance, a universal flange arrangement may allow one of the containers to couple to both arrest and additive ports of the console but the non-universal flange will only couple to one of the arrest and additive ports. In one embodiment the arrest container has the universal flange but not the additive container. In another embodiment the additive container has the universal flange but not the arrest container.

Keying one container to not be confused with another container can take various forms. For instance, the containers may use different identifiers (e.g., RFID, bar code, QR code) that can be read by console sensor(s) to detect the containers.

31. The system of example 30 wherein: the second container has a luer fitting with a luer pattern and the third container has an additional luer fitting with an additional luer pattern; the luer pattern is unequal to the additional luer pattern; the key pattern is unequal to the luer pattern; the key pattern is unequal to the additional luer pattern.

32. The system of example 30 wherein: the console has a port with a port pattern that corresponds to the key pattern; the console has an additional port with an additional port pattern that that corresponds to the additional key pattern; the additional port also corresponds to the key pattern.

Thus, some ports may accept more than one key pattern.

33. The system of example 31 wherein the luer pattern has a lower gauge than the additional luer pattern.

For example, the luer pattern for the second container (arrest container) may be larger (i.e., smaller gauge) than a normal luer pattern. Thus, the second container will not mate with a standard luer fitting (e.g., luer fitting that complies with IS594). As a result, a user is less likely to inadvertently couple the arrest to a conduit that may inadvertently lead to accidently supplied arrest to a patient in an unintended manner.

34. The system of example 32 wherein the at least one medium comprises instructions to perform operations comprising determine, via a sensor coupled to the console, at least one of (a) whether the second container is operatively coupled to the sensor, or (b) whether the third container is operatively coupled to the sensor.

For example, the sensor may be keyed to detect whether a portion of flange exists or does not exist. Specifically, a sensor in a port may indicate whether a portion of a flange is missing. This may indicate a short flange is present, which would indirectly indicate the arrest container is present for situations like FIGS. 8A and 8B. In an embodiment a sensor may include a push button that is to be depressed to indicate whether one of the additive or arrest containers is engaged.

For example, the long flanges of the additive may depress two buttons while only one button is depressed by the arrest container due to the arrest container including a shortened flange that fails to depress a button sensor. This allows the console to detect if a container is present and whether the arrest container has been mistakenly inserted into the additive pump.

35. The system of example 34 wherein the sensor is included in at least one of the port or the additional port.

36. The system of example 1 wherein the at least one medium comprises instructions to perform operations comprising autonomously priming the first HEX, wherein autonomously priming the first HEX includes: filling a source line; priming a bubble trap; performing a leak test; priming a pathway for the arrest drug; and priming a pathway for the additive.

37. The system of example 1 wherein the at least one medium comprises instructions to perform operations comprising store at least one delivery protocol within at least one memory, the at least one memory being included within at least one of the console or the at least one processor-based computing node.

For example, the at least one memory may be cloud based or on separable memory such as flash memory (e.g., USB port memory stick).

38. The system of example 1 wherein the at least one medium comprises instructions to perform operations comprising store at least one delivery protocol within at least one memory, the at least one memory being separably coupleable to at least one of the console or the at least one processor based computing node.

39. The system of example 1 wherein the at least one medium comprises instructions to perform operations comprising store, in at least one memory, at least one of (a) the recorded volume amount of at least one of the crystalloid, the blood, the arrest drug, or the additive was administered to the patient; or (b) the recorded amount of time at least one of the crystalloid, the blood, the arrest drug, or the additive was administered to the patient.

40. The system of example 1 wherein the at least one medium comprises instructions to perform operations comprising store, in a case history file included in at least one memory, at least one of (a) the recorded volume amount of at least one of the crystalloid, the blood, the arrest drug, or the additive administered to the patient; (b) the recorded amount of time at least one of the crystalloid, the blood, the arrest drug, or the additive was administered to the patient, (c) an average flow rate for at least one of the crystalloid, the blood, the arrest drug, or the additive administered to the patient, (d) an average pressure for at least one of the crystalloid, the blood, the arrest drug, or the additive administered to the patient, (e) flow rates at different times for at least one of the crystalloid, the blood, the arrest drug, or the additive administered to the patient, (f) pressures at different times for at least one of the crystalloid, the blood, the arrest drug, or the additive administered to the patient, (g) arrest time, or (h) ischemic time.

See, for example, the above discussion regarding "case history".

41. The system of example 40 wherein at least one field in the case history file cannot be edited by a user.

42. The system of example 41 wherein the at least one field includes an amount of at least one of the crystalloid, the blood, the arrest drug, or the additive administered to the patient.

43. The system of example 1 wherein the console is configured to fixedly couple to a pole.

44. The system of example 43 wherein the console includes a projection to fixedly couple the console to the pole, the projection having a first state that releasably couples the console to the pole and a second state that fixedly secures the console to the pole.

45. The system of example 1 wherein the at least one medium comprises instructions to perform operations comprising drain coolant from the first HEX.

For example, the pneumatic system of the console may use compressed air to flush coolant (e.g., water) from the HEX, which reduces dripping of the coolant from the HEX once the HEX is decoupled from the console after a case is concluded.

46. The system of example 45 wherein the at least one medium comprises instructions to perform operations comprising operating a pneumatic system to drain coolant from the first HEX.

47. The system of example 1 wherein the at least one medium comprises instructions to perform operations comprising determine a flow rate of coolant within at least one of the first HEX or the water circulation system.

48. The system of example 47 the at least one medium comprises instructions to perform operations comprising determine the flow rate of the coolant in response to determining a pressure differential for the coolant while the coolant is located in the first HEX.

For example, see the above discussion regarding the "Circ flow" icon. In an embodiment monitoring a pressure drop across the HEX helps the system determine the coolant flow rate through the HEX.

49. The system of example 1 wherein the at least one medium comprises instructions to perform operations comprising, in response to an input from a user supplied via the GUI, autonomously operate a priming sequence by: determine the second and third containers are coupled to the console; in response to determining the second and third containers are coupled to the console, circulate at least one of the crystalloid, the blood, the arrest drug, or the additive; in response to circulating at least one of the crystalloid, the blood, the arrest drug, or the additive, venting air from within a circulatory system that includes at least one of the crystalloid, the blood, the arrest drug, or the additive.

50. The system of example 1 wherein the at least one medium comprises instructions to perform operations comprising adjusting granularity with which to control the delivery rate of at least one of the crystalloid, the blood, the arrest drug, or the additive to be delivered to the patient.

51. The system of example 1 wherein recording an amount of at least one of the crystalloid, the blood, the arrest drug, or the additive administered to the patient includes recording individual doses of at least one of the arrest drug or the additive.

See, for example, the above discussion regarding "case history."

52. The system of example 51 wherein the at least one medium comprises instructions to perform operations comprising displaying the individual doses via the GUI.

53. The system of example 1 wherein the at least one medium comprises instructions to perform operations comprising storing a list of at least one of additives, crystalloids, or names of people.

54. The system of example 7 wherein the at least one medium comprises instructions to perform operations comprising determining an amount of fluid in at least one of the second or third containers.

For example, these values may be determined based on determining a known starting volume and then tracking doses of the fluid in the container to then derive the remaining amount of fluid in the container.

55. A kit comprising at least one of first and second containers, wherein: the first container is to include an arrest drug; the second container is to include an additive; the first and second containers are configured to releasably couple to a cardioplegia delivery system; the first container is keyed with a first key pattern and the second container is keyed with a second key pattern; the first key pattern is unequal to the second key pattern; the first container has a first luer fitting with a first luer pattern and the second container has a second luer fitting with a second luer pattern; the first luer pattern is unequal to the second luer pattern; the first key pattern is unequal to the first luer pattern; the second key pattern is unequal to the second luer pattern.

For instance, the arrest and additive containers may be packaged separately from the console. The containers function as disposables and therefore may be purchased days or years after the console is initially acquired. The arrest and additive containers may be shipped to a user in a single container. However, the arrest and additive containers may be purchased separately from each other. Either or both of the arrest and additive containers may be shipped or conveyed with their respective fluids included in the containers or without their respective fluids included in the containers. For example, a third party may ship arrest containers from outside a hospital to a hospital or a pharmacy may convey arrest containers from one part of a hospital to another part of the hospital.

56. A kit comprising first and second containers, wherein: the first container includes an arrest drug; the second container includes an additive; the first and second containers are configured to releasably couple to a cardioplegia delivery system; the first container is keyed with a first key pattern and the second container is keyed with a second key pattern; the first key pattern is unequal to the second key pattern; the first container has a first luer fitting with a first luer pattern and the second container has a second luer fitting with a second luer pattern; the first luer pattern is unequal to the second luer pattern; the first key pattern is unequal to the first luer pattern; the second key pattern is unequal to the second luer pattern.

57. The kit of example 56 wherein: the first container includes a plunger, a seal, and a barrel; the barrel is sized to include the plunger and the seal; the plunger and the seal are configured to couple to one another via threads included on one of the plunger and the seal.

58. The system of example 57, wherein: the first container is detachably coupled to a fitting; the fitting is sized to seal an orifice of the barrel.

59. The system of example 58 wherein: the second container includes an additional barrel; the first container is detachably coupled to an additional fitting; the additional fitting is sized to seal an additional orifice of the additional barrel; the orifice is unequal in size to the additional orifice.

Thus, a container may have different caps that release (e.g., break off) from the container. One of the caps may seal the barrel and another of the caps may seal the additional barrel. See, for example, element 171.

60. A system comprising a container sealed in a kit, wherein: the container includes an arrest drug configured to arrest a heart; the container is configured to releasably couple to a cardioplegia delivery system; the container is keyed with a key pattern; the container has a luer fitting with a luer pattern; the key pattern is unequal to the luer pattern; the container includes a plunger, a seal, and a barrel; the barrel is sized to include the plunger and the seal; the plunger and the seal are configured to couple to one another via threads included on one of the plunger and the seal; the first container is detachably coupled to a fitting; the fitting is sized to seal an orifice of the barrel; the container is detachably coupled to an additional fitting; the additional fitting is sized to seal an additional orifice of an additional barrel; the fitting is shaped differently from the additional fitting.

61. The system of example 60 wherein the plunger includes the threads and the threads are monolithic with the plunger.

The plunger may removably couple to the seal. Having the threads be monolithic with the plunger may help promote a system that is less prone to leaking.

62. The system of example 60 wherein: the barrel includes first and second flanges; the first and second flanges are arranged along an aperture of the barrel; the first and second flanges are sized differently from one another.

For example, see FIGS. 8A and 8B. The keyed flanges help ensure a user does not mistakenly supply arrest via the console's additive port (or vice versa). In an embodiment, the keyed flanges allow for one of the second and third contains to be "universal" while the other container is not universal. For instance, a universal flange arrangement may allow one of the containers to couple to both arrest and additive ports of the console but the non-universal flange will only couple to one of the arrest and additive ports. In one embodiment the arrest container has the universal flange but not the additive container. In another embodiment the additive container has the universal flange but not the arrest container.

63. The system of example 1 comprising a pneumatic system to operate a first valve to regulate flow of at least one of blood or crystalloid, a second valve to regulate flow of the arrest drug, and a third valve to regulate flow of the additive.

For example, an embodiment uses pneumatically controlled valves instead of or in addition to cam mechanisms and the like. As a result, the physical footprint for the console is reduced and the overall complication for operating valves is reduced (e.g., fewer to no timing belts and the like are needed).

64. The system of example 63 wherein the at least one medium comprises instructions to perform operations comprising operating the pneumatic system to drain coolant from the first HEX.

65. The system of example 63, wherein the console includes a compressor.

66. The system of example 63, wherein the console includes a compressor coupled to the first, second, and third valves.

67. The system of example 66, wherein: the console includes a port to couple to compressed air from an air supply; the port is coupled to the first, second, and third valves.

Thus, an embodiment may allow a user to couple to a hospital's compressed air in addition to compressed air from the console's compressor. Further, some embodiments of the console may forego a compressor and instead strictly rely on an outside air supply (e.g., from a portable tank or main hospital supply system) for compressed air.

68. The system of example 63 wherein pneumatic system is configured to operate the first, second, and third valves independently of each other.

69. The system of example 63 wherein the at least one medium comprises instructions to perform operations comprising: control the first valve to control the ratio of crystalloid to blood to be delivered to the patient; control the second valve to control the amount of the arrest drug to be delivered to the patient; control the third valve to control the amount of the additive to be delivered to the patient.

70. The system of example 69 wherein the at least one medium comprises instructions to perform operations comprising: control at least one of the first, second, and third valves to control a flow waveform of at least one of the crystalloid, the blood, the arrest drug, or the additive to be delivered to the patient.

For example, the pneumatically controlled valves may be adjusted with fine granularity. In other words, the valves are not digital with only open and closed states. That granularity relates to many "open" or "partially" open settings each valve may have. That granularity extends further to address the fine timing with which the valves may be controlled, with allows for the valves to provide various flow profiles (i.e., various wave forms) for cardioplegia fluids as well as various ratios of cardioplegia fluids with regard to each other (e.g., the ratio of blood to crystalloid or the ratio of additive to another fluid).

71. The system of example 63 wherein: at least one of the first, second, or third valves includes an aperture configured to receiving a length of conduit; the aperture includes a long axis along which the conduit passes; the at least one of the first, second, or third valves that includes an aperture pivots within a plane that includes the long axis.

For example, a valve may include a chassis that resembles a barrel or conduit. Such a conduit may include a long axis and the valve may rotate about the long axis. This allows a user flexibility to rotate the valve within a plane so better accommodate conduit (e.g., tubing) that may enter the aperture from varying angles depending on how the user sets up his or her station. See FIG. 6.

72. The system of example 71 wherein: the at least one of the first, second, or third valves that includes the aperture further includes an actuator; the actuator is configured to open and close the aperture.

Figure 6:
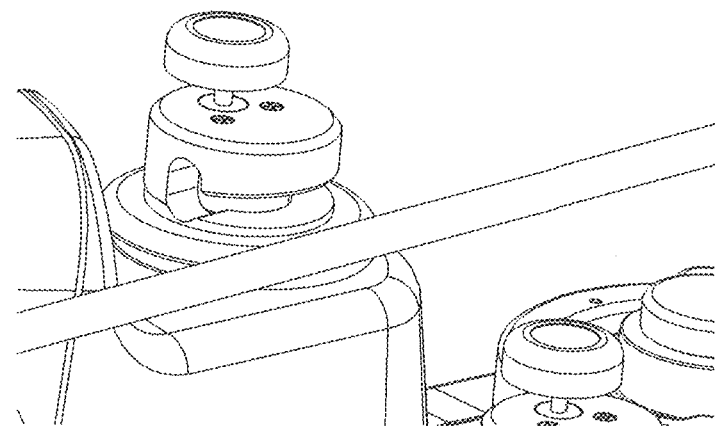
FIG. 6 depicts a vent line in an embodiment.

See FIG. 6.

73. A system comprising: a first heat exchanger (HEX) to couple to a water circulation system and to a cardioplegia delivery system; a second HEX; wherein: in a first HEX orientation the first HEX sealingly couples to the cardioplegia delivery system; in a second HEX orientation the second HEX sealingly couples to the cardioplegia delivery system; the first HEX includes a first amount of heat exchange baffling; the second HEX includes a second amount of heat exchange baffling, the second amount of baffling being unequal to the first amount of baffling.

For example, a single HEX of multiple HEXs may function as a disposable that is conveyed separately from the console. A single package may include multiple instances of a single HEX embodiment (e.g., 10 instances of a 10 convolution HEX) or may include instances of different HEX embodiments (e.g., 5 instances of 10 convolution HEX and 5 instances of 16 convolution HEX).

74. A system comprising: a first heat exchanger (HEX) to couple to a water circulation system and to a cardioplegia delivery system; wherein: in a first HEX orientation the first HEX sealingly couples to the cardioplegia delivery system; in a second HEX orientation a second HEX sealingly couples to the cardioplegia delivery system; the first HEX includes a first amount of heat exchange baffling; the second HEX includes a second amount of heat exchange baffling, the second amount of baffling being unequal to the first amount of baffling.

75. The system of example 73 wherein the first amount of baffling includes a first surface area of a metal material and the second amount of baffling includes a second surface area of the metal material, the second surface area being unequal to the first surface area.

76. The system of example 75 wherein the first HEX includes a first prime volume and the second HEX includes a second prime volume that is unequal to the first prime volume.

77. The system of example 76 comprising a coupler, the coupler being configured to couple the first HEX to the cardioplegia delivery system and further configured to couple the second HEX to the cardioplegia delivery system.

78. The system of example 77 wherein: the coupling includes a knob; the knob is configured to separably couple the first HEX to the cardioplegia delivery system; the knob is configured to separably couple the second HEX to the cardioplegia delivery system.

79. The system of example 73 wherein the first HEX includes a pliable diaphragm.

80. The system of example 79 wherein the pliable diaphragm is oriented to mate with a pressure sensor included in the cardioplegia delivery system.

81. The system of example 80 wherein the first HEX includes a bubble trap.

82. The system of example 81 wherein: the bubble trap includes a compartment; the compartment includes a first orifice to vent bubbles from the bubble trap; the compartment includes a second orifice to output at least one of the crystalloid, the blood, the arrest drug, or the additive to be delivered to the patient; the second orifice is closer to the baffling than the first orifice.

83. The system of example 82 wherein: the compartment includes a third orifice to input at least one of the crystalloid, the blood, the arrest drug, or the additive to be delivered to the patient into the compartment; the compartment includes a barrier between the second and third orifices.

84. The system of example 82 wherein the second HEX includes: the second HEX includes a bubble trap; the bubble trap includes a compartment; the compartment includes a first orifice to vent bubbles from the bubble trap; the compartment includes a second orifice to output at least one of the crystalloid, the blood, the arrest drug, or the additive to be delivered to the patient; the second orifice is closer to the baffling than the first orifice; the compartment includes a third orifice to input at least one of the crystalloid, the blood, the arrest drug, or the additive to be delivered to the patient into the compartment; the compartment includes a fourth orifice to input a fluid from outside the second HEX with at least one of the crystalloid, the blood, the arrest drug, or the additive included in the second HEX.

85. The system of example 84 wherein the compartment includes a fifth orifice to output the fluid from outside the second HEX.

For example, the HEX may include an input and an output for coolant flowing from and to the coolant reservoir.

86. The system of example 1 wherein: the at least one medium comprises instructions to perform operations comprising controlling the temperature of at least one of the crystalloid, the blood, the arrest drug, or the additive to be delivered to the patient in response to a sensed temperature from the second sensor and another sensed temperature from another sensor; the second sensor is configured to sense the temperature of the at least one of the crystalloid, the blood, the arrest drug, or the additive when the of at least one of the crystalloid, the blood, the arrest drug, or the additive is included in the first HEX.

For example, an infrared sensor coupled to the HEX may monitor temperature for coolant and/or cardioplegia fluids.

Other sensors included within the circulatory system may further monitor coolant and/or cardioplegia fluids. Based on the temperature reading or readings the heat transfer at the HEX may be adjusted to match a desired temperature determined via input from the GUI. Thus, even when the console is in "warm mode" if fluids become too warm a burst of coolant (e.g., water) may be used to lower the monitored temperature.

Examples provided herein help eliminate or reduce, for example, patient dilution and the associated sequela caused by cardioplegia delivery. Embodiments help promote good aortic valve closure, quick arrest, and good flow distribution; essential elements of attaining an effective induction dose and sustained myocardial protection.

AutoStart mode is used so the flow of cardioplegia quickly fills the aorta and closes the aortic valve. Cardioplegia rapidly distributes throughout the myocardium for a quick arrest, capturing the cardioplegia inside the heart. With the metabolic rate decreasing, the heart cools creating a relaxed and pliable myocardium ready for the procedure to begin—providing the ultimate myocardial protection (e.g., through buildup of cellular energy stores). Embodiments can help achieve ideal starts using the Auto Start feature, which provides the most-effective induction dose. With the stage set, embodiments (e.g., Auto Mode) provide the control (e.g., control of flow, pressure) and monitoring (e.g., ECG monitoring) to protect the heart for the duration of the procedure and collects data that reaches beyond the case. Embodiments provide precise drug control via pinpoint dosage volumes and concentrations delivered via pneumatically controlled actuators and the like.

Embodiments allow for quick setup for procedures. The disposables make setup quick and easy. Drug cartridges can be pre-filled plus offer an access port to use if needed during a case. The cartridges offer rigid syringe-style drug cartridges (e.g., FIGS. 8A and 8B) that mount on top of the console and are translucent for quick visual reference. The pumps for additive and arrest are color coded for safety with LED lights, the lights illuminate when drugs are being delivered. Sensors interface with console-to-controller for accuracy of volume and delivery. A two-pump system operates drug cartridges (arrest and additive) independently for maximum protection. Additive and Arrest agents are controlled separately for a fine-tuned drug delivery. Once disposables are in place, case details and priming are initiated on the freestanding touchscreen controller.

An embodiment captures and records all drug volumes and concentrations with the agility to make changes during a procedure. The console and freestanding controller work in unison to provide accurate and safe delivery of arrest and additive agents, no matter which cardioplegia strategy is used. Targeted parameters for flow and pressures are set on the controller per unique case. At the touch of a button, an embodiment quickly initiates an auto-regulated ramp-up to reach the targeted values for a fast and safe arrest—the most effective induction dose possible. Embodiments can deliver any cardioplegia with precise accuracy: intermittent microplegia, ratio cardioplegia, extended arrest protocols (also known as single-dose strategies), microplegia is a whole-blood alternative to the traditional blood-crystalloid cardioplegia. It provides superior myocardial protection without dilution, using the patient's own blood as the most physiologic buffer, and lowers transfusion rates.

Embodiments may work with undiluted microplegia. Doing so provides superior myocardial protection and provides natural distribution, maximizes aerobic environment for the myocardium, avoids need to dilute microplegia for distribution, lowers transfusion rates, reduces inotropes/blood products, minimizes use of hemoconcentrator, and results in a reduction of hemodilution. However, embodiments may also work with diluted microplegia. Traditional 4:1 (Blood:Crystalloid) may avoid negatives of using crystalloid such as: un-needed water can cause problems for hearts such as: edema, need for blood transfusions, effects on low HCT, unstable glucose levels, low output syndrome, and spontaneous rhythm.

Embodiments of the controller allows a Perfusionist to perform: real-time ECG monitoring; take time recordings throughout the case; create flow, pressure, and volume records; record drug names, volumes, and summaries; perform temperature control and displays. All parameters are easily and quickly adjustable during the case, providing accurate and agile control for better myocardial protection.

The controller allows a user to input custom drug lists including concentration values. Throughout the case, the system monitors amount delivered and saves the data in the case file for future reference. Digital time-stamps are saved in the case file in addition to all aspects of the case. Embodiments track and stores more data than in conventional systems. A few examples include: case logs, patient details, dose data, time stamps. Embodiments allow one to transfer the core data via USB drive and utilize data analytics software to view the data in comparison tables for charting, sorting, and filtering by specific criteria such as: date, time to arrest, patient attributes, procedure type, and the like. Perfusionists and surgeons can review individual cases or by trend analysis. Hospitals will have digital case files to assist with budget management. Pharmacies will have accurate logs for drug distribution and usage.

Embodiments reduce pharmacy and hospital costs via precise drug delivery without dilution, which simplifies the preparation and use of cardioplegia. Improved patient outcomes are obtained because embodiments reduce adverse events with less/no edema for a faster recovery. Patient safety is promoted because with the monitoring capabilities at the fingertips of the perfusionists, precision and agility is promoted. Data analytics ensure key data is captured and stored on the controller, and downloadable via USB drive for analyzing, trend analysis, and more.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. For example, terms designating relative vertical position refer to a situation where a device side (or active surface) of a substrate or integrated circuit is the "top" surface of that substrate; the substrate may actually be in any orientation so that a "top" side of a substrate may be lower than the "bottom" side in a standard terrestrial frame of reference and still fall within the meaning of the term "top." The term "on" as used herein (including in the claims) does not indicate that a first layer "on" a second layer is directly on and in immediate contact with the second layer unless such is specifically stated; there may be a third layer or other structure between the first layer and the second layer on the first layer. The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. A cardioplegia delivery system comprising:
a console including:
a first pump to pump at least one of blood or crystalloid;
a second pump to pump an arrest drug;
a third pump to pump an additive;
a temperature controllable water circulation system configured to couple to a reservoir of coolant;
a first heat exchanger (HEX) to couple to the temperature controllable water circulation system;
a first sensor to sense pressure;
a second sensor to sense temperature;
a third sensor to sense air;
at least one processor-based computing node coupled to a graphical user interface (GUI), the at least one processor-based computing node and GUI being configured to separably couple to the console;
a second HEX;
a first container to include the crystalloid, a second container to include the arrest drug, and a third container to include the additive, wherein the first, second, and third containers are configured to releasably couple to the console;
at least one non-transitory machine-readable medium, wherein the at least one non-transitory machine-readable medium has stored thereon data which, if used by the at least one processor-based computing node, causes the at least one processor-based computing node to perform operations comprising:
control an amount of the arrest drug to be delivered to a patient;
control an amount of the additive to be delivered to the patient;
control a temperature of at least one of the crystalloid, the blood, the arrest drug, or the additive to be delivered to the patient;
control a pressure of at least one of the crystalloid, the blood, the arrest drug, or the additive to be delivered to the patient;
control a delivery rate of at least one of the crystalloid, the blood, the arrest drug, or the additive to be delivered to the patient;
record an amount of at least one of the arrest drug or the additive administered to the patient;
record an amount of time at least one of the crystalloid, the blood, the arrest drug, or the additive is administered to the patient;
in response to recording the amount of at least one of the arrest drug or the additive administered to the patient, determine a volume amount of the at least one of the arrest drug or the additive that remains and is available to be administered to the patient;
store at least one delivery protocol, the at least one delivery protocol including a predetermined setting for at least one of (a) pressure of at least one of the crystalloid, the blood, the arrest drug, or the additive to be delivered to the patient, (b) temperature of at least one of the crystalloid, the blood, the arrest drug, or the additive to be delivered to the patient, (c) flow rate of at least one of the crystalloid, the blood, the arrest drug, or the additive to be delivered to the patient, or (d) ratio of the crystalloid to the blood;
wherein: (a) in a first HEX orientation the first HEX sealingly couples to a port of the console and in a second HEX orientation the second HEX sealingly couples to the port of the console; (b) the first HEX includes a first amount of heat exchange baffling and the second HEX includes a second amount of heat exchange baffling, the second amount of heat exchange baffling being unequal to the first amount of heat exchange baffling, and (c) the port cannot operatively couple simultaneously to the first and second HEXs.

2. The cardioplegia delivery system of claim 1 wherein the first HEX includes a first prime volume and the second HEX includes a second prime volume that is unequal to the first prime volume.

3. The cardioplegia delivery system of claim 2 comprising a coupler, the coupler being configured to couple the first HEX to the port of the console and further configured to couple the second HEX to the port of the console.

4. The cardioplegia delivery system of claim 1 wherein the at least one non-transitory machine-readable medium comprises instructions to perform operations comprising:
set an acceleration rate for delivering at least one of the crystalloid, the blood, the arrest drug, or the additive to the patient;
set a minimum flow rate for delivering at least one of the crystalloid, the blood, the arrest drug, or the additive to the patient;
set a maximum flow rate for delivering at least one of the crystalloid, the blood, the arrest drug, or the additive to the patient;
set a lower pressure limit for delivering at least one of the crystalloid, the blood, the arrest drug, or the additive to the patient;
set an upper pressure limit for delivering at least one of the crystalloid, the blood, the arrest drug, or the additive to the patient;
accelerating the delivery rate of at least one of the crystalloid, the blood, the arrest drug, or the additive to be delivered to the patient in response to setting the acceleration rate;
discontinuing accelerating the delivery rate of at least one of the crystalloid, the blood, the arrest drug, or the additive to be delivered to the patient in response to meeting at least one of the maximum flow rate, the minimum flow rate, the lower pressure limit, and the upper pressure limit.

5. The cardioplegia delivery system of claim 1 wherein the at least one non-transitory machine-readable medium comprises instructions to perform operations comprising purging liquid coolant from the first HEX.

6. The cardioplegia delivery system of claim 1 wherein the at least one non-transitory machine-readable medium comprises instructions to perform operations comprising recording an amount of time the patient's heart is arrested.

7. The cardioplegia delivery system of claim 6 wherein the at least one non-transitory machine-readable medium comprises instructions to perform operations comprising determining an amount of time that passes between a start time and a user input, submitted via the GUI, that indicates the patient's heart is arrested.

8. The cardioplegia delivery system of claim 1 wherein controlling a pressure of at least one of the crystalloid, the blood, the arrest drug, or the additive to be delivered to the patient includes autonomously adjusting flow rate of at least one of the crystalloid, the blood, the arrest drug, or the additive to control the pressure of at least one of the crystalloid, the blood, the arrest drug, or the additive within a range of pressure.

9. The cardioplegia delivery system of claim 1 wherein the at least one non-transitory machine-readable medium comprises instructions to perform operations comprising:
   set an acceleration rate for delivering at least one of the crystalloid, the blood, the arrest drug, or the additive to the patient;
   autonomously discontinuing acceleration of at least one of the crystalloid, the blood, the arrest drug, or the additive to the patient in response to achieving a predetermined target pressure for the at least one of the crystalloid, the blood, the arrest drug, or the additive.

10. The cardioplegia delivery system of claim 1 wherein:
    the second container is keyed with a key pattern and the third container is keyed with an additional key pattern;
    the key pattern is unequal to the additional key pattern.

11. The cardioplegia delivery system of claim 10 wherein:
    the second container has a luer fitting with a luer pattern and the third container has an additional luer fitting with an additional luer pattern;
    the luer pattern is unequal to the additional luer pattern;
    the key pattern is unequal to the luer pattern;
    the key pattern is unequal to the additional luer pattern.

12. The cardioplegia delivery system of claim 10 wherein:
    the console has a container port with a port pattern that corresponds to the key pattern;
    the console has an additional container port with an additional port pattern that that corresponds to the additional key pattern;
    the additional container port also corresponds to the key pattern.

13. The cardioplegia delivery system of claim 10 wherein the at least one non-transitory machine-readable medium comprises instructions to perform operations comprising determine, via a sensor coupled to the console, at least one of (a) whether the second container is operatively coupled to the sensor, or (b) whether the third container is operatively coupled to the sensor.

14. The cardioplegia delivery system of claim 1 wherein the at least one non-transitory machine-readable medium comprises instructions to perform operations comprising autonomously priming the first HEX, wherein autonomously priming the first HEX includes:
    filling a source line;
    priming a bubble trap;
    performing a leak test;
    priming a pathway for the arrest drug; and
    priming a pathway for the additive.

15. The cardioplegia delivery system of claim 1 wherein the at least one non-transitory machine-readable medium comprises instructions to perform operations comprising store, in a case history file included in at least one memory, at least one of (a) the recorded amount of at least one of the arrest drug or the additive administered to the patient; (b) the recorded amount of time at least one of the crystalloid, the blood, the arrest drug, or the additive was administered to the patient, (c) an average flow rate for at least one of the crystalloid, the blood, the arrest drug, or the additive administered to the patient, (d) an average pressure for at least one of the crystalloid, the blood, the arrest drug, or the additive administered to the patient, (e) flow rates at different times for at least one of the crystalloid, the blood, the arrest drug, or the additive administered to the patient, (f) pressures at different times for at least one of the crystalloid, the blood, the arrest drug, or the additive administered to the patient, (g) arrest time, or (h) ischemic time.

16. The cardioplegia delivery system of claim 15 wherein at least one field in the case history file cannot be edited by a user.

17. The cardioplegia delivery system of claim 16 wherein the at least one field includes the amount of at least one of the arrest drug or the additive administered to the patient.

18. The cardioplegia delivery system of claim 1 wherein the at least one non-transitory machine-readable medium comprises instructions to perform operations comprising drain coolant from the first HEX.

19. The cardioplegia delivery system of claim 18 wherein the at least one non-transitory machine-readable medium comprises instructions to perform operations comprising operating a pneumatic system to drain coolant from the first HEX.

20. The cardioplegia delivery system of claim 1 wherein recording the amount of at least one of the arrest drug or the additive administered to the patient includes recording individual doses of at least one of the arrest drug or the additive.

21. The cardioplegia delivery system of claim 1 comprising a pneumatic system to operate a first valve to regulate flow of at least one of the blood or the crystalloid, a second valve to regulate flow of the arrest drug, and a third valve to regulate flow of the additive.

22. The cardioplegia delivery system of claim 21 wherein the at least one non-transitory machine-readable medium comprises instructions to perform operations comprising operating the pneumatic system to drain coolant from the first HEX.

23. The cardioplegia delivery system of claim 21 wherein the at least one non-transitory machine-readable medium comprises instructions to perform operations comprising:
    control at least one of the first, second, and third valves to control a flow waveform of at least one of the crystalloid, the blood, the arrest drug, or the additive to be delivered to the patient.

* * * * *